(12) United States Patent
Daoura

(10) Patent No.: US 11,799,573 B2
(45) Date of Patent: *Oct. 24, 2023

(54) RADIOBEACON DATA SHARING BY FORWARDING LOW ENERGY TRANSMISSIONS TO A CLOUD HOST

(71) Applicant: PB, Inc, Issaquah, WA (US)

(72) Inventor: Daniel J Daoura, Renton, WA (US)

(73) Assignee: PB, Inc., Issaquah, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/699,112

(22) Filed: Mar. 19, 2022

(65) Prior Publication Data

US 2022/0255650 A1 Aug. 11, 2022

Related U.S. Application Data

(63) Continuation-in-part of application No. 17/069,686, filed on Oct. 13, 2020, now Pat. No. 11,403,924, (Continued)

(51) Int. Cl.
*G08B 25/08* (2006.01)
*G08B 25/10* (2006.01)
(Continued)

(52) U.S. Cl.
CPC .............. *H04H 20/59* (2013.01); *H04L 67/10* (2013.01); *H04W 4/02* (2013.01); *H04W 4/029* (2018.02);
(Continued)

(58) Field of Classification Search
CPC ..... A61B 5/0002; A61B 5/002; A61B 5/0022; A61B 5/11; H04L 67/025; H04L 67/125; H04W 84/18; G01D 21/00
See application file for complete search history.

(56) References Cited

U.S. PATENT DOCUMENTS

| 8,620,343 | B1* | 12/2013 | Lau | G01S 19/09 340/568.1 |
| 2011/0074587 | A1* | 3/2011 | Hamm | G06Q 10/0833 340/673 |

(Continued)

*Primary Examiner* — Mirza F Alam
(74) *Attorney, Agent, or Firm* — Fogg & Powers, LLC

(57) ABSTRACT

Remote actuation of machines or machine systems is realized by a system for coupling a radiobeacon to a smart device and in turn to a broader network. The smart device is configured as a proximity-actuated "community nodal device" by an application that operates as part of the system. The community nodal device is given instructions to function as a "soft switch": to automatically "upswitch", amplify, and broadcast low energy, local area radiobeacon "messages" to a cloud-based server, where the message is interpreted according to rules or policies established by an operator, and a command is transmitted for execution to a remote device. Conventional smart devices generally discard data not addressed to the owner of the smart device. Instead of discarding third party messages, the system preempts their handling, and using a soft switch formed from background resources, anonymously, without access to the message by a user interface of the proxy device, and without waiting for a network query from the host, engineers an "upswitched transmission" of radiobeacon-generated data to a cloud host. Advantageously, confidential sharing of ad hoc community resources results in a negligible load on background resources of the community nodal device. Messages may include a sensor data payload. Attached and embedded radiobeacons find use in tracking and finding lost winter sports equipment, for example.

26 Claims, 35 Drawing Sheets

Related U.S. Application Data which is a continuation-in-part of application No. 15/959,250, filed on Apr. 22, 2018, now Pat. No. 10,937,286, which is a continuation-in-part of application No. 15/853,917, filed on Dec. 25, 2017, now Pat. No. 10,424,189, and a continuation-in-part of application No. 15/681,806, filed on Aug. 21, 2017, now Pat. No. 9,900,119, which is a continuation of application No. 14/967,339, filed on Dec. 13, 2015, now Pat. No. 9,774,410, said application No. 15/853,917 is a continuation of application No. 14/301,250, filed on Jun. 10, 2014, now Pat. No. 9,892,626.

(60) Provisional application No. 62/260,313, filed on Nov. 26, 2015, provisional application No. 62/256,955, filed on Nov. 18, 2015.

(51) Int. Cl.

| | |
|---|---|
| *H04H 20/59* | (2008.01) |
| *H04W 40/22* | (2009.01) |
| *H04W 4/029* | (2018.01) |
| *H04W 4/90* | (2018.01) |
| *H04W 4/70* | (2018.01) |
| *H04W 4/80* | (2018.01) |
| *H04L 67/10* | (2022.01) |
| *H04W 4/02* | (2018.01) |
| *H04W 12/08* | (2021.01) |
| *H04W 12/033* | (2021.01) |
| *H04W 4/06* | (2009.01) |
| *H04W 4/08* | (2009.01) |

(52) U.S. Cl.
CPC ............... *H04W 4/06* (2013.01); *H04W 4/08* (2013.01); *H04W 4/70* (2018.02); *H04W 4/80* (2018.02); *H04W 4/90* (2018.02); *H04W 12/033* (2021.01); *H04W 12/08* (2013.01); *H04W 40/22* (2013.01); *Y02B 70/30* (2013.01); *Y02D 30/70* (2020.08)

(56) References Cited

U.S. PATENT DOCUMENTS

| | | | | |
|---|---|---|---|---|
| 2011/0140884 | A1* | 6/2011 | Santiago | G01S 5/0027 340/539.13 |
| 2012/0007713 | A1* | 1/2012 | Nasiri | H04M 1/72403 455/574 |
| 2013/0166198 | A1* | 6/2013 | Funk | G01C 21/1654 701/446 |
| 2013/0179110 | A1* | 7/2013 | Lee | A61B 5/1123 702/141 |
| 2022/0086227 | A1* | 3/2022 | Skaaksrud | B65D 90/48 |

* cited by examiner

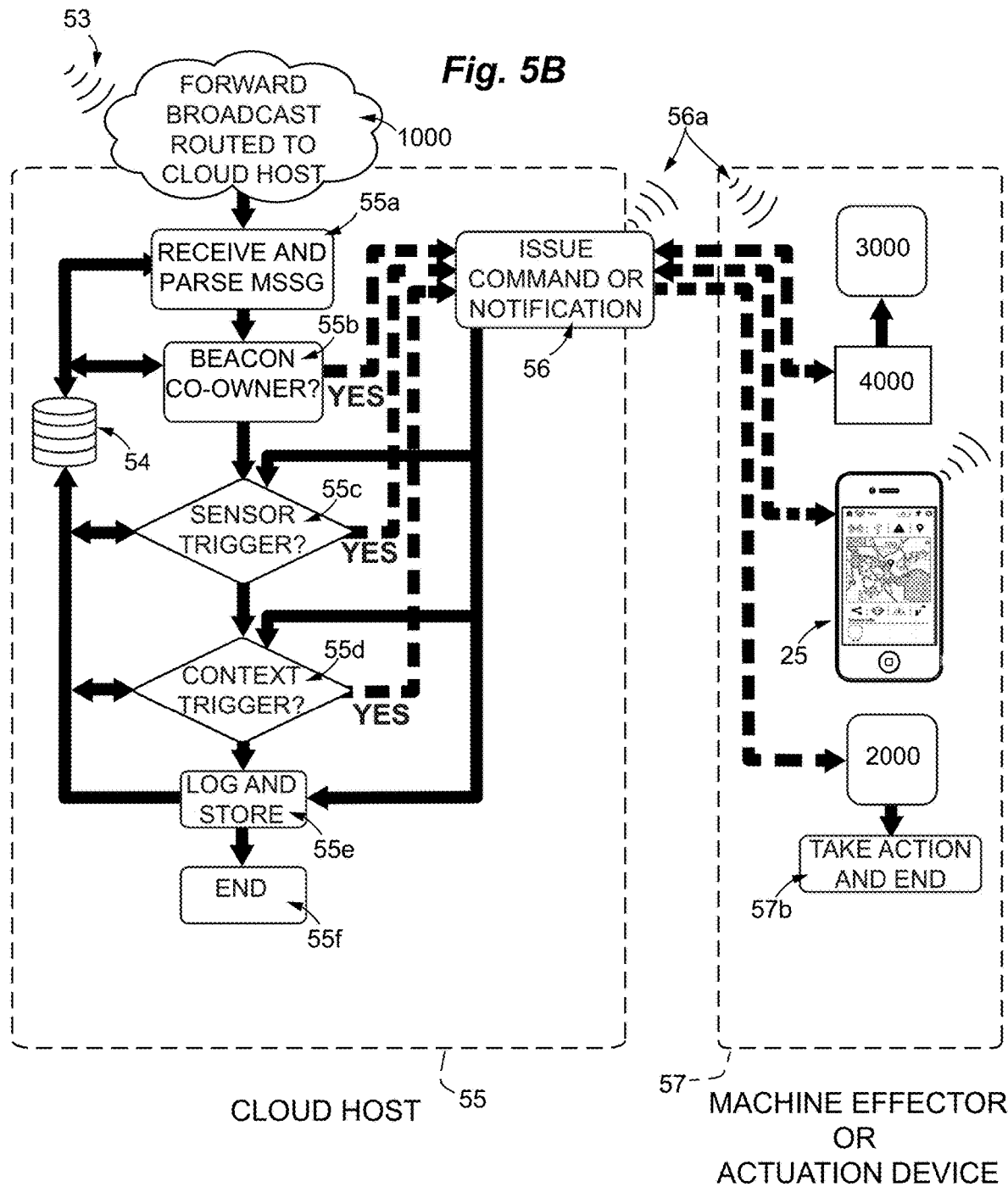

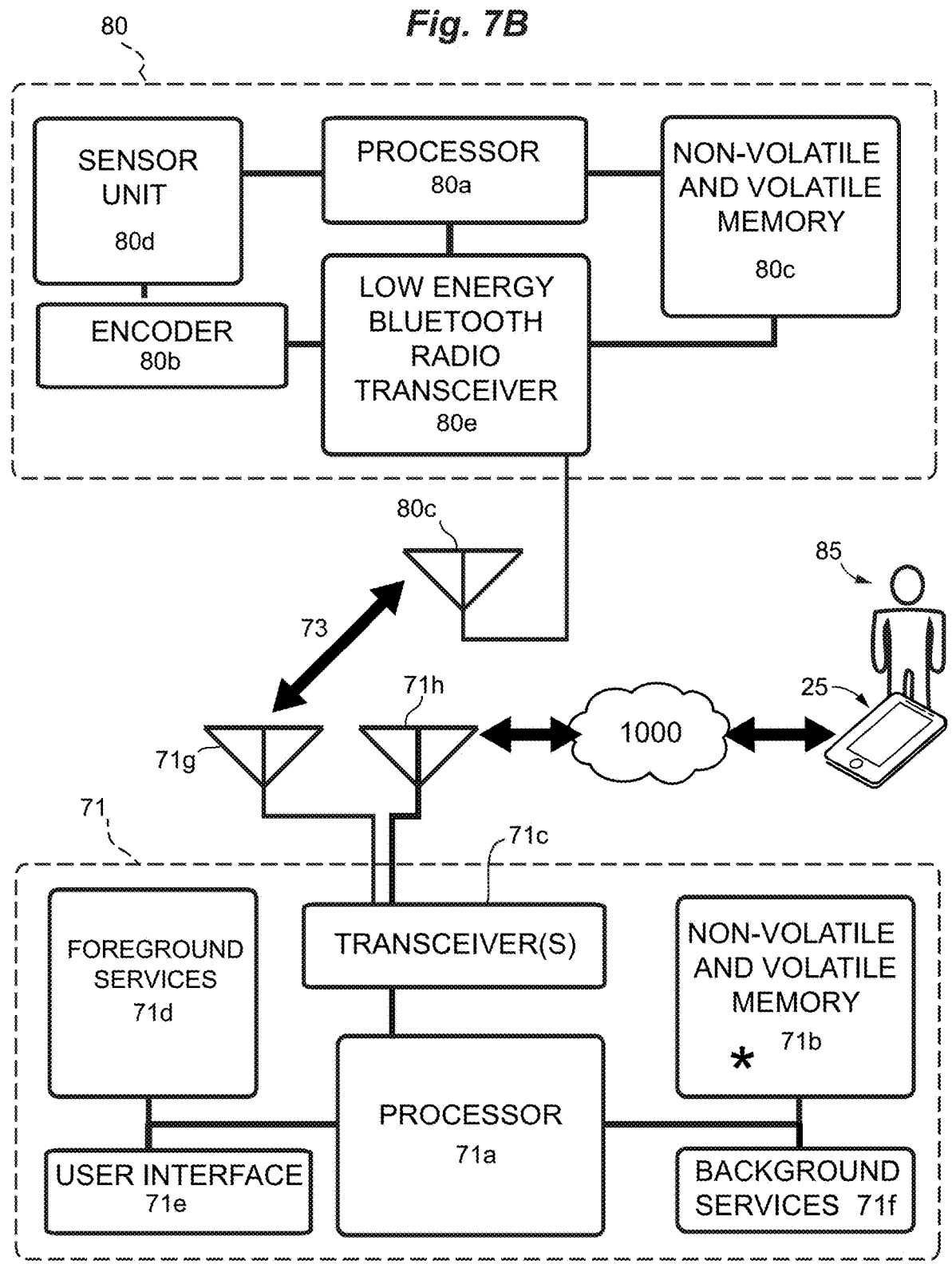

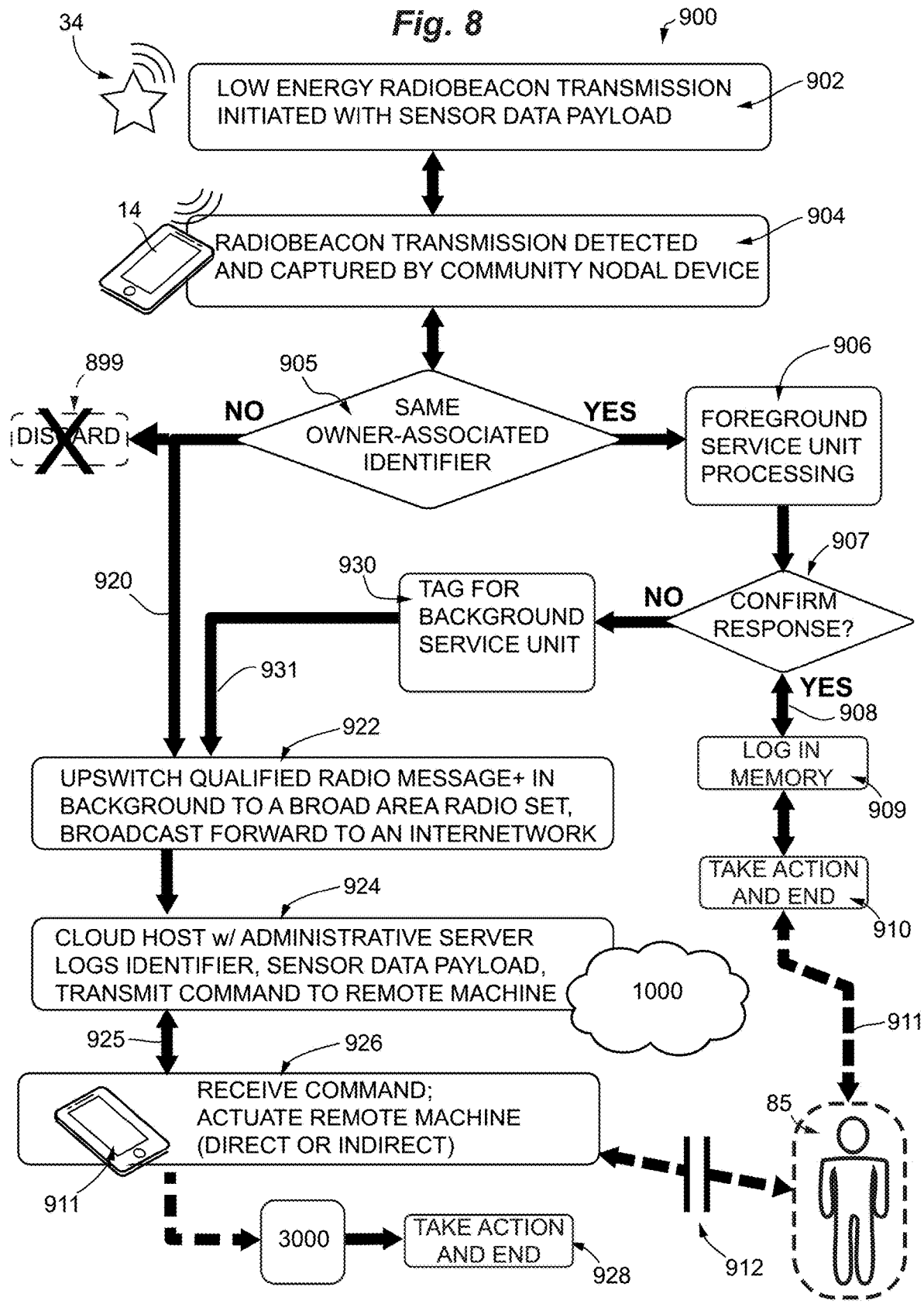

*Fig. 21C*
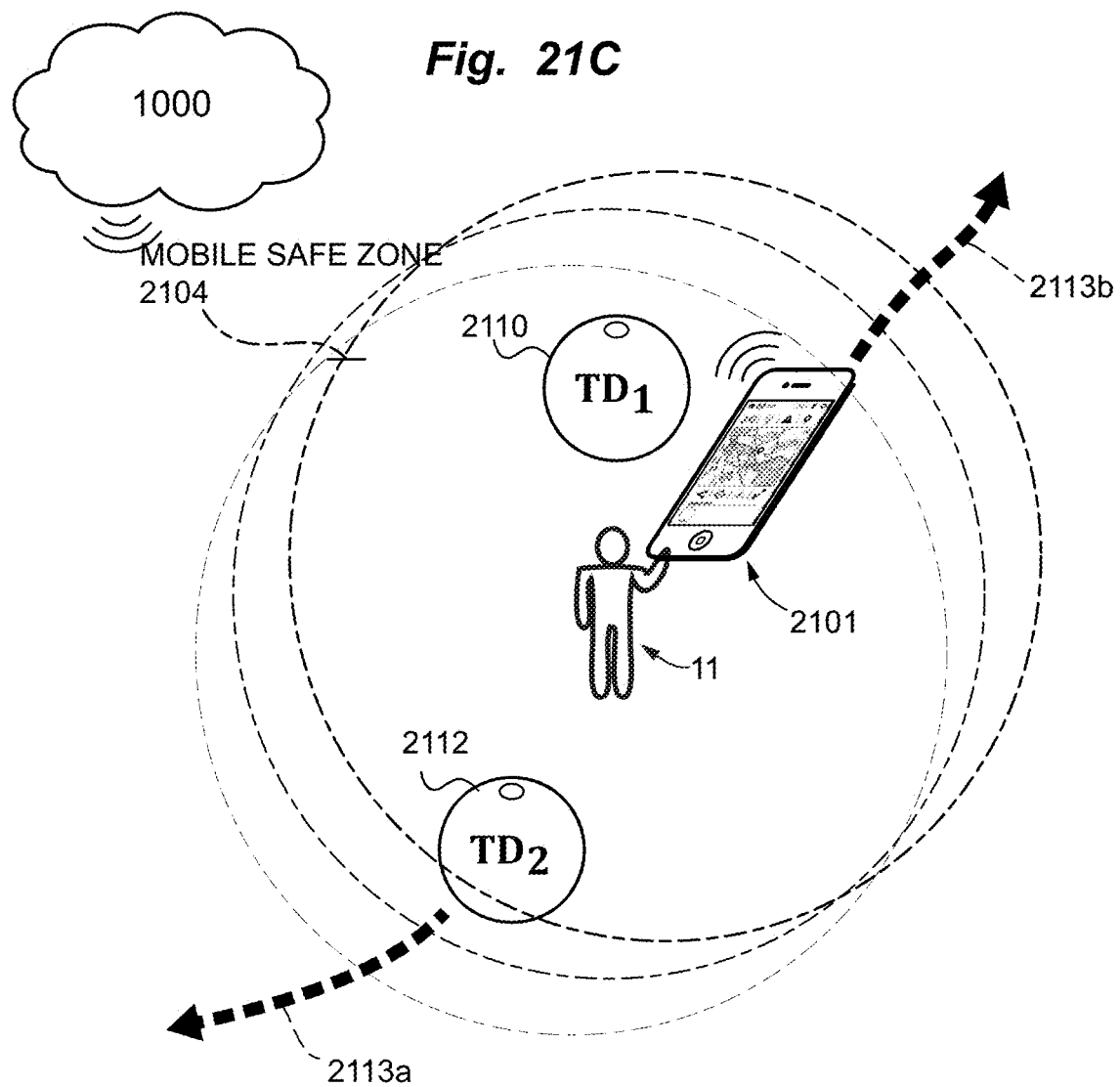
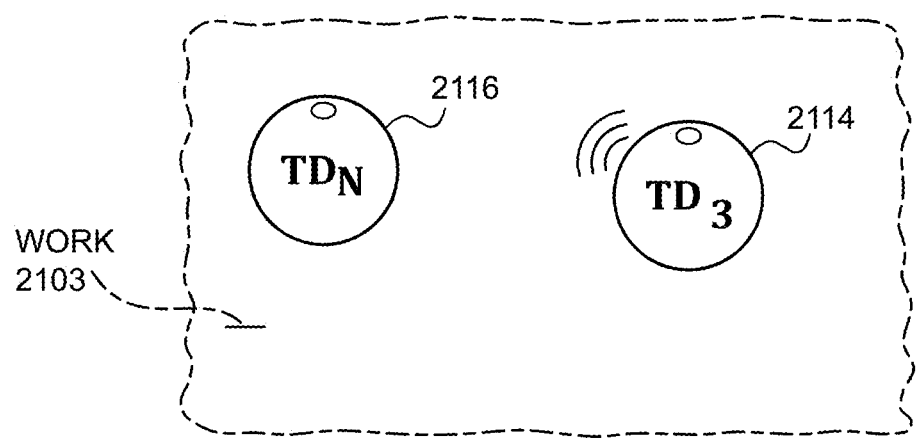

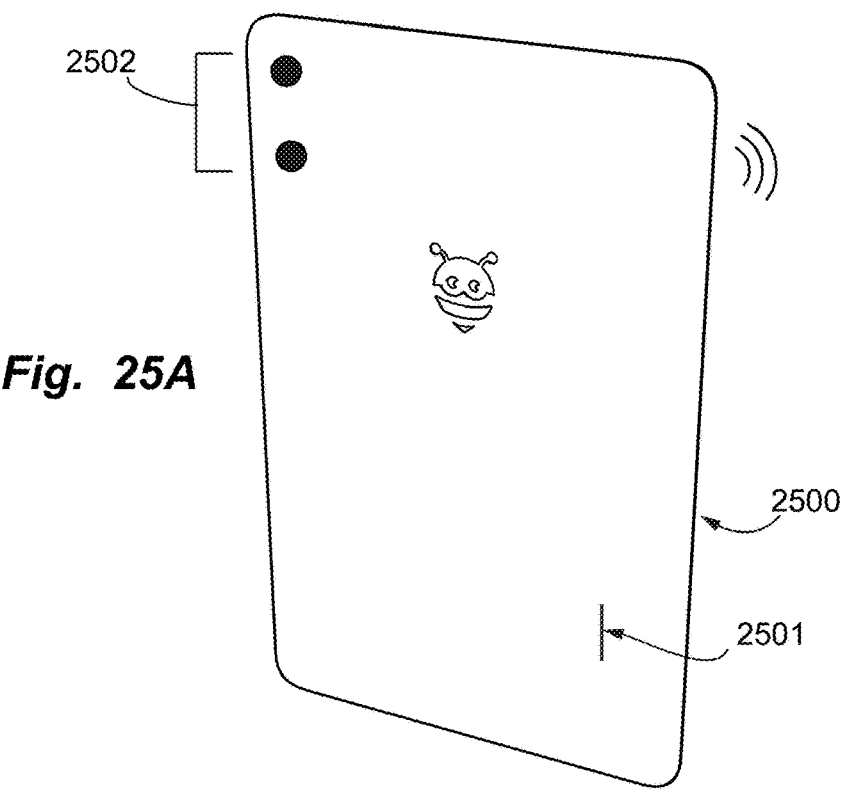

RADIOBEACON DATA SHARING BY FORWARDING LOW ENERGY TRANSMISSIONS TO A CLOUD HOST

CROSS REFERENCE TO RELATED APPLICATIONS

This application is related to and is a continuation-in-part of U.S. patent application Ser. No. 17/069,686, filed 13 Oct. 2020, which is a continuation of U.S. patent application Ser. No. 15/959,250 filed 22 Apr. 2018, now U.S. patent Ser. No. 10/937,286, which is a continuation-in-part of U.S. patent application Ser. No. 15/863,731 filed 5 Jan. 2018, now U.S. patent Ser. No. 10/063,331, which is a continuation of U.S. patent application Ser. No. 15/681,806 filed 21 Aug. 2017, now U.S. Pat. No. 9,900,119, which is a continuation of U.S. patent application Ser. No. 14/967,339 filed 13 Dec. 2015, now U.S. Pat. No. 9,774,410, which claims the benefit of priority under 35 U.S.C. § 119(e) from U.S. Provisional Patent Appl. No. 62/260,313 filed 26 Nov. 2015 and from U.S. Provisional Patent Appl. No. 62/256,955 filed 18 Nov. 2015 which are herein incorporated in full by reference for all purposes.

U.S. patent application Ser. No. 15/959,250 is further related to and is a continuation-in-part of U.S. patent application Ser. No. 15/853,917, filed 25 Dec. 2017, now U.S. patent Ser. No. 10/424,189, titled "Tracking Device Program", which is a continuation of U.S. patent application Ser. No. 14/301,250, filed 10 Jun. 2014, now U.S. Pat. No. 9,892,626, all said patent documents being co-assigned and incorporated herein in entirety for all purposes by reference.

This application is further related to U.S. Provisional Pat. Appl. No. 62/175,141 filed 12 Jun. 2015 titled "Devices and Network Architecture for Improved Radiobeacon Mediated Data Context Sensing", U.S. Provisional Pat. Appl. No. 62/136,285 filed Mar. 20, 2015 titled "On-Board Battery Monitor and Radiobeacon Notification System", and U.S. Non-Provisional patent application Ser. No. 14/301,236 filed 10 Jun. 2014 titled "Tracking Device System", now U.S. Pat. Nos. 10,580,281, and 9,392,404, titled "Tracking device program with remote controls and alerts", all said patent documents being co-assigned and incorporated herein in entirety for all purposes by reference.

TECHNICAL FIELD

This disclosure pertains generally to devices, systems and methods for providing user services over low energy radio networks for winter sports. More particularly, the network comprises one or more radiobeacons each fitted with a low energy radio and one or more sensors, one or more proximate nodal devices configured to receive a message from said radiobeacons and relay that message to a cloud-based cloud host server, the cloud host server acting in turn to actuate one or more remote machines or machine systems according to user preferences.

BACKGROUND

The smartphone application known as "Uber" has brought into focus opportunities for sharing resources (such as vehicles) through a system designed to link available vehicles and drivers with guest users who have need of a ride. "Ride sharing" initially was a means for reducing rush hour congestion by small groups of co-workers who knew each other, but has evolved to operate essentially as a "for hire" service mediated through the Internet. However, the service has a high cost to the resource providers—the drivers—raising the issue as to whether sharing has become exploitation.

There is a need for resource sharing that operates with little or no cost to the resource provider, and in fact provides welcome reciprocity, such that roles may be interchanged and shared between resource providers and resource consumers. Sharing would be improved if providers and consumers both are able to draw on the resources of others to solve problems, and in turn provide resources that the system may use to solve problems such as living alone as we become more elderly, recovering a lost dog or cellphone, a lost pair of skis, a camera, preventing mishaps to children who may otherwise not have adult supervision in this increasingly 7/24 workday world, and other challenges we face in everyday living.

More effort to explore the new sharing capacity of Internet-compatible nodal devices may help to ameliorate these and related problems. To date, efforts in this direction have necessitated that proprietary networks be built. No means for distributing shared resources fairly and without exploitation has been achieved. However, information sharing systems, whereby system resources are more efficiently shared in background, may yet achieve unexpected emergent properties, including synergies of function and new applications or properties.

A need exists for related technologies in finding and tracking equipment in which radio units are embedded or attached, such as skis and snowboards used in winter sports, for example.

SUMMARY

Disclosed are embodiments of a computer-implemented system operating to "upswitch" sensor data from a "low energy radio transmission" to a cloud host server in digital communication with a broad area network having a plurality of smart devices. Generally, the low energy radio transmissions are "radiobeacon signals". By configuring smart devices to scan for radiobeacon signal identifiers, ad hoc networks of widely used "smart phones" and other smart devices already in service may be created—these the networks surprisingly may be enabled to upload third party "radio messages" to a cloud host server, while causing little or no inconvenience to the owner of a private nodal device, who remains unaware of the background forward broadcast. A software application is provided that creates a "soft switch" in each user's device, effectively recruiting devices into a network of community nodal devices that facilitate sharing of computer resources, each device is configured to re-transmit other user's messages, regardless of message ownership, to a cloud host server, where the work of analyzing and acting on the message is initiated and completed. Any third-party message contents are not open to, or available in memory, for the owner of the private nodal device to see; and reciprocally, owners of nodal devices may rely on the nodal devices of other community members without loss of privacy, because the service is provided through background serves without using the memory resources of the proxy. This is particularly helpful because owners of radiobeacons benefit if they can receive messages even when their smart device is out of range of the low energy transmissions of their radiobeacons. By mutual reciprocity, those community members who contribute resources also benefit from the resources of others.

The system reconfigures commonly available "smart devices", here termed more generally "nodal devices"; and recruits them for signal transmission using background services of the host device. An ad hoc network is created, made up of low energy radiobeacons and what are termed here "community nodal devices", which refer to devices running an application of the invention. The application preempts the conventional logic to discard anonymous radio contacts and instead implements and enables sharing of background computing resources (hardware layers and stacks) of a device as needed to "upswitch" messages from a low energy radio band to an amplified signal compatible with internetwork transceivers, without notifying the private owner of a nodal device of the radio traffic in background on the device. In one sense, the message takes a "shortcut" through shared computing resources to a pre-determined cloud host address on an internetwork, and is then processed and ownership assigned according to the smart resources of an administrative server. Based on message contents and owner identification, owner instructions for actuation of remote devices are commanded and executed; community priorities may also be implemented, such as shared notifications to community members having a need to know about a hazard or a sensor output that has broader implications than just a private interest. Communities may be defined by a common membership, such as members of an institution, members of a neighborhood, members in a location or general area, or by user profile.

The system includes one or more radiobeacons having a sensor or sensor package, a clock, a processor with a memory for storing an instruction set, a radio emitter with antenna, such that the radio emitter operates at a first frequency and is configured to emit a broadcast signal in a low energy radio bandwidth. These radiobeacon signals include an identifier and a sensor data payload; the identifier and data are encoded in frames having defined bit structure. Radiobeacons are owned by an owner, who may also own a nodal device, and there may be many different owners who own one or more radiobeacons and/or nodal devices. By distributing and sharing a 'software application' that runs on any nodal device, owners form an ad hoc "community" of nodal devices capable of receiving messages from each other's radiobeacons, amplifying those signals, and upswitching them to an internetwork-compatible radioset for retransmission to a designated "cloud host" through a broad area network. The switching is made possible by a "soft switch" implemented by the application, the soft switch being assembled from communications and hardware "layers" or "stacks" built into the smart device. Thus the owner of a radiobeacon can receive a message even when a commonly owned ("co-owned") smart device configured for receiving messages from the radiobeacon is out of range or out of service. Secondary message routing can be designated, for example, using shared community resources. Advantageously, content or context may be used to determine message routing and for establishing any actions to be taken in response.

Initially, a nodal device detects a low energy radio signal. Instead of discarding the message because the radiobeacon signal is not intended for the owner of the nodal device (i.e., the owner of the radiobeacon and the owner of the nodal device are distinct entities), the application is enabled to preempt the normal process and "upswitch" the message to the cloud host of the system (using background resources and at most a limited set of foreground resources). Once preempted, qualified radio messages are amplified and transmitted as a "forward broadcast" addressed (with an IP address and communicatively efficacious preamble and message structure, but maintaining the original message contents). The forward broadcast will include the unique identifier and sensor data payload of the original message, plus any timestamp or geostamp generated by the shared nodal device. This is accomplished without interrupting or alerting the owner of the nodal device to the background radio traffic, so that all messages remain private during uploading to the cloud host server. At the cloud host, the unique radiobeacon identifier (a 128-bit word as currently practiced) allows an administrative server to associate the message contents with its owner's account and to engineer a response.

The cloud host server then issues a command or notification to remote system assets based on the message contents. In this way a "shortcut" is constructed out of network components—using an owner's radiobeacon, a nodal device owned or under control of another member of the community, and cloud resources provided by the system—in order to effect a notification (such as a display on a screen or an alarm tone) or a machine transformation (such as raising a garage door). Owners may use this shared network to cause commands to be executed on remote machines, and in other instances the system may aggregate data or operate context-based or global policies that result in commands auto-generated by the system. Generally, a sensor datum or data included in the message triggers a particular response (as specific to the unique identifier); the response may be programmed by the user so as to be triggered by a particular sensor output, such as a button on a radiobeacon that is pressed, or a jolt that exceeds safe limits (as sensed by an accelerometer in a sensor package, as may be indicative of a fall or a collision). Responses may be as simple as a notification displayed on a user device, or more complicated, such as notification of a possible injury to a first responder, or forwarding a cardiac monitor signal to a physician's automated service, and so forth. In making a response, context provided by the sensor component(s) of the message is combined with other indicia and rules programmed into the system. Context may be as simple as time of day, or may involve more complex indicia such the expected arrival time of the next bus and the location of a friend. More generally, contextual information may be selected from database associations with an identifier, a timestamp, a proximity indication, a geostamp, from sensor data, or associations deduced from aggregations of messages received from a defined local area in a defined duration of time, or from trends detected in a pool of all messages, for example. The response may be pre-programmed by the owner of the radiobeacon (to whom the message is addressed, as identifiable from the unique identifiers associated with the message), or may be programmed to be triggered at a system level based on aggregate data received from many sources.

Any sensor data that can be digitized may be encoded in a message. In a preferred instance, the sensor data is "overloaded" into a standard message format. In another instance, additional frames or packets are included in the message. Sensor data may be simple or complex. Examples of sensors capable of digital output include photocells, radiation sensors, motion sensors, velocity sensors, accelerometers, jolt sensors, gyroscopic sensors, gesture sensors, gravitational sensors, magnetic sensors, compass sensors, clock sensors, switch open/closed sensors, vibration sensors, audio pattern detection sensors, vehicle performance sensors, biological agent sensors, biochemical agent sensors, chemical agent sensors, temperature sensors, humidity sensors, windspeed sensors, pressure sensors, location sensors, proximity sensors, global positioning satellite sensors, relative radio signal strength sensors, radio traffic sensors, and so forth. Sensors packages having audio sensors, such as a microphone or diaphragm, may include some level of acoustic pattern matching capability embedded in the sensor package; in other words, some preliminary filtering of the sensor output is used to minimize bandwidth. Various combinations of sensors may be provided in a sensor package.

The remote machine may be what is termed here an "effector machine", indicating that the machine executes a physical transformation, such as a motor that opens a garage door, or what is termed here more generally an "actuation device", indicating that the device may actuate a machine-generated display, or may recruit other machines and devices to perform designated functions.

Exemplary systems may include radiobeacons regularly broadcasting local conditions or canned messages such as merchant appeals. In some instances, radio emission is intermittent and periodic according to a schedule; in other instances, radio emission is triggered according to ambient conditions, such as crossing a threshold sensor output. In a preferred embodiment, a radiobeacon initiates a broadcast when a compatible nodal device enters radio proximity and the radiobeacon has new sensor output.

In one aspect, the invention includes methods for upswitching sensor data from a low energy radio transmission of a radiobeacon to a cloud host server in digital communication with a broad area network having a plurality of smart devices. Smart devices are well known and are generally privately owned. Each includes a processor, memory, and hardware layers for a) receiving low energy radio transmissions, b) installing and implementing software applications, c) operating software applications as a foreground service or as a background service, c) directing radio transmissions identifiably associated with the owner of a smart device to a foreground service, e) dumping radio transmissions not identifiably associated with the private owner of the smart device, f) marking radio transmissions with a timestamp when received, g) optionally marking radiobeacon transmissions with a proximity measurement or a geostamp where received, and h) amplifying, broadcasting, and receiving radio transmissions on a broad area radioset that is efficacious in communicating digitally with a cloud host server. The method includes steps for (a) providing one or more radiobeacons having a sensor or sensor package, a radio emitter with antenna, an encoder, a processor with supporting data processing circuitry, and memory for storing data and an instruction set to be executed by the processor, such that the radiobeacon or radiobeacons are configured for emitting a low energy radio transmission that includes a formatted unique identifier and a sensor payload, such that the formatted unique identifier and sensor payload define a qualified radio message, further such that each the radio message is associated with a private owner of the radiobeacon, the owner being identifiable by the identifier; and (b) installing an application on a smart device of the plurality of smart devices, such that the application is configured for preempting the smart device from discarding the radiotag signal when received by the smart device, instead the application operating to configure the processor, memory and hardware layers as a soft switch enabled to upswitchingly amplify and broadcast a radio message as a forward broadcast to the cloud host server, including in the broadcast the identifier and sensor payload of the signal, plus any preamble, network address of the cloud host server, any communication format as needed, and any timestamp, proximity measurement, or geostamp as generated by the smart device. In consequence, the smart device is transiently restructured by the software as a "community nodal device", the community nodal device and soft switch being further characterized and defined as having the capacity for (i) automatically upswitching and forward broadcasting any qualified message in background to the cloud host server if the unique identifier is not recognized as being associated with the private owner of the smart device, without revealing the message contents to the owner of the smart device; and, (ii) automatically processing the message in foreground services if the unique identifier is recognized as being associated with the private owner of the smart device, revealing and acting on the message contents in foreground services to the owner.

The inventive methods also include receiving the forward broadcast at the cloud host, the cloud host having an administrative server configured with an instruction set and an administrative database, such that the instruction set including instructions for: i) parsing the forward broadcast so as to extract the unique identifier, the sensor payload, and any associated timestamp, proximity measurement, or geotag coded therein; and, ii) then, based on the owner identification, sensor payload, and any contextual information associated therewith, formulating a command or notification, such that the command or notification is based on rules associated with the owner identification in an administrative database and any rules implemented by a system administrator on behalf of a community of members; and finally, transmitting the command or notification over the broad area network to at least one smart device of the plurality of smart devices, to a remote machine, or to an actuation device.

As an added feature, the methods of the invention include provisions for "dumping" (i.e., discarding and erasing) any record or content of the message from the proxy device that aided in sending the message to the broad are network, and for releasing any computing resources shared by the community device in assembling the soft switch, unless and until another orphan message arrives.

As an added benefit, the system configuration implemented by the software, if the message owner's foreground services are unresponsive, automatically can suspend any process for processing the message in foreground services and automatically upswitch and forward broadcast the message in background to the cloud host server for disposition. The cloud host is able to parse the message, determine ownership by consulting a database, and based on rules associated with the private owner of the radiobeacon in an administrative database and any rules implemented by a system administrator on behalf of a community of members, take an action to the benefit of the owner and/or the community.

Command sequences take a number of forms. One method involves transmitting a command over the broad area network to at least one smart device of the plurality of smart devices, and generally this would be the response to a private message, essentially providing an alternative or secondary process for message delivery as preset by the owner.

Alternatively, in cases of general community interest, the method may involve transmitting the command to the plurality of smart devices, such that the command is a command to display a notification to a community of members having converted their smart devices to community nodal devices. This would be employed for example in matters of public safety, where a radiobeacon was reporting sensor data indicative of a fire, an auto accident, gunfire, or severe local weather.

More generally, the methods may also include provision for transmitting commands to a remote machine, an actuation device, or a plurality thereof, such that a physical transformation will be achieved, for example opening a garage door, or rolling down a car window, where the owner is not in physical proximity and needs assistance in performing the action. The command to the plurality of remote machines or actuation devices may be a command to execute a machine action or to actuate a device.

The nature of the action (or notification) may depend on the contents of the sensor payload. Sensor or sensor packages on radiobeacons will vary, but may be selected from a photocell, a radiation sensor, a motion sensor, a velocity sensor, an accelerometer, a jolt sensor, a gyroscopic sensor, a gesture sensor, a gravitational sensor, a magnetic field sensor, a compass, a local time sensor, a switch open/switch closed sensor, a vibration sensor, an audio pattern detection sensor, a vehicle performance sensor, a biological agent sensor, a biochemical agent sensor, a chemical agent sensor, a temperature sensor, a pressure sensor, a humidity sensor, a windspeed sensor, a location sensor, a global positioning satellite sensor, a proximity sensor, a relative radio signal strength sensor, or a radio traffic sensor, and so forth.

Location information leads to special applications. In some instances, location is known because the radiobeacon is stationary in a fixed location known to the administrative server. In other instances, radiotagged objects (having a radiobeacon attached) are portable, but their location can be deduced from recent radio contacts with other beacons or signals having known locations. An aggregation of radio messages from a plurality of community members may also be useful in establishing location, and some smart devices are equipped with GPS sensors, allowing precise position centering.

Thus the action taken can be targeted to a particular location. Other sensor context can also be important in directing action. Context as a whole, as known to the administrative server from historical and aggregated data stored in an administrative database, can be queried to determine the parameters of action to be taken. Aggregates of messages, all indicating tight traffic in a local area, could be used for example, to invite community members to find routes around the area. Similarly, community members could be offered direct routes to an event based on routes and experiences of others headed to the event.

In yet another application, the method may involve compiling and sharing a map or plot display in which sensor data is graphically displayed in aggregate, or graphically displayed with trend lines, or graphically displayed with an updatable tracking function. This can be of use, for example, in tracking lost objects. In at least one application the method may include providing a cloud-based service for graphically displayed the location of a lost object as tracked by its radiotag in the form of a track or path superimposed on the map, such that the map is updated when the administrative server receives a fresh radio contact and location of the lost object, the track including a chronological record of recent contacts in a mapped sequence.

GROUP FIGURES In another embodiment, software is provided for organizing the BT radiotag devices into groups and tools for managing location and tracking are described. And as an evolution of the BT radiotags, each radiotag is provided with memory and firmware for capturing a record of each BT beacon signal that is encountered and for uploading a log of the radiocontacts to a smart network. Emergent properties stem from pattern recognition in radio traffic data at the network level. Individual records from each receiving radiotag include radio identifiers (UUID or MAC Addresses and community identifiers) of the transmitting radiotag paired with RSSI values for the radio signals received and timestamps of the radio contacts made. This data yields insights into the leading edge of the cloud of radio contacts made in by a dynamic Bluetooth scatternet as it moves through the human environment and can be used to improve radiolocation fixes, to aggregate sensor data, and to draw inferences based on contextual clues. By keeping a record of the radio identifiers, associations within the community become apparent and close contacts between one or more users of a community can be logged for future contact tracing, for example.

Also provided here are devices, software, networks and system architectures for radiobeacon sensor payload sharing by the methods of the invention. These and other elements, features, steps, and advantages of the invention will be more readily understood upon consideration of the following detailed description of the invention, taken in conjunction with the accompanying drawings, in which presently preferred embodiments of the invention are illustrated by way of example.

It is to be expressly understood, however, that the drawings and examples are for illustration and description only and are not intended as a definition of the limits of the invention. The various elements, features, steps, and combinations thereof that characterize aspects of the invention are pointed out with particularity in the claims annexed to and forming part of this disclosure. The invention does not necessarily reside in any one of these aspects taken alone, but rather in the invention taken as a whole.

BRIEF DESCRIPTION OF THE DRAWINGS

The teachings of the present invention are more readily understood by considering the drawings, in which:

FIGS. 5A and 5B (two sheets) illustrate a block diagram of a general method of deploying and using an exemplary system of the invention.

FIG. 7B is a block diagram of functional components of a second radiobeacon in bidirectional communication with a nodal device, the radiobeacon and the nodal device both having a processing capacity and a non-volatile memory capacity for storing instruction sets.

FIG. 8 is a schematic view of system for upswitching sensor data from a low energy radio transmission to a cloud host server in digital communication with a broad area network having a plurality of smart devices.

FIG. 21C illustrates the concept of a mobile safe zone established with a dynamic radiofence around a plurality of radiotags and a stationary geofence around a second safe zone.

FIGS. 25A, 25B and 25C are perspective, profile and plan views of a second embodiment of a Bluetooth radiotag. The radiotag body is of a card shape.

Figure 1:
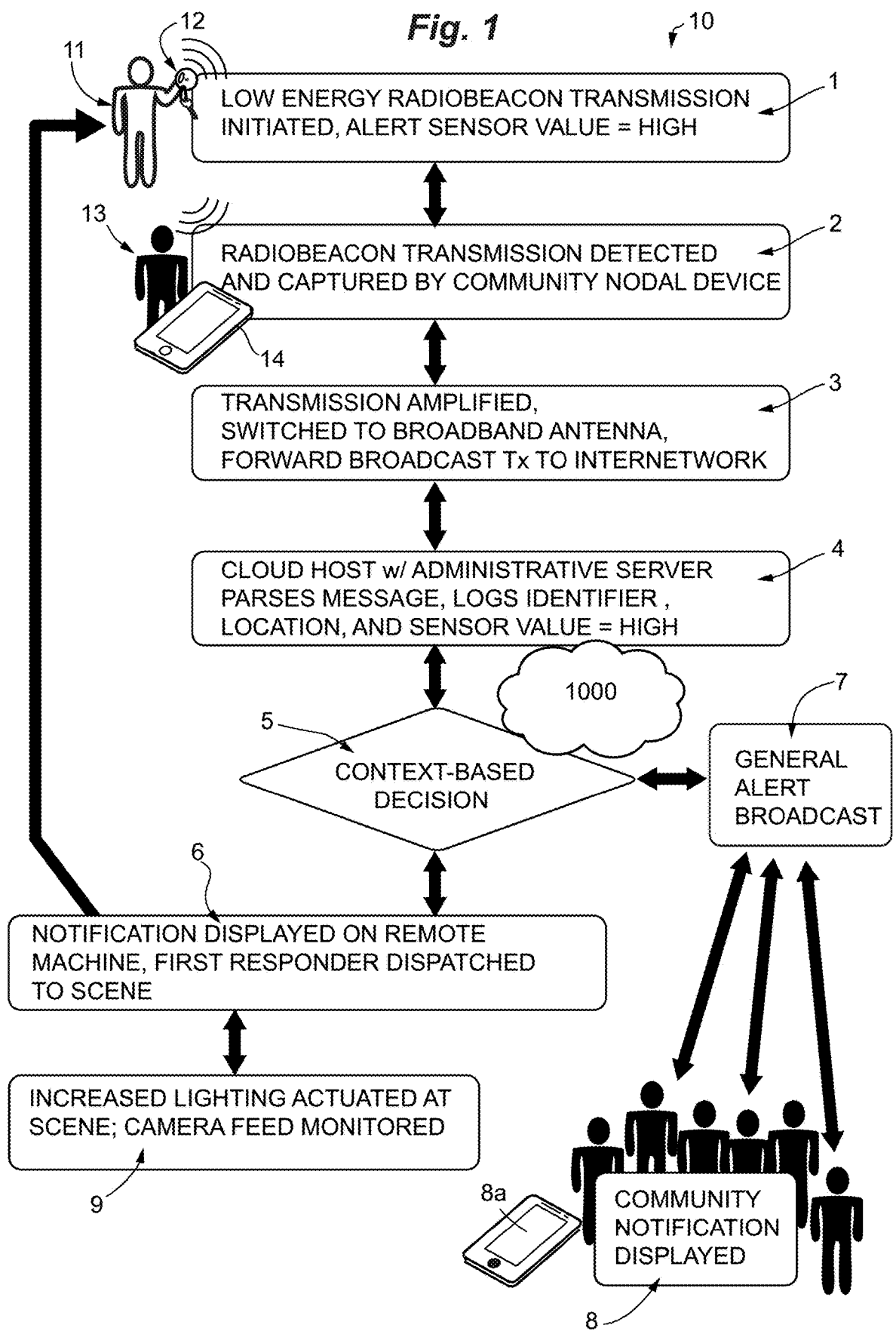
FIG. 1 is a schematic view of an exemplary application of a system of the invention for campus security.

The drawing figures are not necessarily to scale. Certain features or components herein may be shown in somewhat schematic form and some details of conventional elements may not be shown in the interest of clarity, explanation, and conciseness. The drawing figures are hereby made part of the specification, written description and teachings disclosed herein.

Glossary

Certain terms are used throughout the following description to refer to particular features, steps or components, and are used as terms of description and not of limitation. As one skilled in the art will appreciate, different persons may refer to the same feature, step or component by different names. Components, steps or features that differ in name but not in structure, function or action are considered equivalent and not distinguishable, and may be substituted herein without departure from the invention. The following definitions supplement those set forth elsewhere in this specification. Certain meanings are defined here as intended by the inventors, i.e., they are intrinsic meanings. Other words and phrases used herein take their meaning as consistent with usage as would be apparent to one skilled in the relevant arts. In case of conflict, the present specification, including definitions, will control.

Radiobeacon—also sometimes termed a "radiotag", refers to a device having a low power radio emitter for broadcasting a local intermittent message, the message containing a unique identifier (conventionally termed a UUID) indicative of a device manufacturer, model and "serial number" to be associated with an owner, optionally one or two frames or "values" (conventionally termed "major" and "minor" values) containing location or sub-type information, and preferably at least one sensor output in digital form, wherein the sensor output may be transmitted in a dedicated frame in the message, or may be overloaded into the major or minor values, or even in the UUID. Certain smart devices may emulate radiobeacons by programming a low energy radioset in the device to emit radiobeacon messages in a proper format. This includes bluetoothed devices generally, iBeacons, any smart device such as a cellphone, laptop or personal assistant device having a beacon functionality, and enhanced devices in the internet-of-things. Radiobeacons can be installed so as to be generally stationary even if portable or can be mobile, as when hand carried or affixed to an object or device that is intended to move or is moving. Radiobeacons may be integrated into networks, generally as radio emitters with no or limited radio reception, and have limited range. In some instances, radiobeacons may have limited capability as transceivers, and may receive radio signals and communications, such as for receiving remote program updates, or may include a radio receiver capable of detecting radio traffic in close proximity to the radiobeacon.

In the figures, radiobeacons intended to be generally stationary are indicated by a "star"; and radiobeacons that are intended to be portable or in motion are indicated by a "circular disk", however these indicia are selected for purpose of illustration and are not intended to be representative of or limiting with respect to structure.

The words, "signal" and "message" both indicate a digital radio message; however, "signal" is generally taken to indicate a low energy radio signal from a radiotag whereas "message" as used here is intended to refer to a transmission on a broad area network.

"Broad area networks" (BANs) are defined broadly to include wide area networks (WANs), local area networks (LANs), virtual private networks (VPNs), and metropolitan area networks (MANs), including wireless radio networks, cellular networks, and any patchwork of local area networks, wired or wireless, operating with a broadband, geographically extended range and Internet connectivity at some point or points. These networks have varying hybrid structures, but are generally long-distance communications networks that cover cities, states, countries, and may be global. The Internet is the largest broad area network that has been implemented and includes a variety of backbone connections and branch connections. "Internetwork" is used here sensu lato to indicate any BAN that includes at least one digital connection to Internet-based "cloud" services, where the connection(s) to the Internet may be wired, wireless, or a serial or parallel composite of wired and wireless segments making up a digital connection. Digital connections include bidirectional and unidirectional segments.

"Nodal device"—refers to any electronic device with a processor, non-volatile memory for storing program instructions, and supporting circuitry and hardware for executing commands from a user, for wireless communication with a broad area network portal or interface (i.e., communicating with an internetwork) and for wireless communication from and/or to a radiobeacon or other low energy radio device, where the two radio interfaces (a BAN interface and a low energy radiobeacon interface, sometimes termed a BLE interface) are operated on separate radiosets at different frequencies and power levels. Nodal devices typically have a plurality of connections, whether permanent or intermittent, bidirectional or unidirectional, to a plurality of broad area networks, including cellular, wide area, and local area wireless networks, and to low power radiobeacon emitters when at close range. Each device is defined as a node. Nodal devices include modern smartphones, personal digital assistants, laptops, notebook computers, tablet computers, desktop computers, or any equivalent device that can store and hold programs and data, execute programs, receive and/or transmit information and commands via wired or wireless channels of communication over a plurality of networks. Nodal devices also include radio-equipped computing machines in the form of a "hub" or "base station". Many such devices may also be programmed to function as mobile radiobeacons for emitting low energy radio signals, and may be provided with sensor units or packages, such as GPS sensor and location calculating packages, or accelerometry, gyroscope, compass and motion sensor packages. Radiobeacon emissions are distinct and independent of the radio pings used to identify cell towers.

Nodal devices typically have inherent functionality for: i) running applications on foreground resources or background resources, ii) receiving low energy radiobeacon transmissions, iii) discarding radiobeacon transmissions not identifiably associated with the nodal device's owner, iv) directing radiobeacon transmissions identifiable to an owner of a nodal device to a foreground service (such as a user interface for answering telephone calls or displaying text messages), v) marking radio transmissions with a timestamp when received, vi) optionally marking radio transmissions with a proximity measurement or a geostamp (sometimes termed a "geotag") where received, and vii) transmitting and receiving radio transmissions on a broad area radioset that is communicatively compatible with an internetwork portal.

Nodal devices include "foreground services" and "background services" having different command tree priorities. Commands for operations that should be performed to completion without being interrupted are "foreground commands" and utilize foreground resources (such as a user interface). Commands for operations that can be interrupted by a foreground command and continued at a later time are "background commands" and utilized background resources. In this way, foreground commands typically have a predetermined completion time, whereas background commands may have an extended completion time, depending on the level of interruption by foreground commands.

Embodiments of the invention take advantage of the fact that the device controller will typically not consume the full parallel bandwidth, so background resources are typically executed on background resources without noticeable delay. As defined here, "foreground services unit" refers to a structural association of hardware layers, stacks, and elements, including associated software or firmware, needed to perform foreground commands or routines; "background services unit" refers to a structural association of hardware layers, stacks, and elements, including associated software or firmware, needed to perform background commands or routines. For example, a foreground services unit may include a dedicated on-board local memory for storing data such as local user profiles created by the owner, call logs and voicemail and a hardware interface for accessing user services, whereas a background services unit may include transitory cache memory and other hardware assigned when needed to perform a background task, including a broad area radioset, but does not include a direct user interface, GUI or display operative when used as a "soft switch" as defined here (below).

"Upswitchingly transmitted" refers to a process that is generally implemented by software configured to organize hardware layers and stacks into a "soft switch" for detecting and receiving a message from a radiobeacon on a first radioset, and switching the message to a second radioset for amplified transmission to a broad area network, typically an internetwork. Also involved in the switching is formatting the message with a network preamble communicatively compatible with the broad area network and adding any timestamp or geostamp generated by the nodal device. In some instances, the "soft switch" may be implemented with firmware but is generally conducted using hardware layers, stacks, and background resources under control of a software application installed on and implemented on the nodal device (i.e., the smart device, such as a smart phone). Radio signals that are normally discarded, those having no identifiable association with to the owner of the nodal device are instead switched and "forward broadcast" to a broad area radioset for retransmission at higher power and are then discarded without sharing the contents with the owner of the nodal device, and without the knowledge of or active participation of the owner. Nodal devices having the software application, or otherwise being configured to perform the here described 'soft switching', are termed "community nodal devices".

"Community nodal devices" are distinguished by the functionalities of a software application as installed and implemented in the device; the application organizes background services into a "soft switch" to upswitch messages received from community-associated radiobeacons, forwarding the messages to an internetworked cloud host server while operating in background on the device, and more particularly while not accessing foreground services for decoding, displaying, aggregating, or storing the message contents of the radiobeacon. Community nodal devices are also configured to receive notifications from an internetworked cloud host server and in some instances may be programmed to execute functions in response to a command from the cloud host server. The software application and the cloud host server operate together in systems and methods of the invention.

"Timestamp" is an automated function performed as a background service in most nodal devices. Each radio contact detected is assigned a record having a time and date.

"Geostamp" is an optional function performed as a background service in some nodal devices. Each radio contact is assigned a record having a datum indicative of proximity to a known location, or a GPS coordinate. Radio signal strength at a particular frequency is generally indicative of proximity. Triangulation means may also be used to establish a geostamp sensu lato. Cloud host servers may further refine location using aggregated data. But geostamping may also be a local smart device function, and is performed by smartphones with onboard GPS or AGPS functionality, for example, or other device such as a smart camera that associates an image in memory with a location determined by accessing GPS signals and making a calculation of latitude and longitude, generally on a dedicated chip included in the smart device or hub for that purpose.

"Registering"—refers to a programmed node action of storing a record of a radio contact, a timestamp, optionally a geostamp, and/or at least one sensor datum in a memory module of a radiobeacon. Records in storage are generally retrievable, such as by accessing or searching a table or a database, for example, or other data retrieval systems known in the art. Records may also be uploaded to a higher layer in a network, such as to a server or other cloud-based service.

"Network"—refers to a whole world network ("internetwork"), a local area network (LAN), a wide area network (WLAN), or a wired network (and combinations thereof) having one or more nodes through which signals are received and processed or retransmitted. A conventional network may be wired or wireless, for example a Zigbee radio network or a BLUETOOTH® low energy radio network of devices that are linked by a handshake protocol. Networks are differentiated as to whether their wireless emissions are low power and short range (i.e., "bluetoothed" and MANET networks) versus higher power and longer range as would be understood by one skilled in the art. Eddystone and iBeacon are alternatives and are protocol specifications that define a proprietary Bluetooth low energy (BLE) message format for proximity beacon messages. Also included are telephone networks linked to wireless networks, such as AIN (Advance Intelligent Network), MSTO (Mobile Switching Telephone Office, and PSTN (Public Switched Telephone Network).

Mesh network—relates to a network having nodes capable of generating signals as well as relaying signals of others according to a peer-to-peer network. In a partial mesh network, some nodes are connected to just one or two other nodes. Many mesh networks operate across multiple radio bands. As known in the art, Firetide and Wave Relay mesh networks have the option to communicate node-to-node on 5.2 GHz or 5.8 GHz, but communicate node to client on 2.4 GHz (802.11). These frequencies are both designated for low energy radio bands and thus are intended for local area and micro area networking, typically with a common owner.

RSSI abbreviates "received signal strength indicator", which is an indication of incoming signal strength power or power present in an incoming radio signal and is commonly specified as an up to 8-bit unitless parameter. RCPI is an improved version of RSSI, and stands for "received channel power indicator" and is logarithmic in dB, measuring total power received in a defined channel bandwidth at the antenna connector. Other variants of RSSI exist, and "RSSI" as a definition is intended to broadly encompass all such indicators of received signal strength.

Mobile ad hoc network—relates to a continuously self-configuring wireless population of mobile devices functioning as internetwork routers for signal traffic; for example a MANET network, as known in the art, functions on top of standard internetwork linking protocols established for the Internet and includes addressing capability to forward traffic from one mobile device to another through a wireless network according to rules governing traffic and parsimonious utilization of nodes, where the owner of the network owns a controlling interest in all network resources and teaches methods to exclude others from using network resources.

"Owner"—is a user having ultimate control of a device that is part of a network. Control of an exemplary device in a network may be exclusively assigned to a single owner, or may be delegated or shared without loss of ownership according to permissions granted by the owner. An owner-user is any entity having delegated or shared authority to control a device in part or in full, without determination of ultimate control. Control is generally determined by an owner in a first person sense, as based on assignment of permissions as known in the art. Third person owners are affirmatively termed "anonymous users" or "operators" or "community members" sensu lato, without limitation and are non-controlling of network operations conducted in background on their community nodal devices.

"Sensor"—includes any device having a measurement function, either qualitative or quantitative, parametric or non-parametric. Generally, this includes, by example, sensors for temperature, motion, velocity, acceleration, jolt, pressure, humidity, windspeed, lightness, radiation, switch open/switch closed, and so forth. Also contemplated are sensors for vibration, magnetic field, gravity, gases such as methane, CO, $CO_2$, CBD vehicle performance indicia, QR sensors, aerosol particulate levels, history of sub-zero temperature, history of product over-temperature, analytes such as chemical or biological substances, and the like. More generally some sensors can detect biological agents, biochemical agents, and/or chemical agents for example. Sensors also include radio devices designed to detect radio traffic, such as a "ping" from a proximate radio device. Such sensors may detect relative signal strength; other sensors may be GPS sensors having a function of reporting a location or location specification data, and may combine data such as by registering a radio contact, a time stamp and a location. Sensors may function as triggers when linked to an enabled device having instructions for receiving and acting on a sensor output, where the machine is linked to the sensor through a network having at least one node and at least one cloud host server.

"Hive"—may refer to a group of radiobeacons owned or controlled by a common entity, such as an individual, a family, a private business, a public institution, or any group having definable membership.

"Remote machine"—may be what is termed here an "effector machine", indicating that the machine executes a physical transformation, such as a garage door opener, or what is termed here an "actuation device" more generally, indicating that the device may be a display for displaying content to a user, or may be enabled to recruit other machines and devices to actuate performance of designated functions.

"Contextual content"—(also termed here, "environmental input", "contextual data" or "stimulus input") refers to any bit or message of data corresponding to a sensor output received by a processor for transmission, and may include data related to temperature, light intensity, smoke, voltage, sound, motion, displacement, acceleration, humidity, pressure, radiation, button-press event, compass direction, or to report daylight levels, traffic levels, history of sub-zero temperature, history of product over-temperature, noise levels, NOX levels, aerosol particulate levels, and unusual noises such as gunshots or sirens, or self-reporting, such as reporting a low battery level, or other stimulus or sensor data, without limitation to these example contextual contents. In some instances, a sensor is a switch having two positions such that the datum is an indication that the switch has been tripped, such as a button switch when pressed, a photocell that has been triggered by light, or a motion sensor that has been tripped by motion, and so forth. More sophisticated sensors may also be used, such as radiation detectors, chemical detectors, biological detectors, and sound discriminators, where the output may be relatively simple to represent digitally, but the sensor module itself is a complex analytical device. Sensors associated with radiobeacons may be used in clusters, such as to report sets of data for temperature, humidity, windspeed and barometric pressure, or to report a clustermap of urban micro-local conditions such as traffic levels, noise levels, NOX levels, and particulate levels, with map-pins showing unusual noises such as gunshots or sirens. Self-reporting, such as reporting a low battery level, is also included in the scope of contextual data. Preferred sensors are miniaturized so that they may be co-housed with the radio controller and emitter module. Generally, the sensor module will include a controller for conditioning and digitizing the output and may include a microcontroller function for execution of basic program steps. The instruction set for the radiobeacon is stored on-board in non-volatile memory (or as firmware), and is executed according to a clock schedule associated with the processor, or when a command is received (if the beacon is provided with a BTLE transceiver). Contextual data may also be used to enable security features of the radiobeacon communications systems.

Contextual information for making rule-based decisions may be selected from database associations with an identifier or identifiers, any timestamp data, any proximity data, any geostamp data, any sensor data, or from associations deduced from aggregations of messages received from a defined local area in a defined duration of time, or from trends detected in a pool of all messages.

A "server" refers to a software engine or a computing machine on which that software engine runs, and provides a service or services to a client software program running on the same computer or on other computers distributed over a network. "Server" may refer to an individual computer or to a cluster of computers configured as a server of a computing machine. A client software program typically provides a user interface and performs some or all of the processing on data or files received from the server, but the server typically maintains the data and files and processes the data requests. A "client-server model" divides processing between clients and servers, and refers to an architecture of the system that can be co-localized on a single computing machine or can be distributed throughout a network or a cloud. Servers may be specialized, as a distribution server may be physically distinct from an administrative server, but cooperatively operated as part of a computing machine or system.

"Computer" means a virtual or physical computing machine that accepts information in digital or similar form and manipulates it for a specific result based on a sequence of instructions.

"Computing machine" is used in a broad sense, and may include logic circuitry having a processor, programmable memory or firmware, random access memory, and generally one or more ports to I/O devices such as a graphical user interface, a pointer, a keypad, a sensor, imaging circuitry, a radio or wired communications link, and so forth. One or more processors may be integrated into the display, sensor and communications modules of an apparatus of the invention, and may communicate with other microprocessors or with a network via wireless or wired connections known to those skilled in the art. Processors are generally supported by static (programmable) and dynamic memory, a timing clock or clocks, and digital input and outputs as well as one or more communications protocols. Computers are frequently formed into networks, and networks of computers may be referred to here by the term "computing machine". In one instance, informal internet networks known in the art as "cloud computing" may be functionally equivalent computing machines, for example.

"Processor" refers to a digital device that accepts information in digital form and manipulates it for a specific result based on a sequence of programmed instructions. Processors are used as parts of digital circuits generally including a clock, random access memory and non-volatile memory (containing programming instructions), and may interface with other digital devices or with analog devices through I/O ports, for example.

General connection terms including, but not limited to "connected", "attached," "conjoined," "secured," and "affixed" are not meant to be limiting, such that structures so "associated" may have more than one way of being associated. "Fluidly connected" indicates a connection for conveying a fluid therethrough. "Digitally connected" indicates a connection in which digital data may be conveyed therethrough. "Electrically connected" indicates a connection in which units of electrical charge are conveyed therethrough.

Relative terms should be construed as such. For example, the term "front" is meant to be relative to the term "back," the term "upper" is meant to be relative to the term "lower," the term "vertical" is meant to be relative to the term "horizontal," the term "top" is meant to be relative to the term "bottom," and the term "inside" is meant to be relative to the term "outside," and so forth. Unless specifically stated otherwise, the terms "first," "second," "third," and "fourth" are meant solely for purposes of designation and not for order or for limitation. Reference to "one embodiment," "an embodiment," or an "aspect," means that a particular feature, structure, step, combination or characteristic described in connection with the embodiment or aspect is included in at least one realization of the present invention. Thus, the appearances of the phrases "in one embodiment" or "in an embodiment" in various places throughout this specification are not necessarily all referring to the same embodiment and may apply to multiple embodiments. Furthermore, particular features, structures, or characteristics of the invention may be combined in any suitable manner in one or more embodiments.

"Adapted to" includes and encompasses the meanings of "capable of" and additionally, "designed to", as applies to those uses intended by the patent. In contrast, a claim drafted with the limitation "capable of" also encompasses unintended uses and misuses of a functional element beyond those uses indicated in the disclosure, referencing Aspex Eyewear v Marchon Eyewear 672 F3d 1335, 1349 (Fed Circ 2012). "Configured to", as used here, is taken to indicate is able to, is designed to, and is intended to function in support of the inventive structures, and is thus more stringent than "enabled to" or "capable of".

It should be noted that the terms "may," "can,'" and "might" are used to indicate alternatives and optional features and only should be construed as a limitation if specifically included in the claims. The various components, features, steps, or embodiments thereof are all "preferred" whether or not specifically so indicated. Claims not including a specific limitation should not be construed to include that limitation. For example, the term "a" or "an" as used in the claims does not exclude a plurality.

"Conventional" refers to a term or method designating that which is known and commonly understood in the technology to which this invention relates.

Unless the context requires otherwise, throughout the specification and claims that follow, the term "comprise" and variations thereof, such as, "comprises" and "comprising" are to be construed in an open, inclusive sense—as in "including, but not limited to."

The appended claims are not to be interpreted as including means-plus-function limitations, unless a given claim explicitly evokes the means-plus-function clause of 35 USC § 112 para (f) by using the phrase "means for" followed by a verb in gerund form.

A "method" as disclosed herein refers to one or more steps or actions for achieving the described end. Unless a specific order of steps or actions is required for proper operation of the embodiment, the order and/or use of specific steps and/or actions may be modified without departing from the scope of the present invention.

DETAILED DESCRIPTION

Radiobeacon data sharing for triggering remote machine action is realized using proximity-actuated soft switches and system network architecture. Messages from radiobeacons containing sensor data output are upswitchedly transmitted to a cloud host server of an internetwork (uniformly referenced in the drawings as cloud host 1000). Nodal devices are configured to function as soft switches by an installed "application" typically run as software. The soft switch function allows the nodal device to upswitch signals received from a low energy radiobeacon to a "whole world" or "broad area" network in amplified form and in a communicatively compatible format for reception by a cloud host server. In the cloud host server, a response is initiated according to rules and policies established by the owner of the radiobeacon and/or by the administrator of the system. The response may be a command to action or a notification transmitted to a remote machine.

The cloud host server receives radiobeacon output from compatible "nodal devices" in proximity to the radiobeacon. Put another way, the radiobeacon recruits compatible nodal devices based on proximity, not by ownership, where proximity is defined by radio signal strength emitted by the radiobeacon. With low energy radiosets, as currently practiced, proximity for effective radio transmission has a limit of about 150 feet, and location can be defined by relative signal strength. Proximity may be further refined by GPS location of the nodal device relative to the radiobeacon (i.e., a geostamp supplied by the nodal device), or by a calculation that involves aggregating data received by the cloud host server and assigning contacts a location based on history of proximity to one or more radiobeacons having known locations. Radiobeacons having fixed or otherwise known locations are generally indicated here in the drawings by a "star"; mobile radiobeacons may be indicated by a round body or may be incorporated in any of the smart devices depicted, many of which emulate beacon function or can be converted into a radiobeacon by installing a software application of the invention.

Broadcasts are termed "messages" because they preferredly include a "data payload" having output from a sensor or sensor package associated with the radiobeacon. On receipt, a compatible nodal device will register the message and add a timestamp (and a geostamp when available). Conventionally this information is then discarded if the nodal device determines that no policy or rule associates the message with the owner of the device; however, by installing an application of the invention in a nodal device, the nodal device acquires capability to access a cloud host of the invention, and message policies will include instructions for processing and rebroadcasting third-party messages in background (but where the message contents remain anonymous, occult, and encoded so that the owner of the "proxy" device is not notified or permitted access to the message contents without special permissions). At the end of the upswitching process, no record of the contents of the message can be retrieved from the proxy nodal device and encryption may be used as known in the art to ensure privacy, whereby only the cloud host server will decrypt the message. The broadcast forward, however, includes the original data payload of the message, a timestamp as received, and a network address for the cloud host, so that it can be routed to the cloud host server. Based on ownership of the radiobeacon as determined from the original message contents, and on sensor data in the message, along with any contextual information that is relevant, the cloud host server accesses a database or instruction sets, determines a user preference or an administrative preference for some appropriate action in response, and initiates the pre-configured action, for instance, instructing a remote machine or machine system to execute an action that the owner has requested according to the time, place, context, and/or any condition reported in the sensor data.

In other instances, the cloud host server will take collectively beneficial action, such as by sharing a map showing aggregated data indicating updated traffic conditions, or alerting users according to their profile of any events of interest. The actions can range from calling an emergency operator in the event that the radiobeacon detects and reports data consistent with a vehicle accident or injury, or actuating a camera, or lowering a window in an overheated vehicle, or unlocking a car without using a key, helping a user find their lost keychain with their cellphone, helping find their lost cellphone (using the radiobeacon in the cellphone) with their keychain, or displaying a map having an overlayer of aggregated local microarea weather data collected from multiple radiobeacon sensors by intermittent transmissions from nodal devices. Other examples are demonstrated below.

Unlike common commercial radiobeacons designed to emit canned notifications according to user or merchant input, the preferred radiobeacons include at least one sensor unit and an encoder for transmitting sensor output in a formatted message that is understood by the cloud host server. Data structures for transmitting sensor data in low energy radio signals will be described in detail below.

The transmissions from community-shared nodal devices may be promiscuous, and generally occur in background services on the nodal device, utilizing only a small fraction of the nodal device capability, and thus the application operates in background essentially as a network switch for particular radio contacts, recruiting hardware as needed to amplify, relay and route the message from a local low energy radio emitter, through a broad area radioset of the device, and a defined IP address of a cloud host server. The nodal device has two radiosets, and uses lower link layers to add a timestamp (and optionally a geostamp) when switching the data from a low energy radio receiver to an amplifier/transceiver, and formats the message according to accepted communications protocols for each radioset, but does not otherwise process the data for display or storage. In short, the application does not provide for foreground display or access to the message. Thus data transmission is opportunistic but also discreet.

In some instances, a radio emission by a nodal device, such as a cellphone station ping, will actuate emission of sensor data from a radiobeacon sensor package in response. In other instances, the radiobeacon will intermittently emit a message according to current conditions or according to a regular schedule, and any compatible nodal device that receives the signal will execute the broadcast forward capability installed as part of the application. The application for recognizing the message, switching the data, and assigning resources to amplify, route, and rebroadcast the message runs in background and is generally installed on the nodal device from a distribution server or by other download services. In this way, users having nodal devices may share resources needed to switch lower level radiobeacon transmissions onto a network through which a shared cloud host server can receive the transmission. All users benefit by services provided by the cloud host server. These include accessing locations of lost objects (objects, or pets, to which a radiobeacon may be attached), monitoring ambient conditions, receiving notifications of adverse conditions, aggregate sharing of local events, remote notification of home alarms, and reduced insurance risk, for example.

Also, the application may be installed with a feature to convert the nodal device into a radiobeacon and to harness the network clock in the hardware. A message may then be broadcast to a cloud host server in background with a network timestamp and a sensor data payload as configured by the user, such as accelerometry, motion sensing, and location data, each datum with a timestamp, and may be accessed by owners seeking a lost cellphone or mobile device, for example, on which the application is installed. Community smart devices fitted with the corresponding software, upon encountering a local broadcast of any device, will report the radio contact to the cloud host server, if the radiobeacon has been tagged as lost the server will flag the contact for special processing, and will correlate contact information from multiple hits so as to issue a report or periodic notifications tracking the lost device.

Owners of radiobeacons may also access their own smart device, where "smart device" is taken broadly as any device capable of functioning under control of a software "application" of the invention. In response to a signal from a radiobeacon, amplified and upswitched to a broad area radioset by the smart device—where the owner of the radiobeacon has configured the server to execute a command to a remote machine, such as a camera, a cellphone, a garage door, or a panic alarm, for example, or even the smart device itself—a physical act results. Thus a smart device such as an iOS or Android-enabled cellphone becomes a platform for operating and controlling one or more remote machines according to rules established by an owner of the radiobeacon and implemented through the cloud host.

FIG. 1 is a schematic view of an exemplary application of a system 10 of the invention for campus security. An example of the system in use is presented as an introductory demonstration. While described generally as a series of steps, the underlying system and network structure, devices and components are also described in the figures that follow.

In this example, an owner 11 of a pocket radiobeacon 12 actuates a switch, causing the switch output to go "high". This is essentially a sensor having two values, HIGH and LOW. When HIGH, the radiobeacon is triggered to emit a message having the device UUID and a data payload including the sensor value "HIGH". The device has limited computing power, but advantageously readily transmits simple messages with just the press of a button. Thus it is well suited as a "panic button" in this example, where HIGH triggers a system response. Advantageously, the owner of the radiobeacon does not need a cellphone in hand to access the system. The radiobeacon is lightweight and convenient and can be pocketed on a keychain for example or pinned to a jacket.

Here owner 11 encounters a hazard or is in danger, and in a first step 1, actuates a pocket radiobeacon 12 to summon help. Because the radiobeacon has limited radio range, the message cannot be directly ported to a broad area internetwork. However, in step 2, a community nodal device 14 in the possession of a passing stranger 13, is able to detect the radio transmission and upswitch the message to a cloud host server 1000 as shown in steps 3 and 4. The community nodal device 14 is programmed with a software application of the invention; the application functions in background to a) amplify the transmission, b) attach a router-compatible forwarding address, and c) broadcast forward the message, routing information, including a timestamp, and optionally including a geostamp.

Using the UUID, the cloud host server 1000 identifies owner 11 in an administrative database. Using contextual information, such as proximity to radiobeacons having locations known to the system, or location information generated by community nodal device 14, the cloud host server makes a rules-based decision 5 to cause a first responder to be dispatched to the scene 6, and/or to issue a general notification 7 to all members of a community 8. Lighting in or around the owner's position may also be increased 9 or strobed to signify that help is on the way and surveillance cameras can be switched to live feed. These functions can be automated through the cloud host server or semi-automated to include interactive displays and a human operator. Other alarms may also be actuated.

Generally, community nodal device 14 is a "smart device" having application instructions for operating a soft switch for switching messages between two radiosets of the nodal device, the radiosets operating on radio networks or "bands" that are otherwise not connected. Generally one is a low energy radioset for generating, sending and receiving a radiobeacon signal having a UUID and one or more optional frames. The other radioset in the nodal device is a broad area radio transceiver that transmits an amplified broadcast forward to an internetwork transceiver or portal. The executable instructions for the soft switch are installed by loading the inventive application onto the nodal device, as from a distribution server or other downloading service such as a near field communications port, and are generally memory resident in the smart device. Notifications are sent to individual personal smart devices 8a operated by members of the community (if the devices have been configured with the software application), and thus a benefit is provided to all community members. The reciprocal responsibility is that those same smart devices become community resources for upswitchingly transmitting radiobeacon messages belonging to others to the cloud host server. Because the sharing functions occur in background, little expense and no effort is incurred by the community as individuals, and again because the messages are handled in background, no display or storage of the messages is permitted. Owners of beacons can use the system with a reasonable expectation of privacy such that the operator of the system establishes policies in which certain information (including owner identification and sensor data payload) will not be shared unless contextually relevant or is presented as de-identified aggregate data. Alternatively, notifications may be sent to a select list of "friends" identified by the owner of the beacon, and for whom the appropriate permissions have been implemented on the cloud host server.

Figure 2:
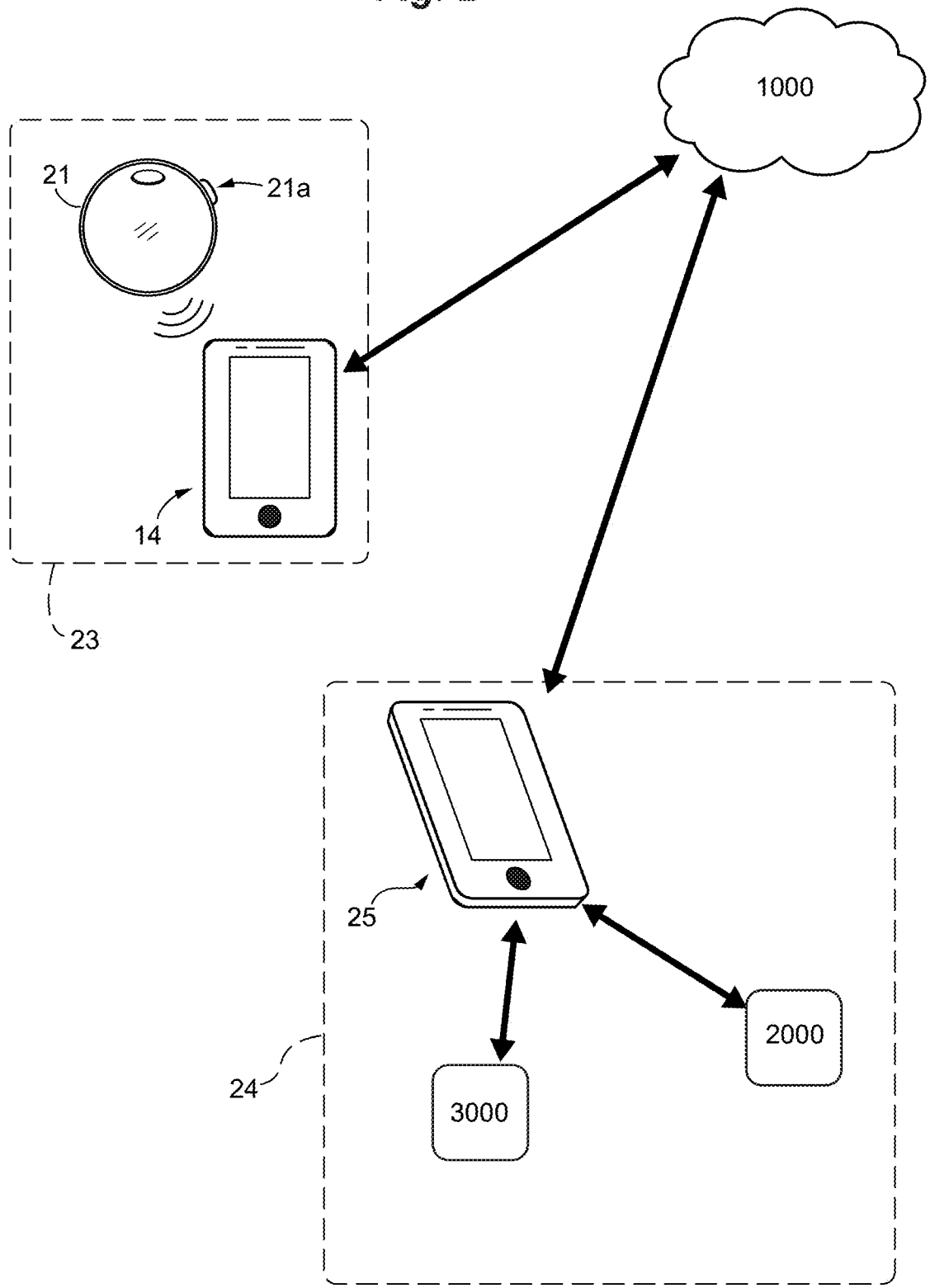
FIG. 2 is a schematic view of an exemplary network and system of a second embodiment of the invention.

FIG. 2 is a schematic view of an exemplary network and system 20 of a second embodiment of the invention. A system is shown having a radiobeacon 21 with edge-mounted touch button 21a and a nodal device (here a community nodal device 14) in a first location 23, a cloud host server 1000, and in a remote location 24, an actuation device 25 (here a friend's smartphone), a remote machine 2000, and a second actuable device 3000. Bold arrows indicate radio contacts; a dashed line indicates an optional configuration. Software for coordinating the system and network architecture is installed in the radiobeacon 21, the nodal device 14, the cloud host server, in actuation devices 25 and in machines or actuable devices (2000, 3000) as needed. Generally, actuation devices 25 function as clients of cloud host 1000 when executing commands. The system thus has three functional blocks, a radiobeacon-nodal device pair (23, dashed box), a cloud host 1000, and downstream actuation cluster (24, dashed box) having one or more actuation devices 25 and associated effector machines. Actuation of machine functions may involve generating a display, closing a switch, powering down a machine, triggering an output, and so forth. Actuation may be controlled directly from the cloud host, or may involve an intermediate downstream controller as represented here by smartphone 25). The radiobeacon 21 and the controller 25 may belong to an owner and a friend, for example, whereas community nodal device 14 may belong to a third party member of the community, acting anonymously in background. In other circumstances, device 25 may play the role of community nodal device in transmitting messages from yet another radiobeacon (not shown) to the cloud host, the yet another radiobeacon belonging to yet another third party, and so forth. Thus network and computing resources are shared equitably based on a principle of "mutual reciprocity".

By limiting exchange of data between background and foreground resources of a nodal device, messages can be upswitched for redirection onto the higher power radioset of the nodal device without compromising the privacy of the owner of the radiobeacon from which the message originates. Messages are encoded in the radiobeacon and may be further encrypted by methods known in the art for some applications.

Embodiments of the radiobeacons of the invention are configurable by an individual user to help solve various problems, such as finding lost objects, monitoring pets or the activities of small children, hospital patients, and so forth. The radiobeacon is a comprehensive solution to locate and track missing pets, people, luggage, inventory, tools and items of interest tagged with a radiobeacon, and may also be used to alert users when there is a sensor output change, such as a very sudden jolt. In preferred embodiments the radiobeacon incorporates various sensors and control mechanisms that make the radiobeacon a versatile multi-function device which can remotely control other devices such as smartphones, tablets, or computers through the network 20, indirectly through a community nodal device 14 as shown here, or directly as disclosed in earlier filed U.S. patent Ser. No. 14/301,236, filed 10 Jun. 2014, titled "Tracking Device System". The exemplary system 20 illustrated here is instrumental in shaping and creating a market for the "internet of things" by allowing a user or network of users to seamlessly share sensor data and control remote devices, also offering the capacity to provide a regional, local, or global "picture" of environmental conditions such as temperature, traffic, and trends in a particular area, or simply a collaborative picture of all tagged dogs and cats active in a particular city neighborhood, venue or locale at a specific time, for example. The device functions with a single-button>multifunction interface (SBMFI) (e.g., single button 21a—operates to control command response based on rules linked to button press patterns, long, short, duplexed and operated with Boolean statements about other variables, such as time of day, day length, user profile, and weather forecast, for example, and go on from there). The tree can also be built with more trunks, each a button press on a keypad. In a keypad, more complex patterns can be encrypted, levels may be established, favorites may be encoded, all with only a rudimentary feedback pattern of confirmation, an LED as a mouseover (with the finger), a capacitive screen, a zoom gesture, and the like. Of course, browser screens could be the greatest return but the radiobeacon itself is intended as a lean selection of essential components for the needed power to performance ratio, so a minimalist approach is favored. Another approach is to add a companion and/or co-computing locus that includes a more expansive user interface (see FIGS. 14-18), and achieve a level of complex simplicity in operation of low energy network clusters and communities. Both approaches offer substantial advantages to the user, as does the SBMFI approach.

Figure 3:
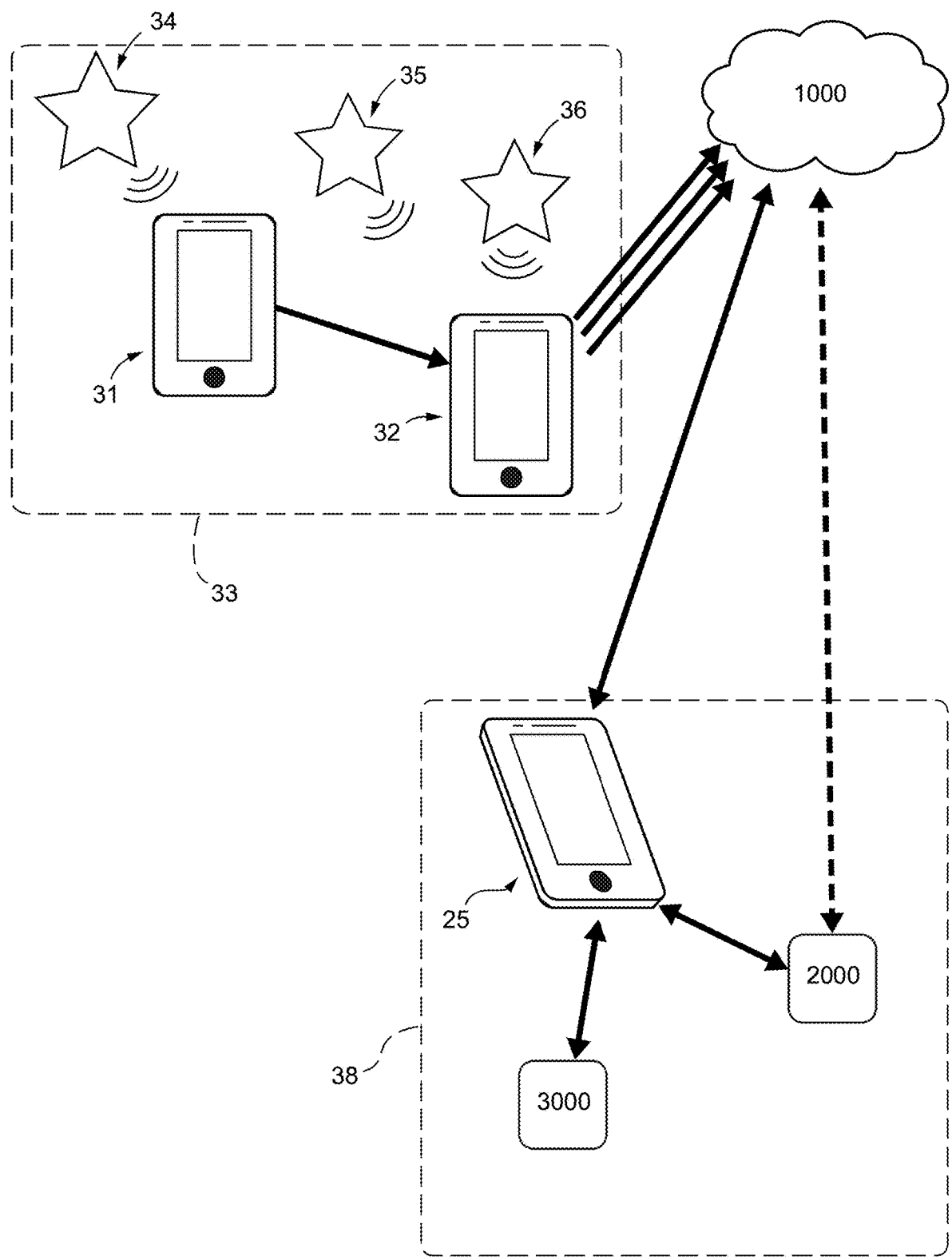
FIG. 3 is a schematic view of an exemplary network and system of a third embodiment of the invention.

FIG. 3 is a schematic view of an exemplary network and system of a third embodiment 30 of the invention. In this view, community nodal devices 31 and 32 relay messages from local area 33 (in which generally stationary radiobeacons indicated by stars 34, 35, 36 are positioned), to cloud host server 1000. Depending on the message, an actuation device 25 at a remote location 38 may be used to actuate machines 2000 and 3000. Alternatively, remote machine 2000 may be capable of directly receiving commands from the cloud host server (dashed arrow). The system uses background resources to carry radio traffic without using foreground resources of community nodal devices (31, 32) during radio encounters with any proximate radiobeacons (34,35,36). Because the messages are all short and condensed data structures that can be interpreted at lower machine levels, no inconvenience to user's results, and "system load" rebalancing is minimal. In network embodiment 30, nodal devices forward broadcast signals from multiple radiobeacon devices, as shown here, each message (parallel arrows) being separated from the next and being discarded after processing and transmission to the cloud host 1000.

Figure 4:
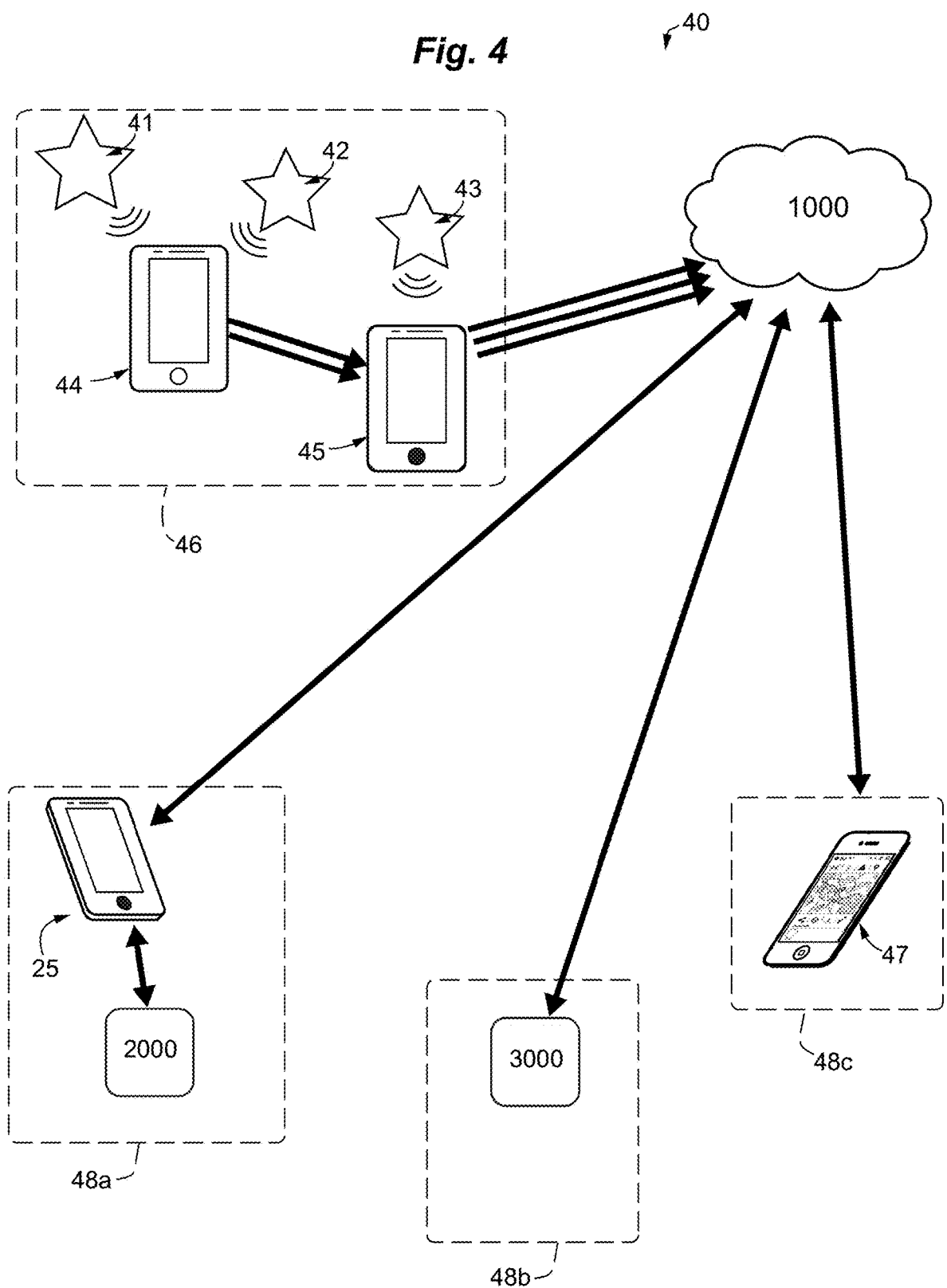
FIG. 4 is a schematic view of an exemplary network and system of a fourth embodiment of the invention.

FIG. 4 is a schematic view of an exemplary network and system of a fourth embodiment 40 of the invention. In this embodiment, stationary radiobeacon (41,42,43) traffic is relayed through an ad hoc network of nodal devices (44,45) in the local area 46. Qualified radio messages are forwarded to a cloud server 1000 and parsed, then commands or notifications are transmitted to multiple remote recipients according to owner and/or administrator rules and permissions. In each instance, the command can result in machine actuation (2000,3000) or in a display 47 at remote locations 48a, 48b, 48c, respectively. Actuation device 25 functions as a remote controller for machine 2000. The cloud host directly controls machine 3000. Thus the system and network architecture uses a combination of radiobeacons and smart devices to manage tasks for one or more owners and for community members at large.

In this instance, messages from radiobeacons can be relayed in a series of hops from a first nodal device 44 to a second nodal device 45, but at some point are picked up by a broad area internetwork portal and routed to cloud host server 1000. A plurality of radiobeacons, a plurality of nodal devices, a plurality of cloud servers, and a plurality of machine effectors or actuation devices may be involved in any active system cluster 40.

Figure 5A:
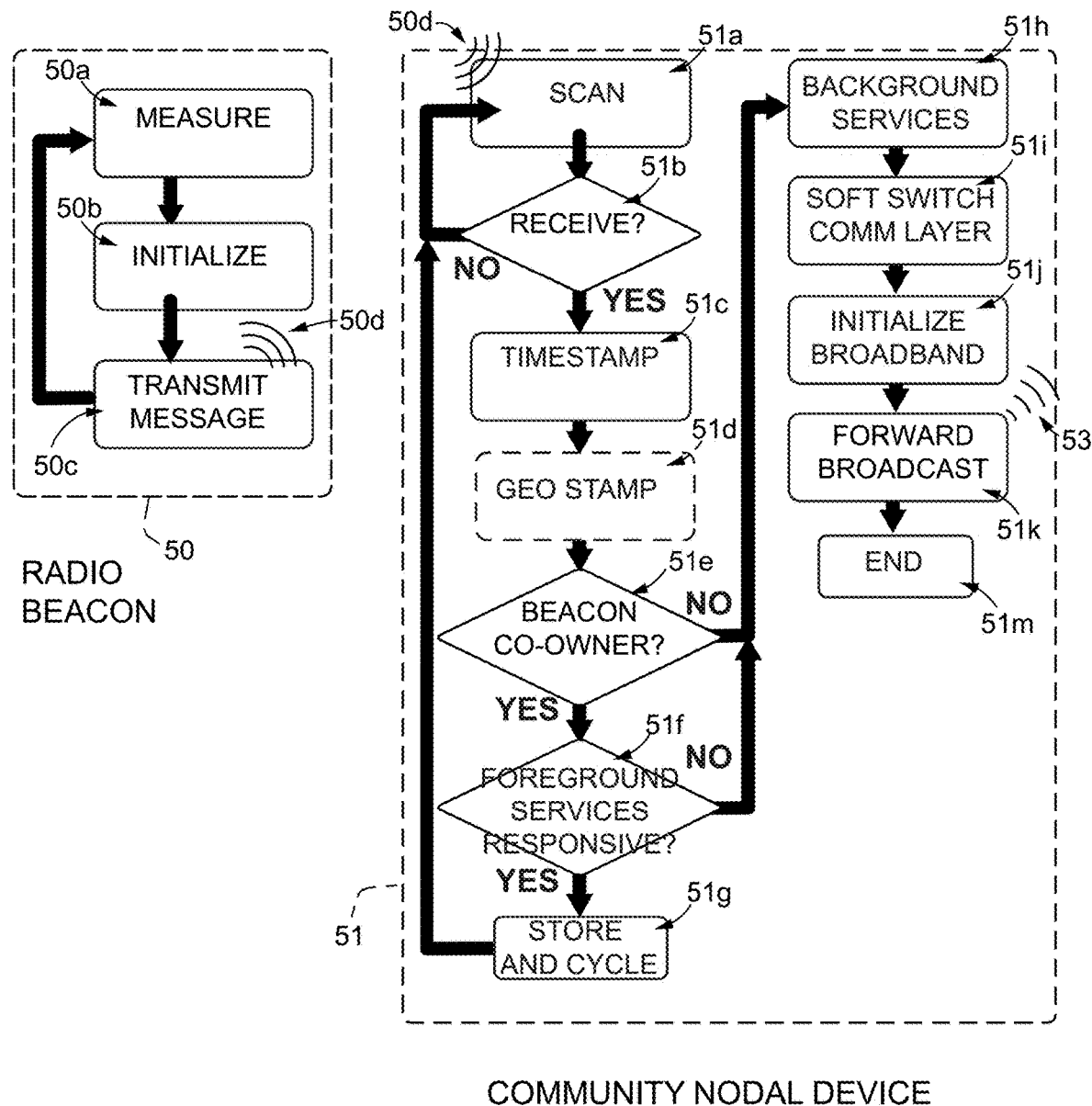

FIGS. 5A and 5B (two paired sheets) show a block diagram of a more general method of deploying and using an exemplary system of the invention. Represented in a first box (dashed outline) are rudimentary functional blocks (50a,50b,50c) corresponding to sensor measurement, initialization, and broadcast from radiobeacon 50. In step 50a, a sensor output is generated. Typically the sensor is an onboard sensor unit or a sensor package. These steps may be repeated at any interval dictated by the needs of the user and by context, or may be initiated cybernetically in response to a trigger such as a change in a sensor value above a threshold. Current generations of radiobeacons may broadcast messages at ten millisecond intervals, thirty second intervals, or any convenient time—as when in proximity to a nodal device, for example, and operate as limited resource computing devices capable of simple repetitive actions.

"To measure" (i.e., "measuring") is an operation 50a having the quality of digitizing a contextual condition or event and can be as simple as a step for determining whether a button is pressed and held or not, or an operation such as collecting and digitizing a photocell output, which may include steps for amplifying and filtering as needed, or more complex operations such as providing a memory component and instructions for determining a measurement change over an interval of time.

The measurement data is then incorporated into a message through an initialization operation 50b in which a preamble and any message formatting is performed. The broadcast is then sent 50c via a low energy radio module, and the process is iterated as needed or directed. Compatible devices in radio proximity may receive and decode the measurement data in the radio broadcast 50d.

The sensor unit or package is in electrical contact with circuits for basic processor functions and program execution. A simple processor may function as an "encoder" for initializing a message, in which a digital radio signal is "loaded" with the sensor data while conforming to an underlying radio communications protocol format (as disclosed earlier in U.S. Prov. Pat. No. 62/175,141 filed 12 Jun. 2015 titled "Devices and Network Architecture for Improved Radiobeacon Mediated Data Context Sensing", which is co-assigned and co-pending). A radio emission by a radiobeacon that carries a sensor data payload is termed a "message".

Next in the figure, nodal device (51, dashed outline) is represented as a series of functional blocks, including steps for transmitting a "broadcast forward" 53 containing the message to a cloud-based administrative server or cloud host 1000 (continuing in FIG. 5B). The nodal device includes a transceiver for scanning 51a and receiving low energy radio signals. The scan function is represented as an iterative loop 51b. When a qualifying radiobeacon message is detected (YES), the signal is timestamped 51c and optionally geo-stamped 51d.

If owner identification information associated with the radiobeacon message is associated with the owner of the nodal device (51e, YES), the message is conveyed to foreground services for immediate action or processing. The message is processed, stored in memory 51g, and any action appropriate for the message is taken. The process of scanning 51a and capturing 51b radio transmissions repeats.

If not (51e, NO), software of the invention preempts normal operation of a nodal device, which is to discard unrecognized signals. Instead of discarding the message, the message is preempted and processed in background services 51h. Background services are an ad hoc organization of hardware resources needed to shunt or "upswitch" the message to a broad area network radio transmitter for broadcast forward. Preemption is triggered when the radio signal is identified by a software application of the invention as a message from a qualified radiobeacon but the ownership of the message is not recognized by the nodal device.

Beginning at 51h, those messages not meeting the common owner test 51e are handled anonymously in background services. The message is switched 51i to a communications layer or stack in the device, initialized 51j for broadband transmission to an internetwork-compatible receiver, and forward broadcast at 51k. The message is then discarded and the process ends 51m by clearing background resources. This process, including structuring of a "soft switch" at 51i, is directed by a software application supplied to users of the inventive system. Soft switch 51i switches the message from a low energy radioset in the nodal device to a broad area radioset in the nodal device, the latter operating with protocol communicatively compatible with an internetwork portal and network architecture. End function 51m is generally conducted by existing machine functionality in the nodal device. Nodal devices are constructed to discard (i.e., "dump") unrecognized low energy radio signals and to record and store owner-recognized radio signals in memory for processing. A variety of permissions and policies control the "dump" function. The software applications of the invention are executed so as to preempt and re-route signals recognized by the application as "messages" to soft switch 51i. The soft switch has been created to broadcast forward those messages to a designated cloud host server. Although the nodal device 51 discards and clears the message from local resources at 51m, the forward broadcast 53 is transmitted at 51k to network 1000 for processing.

Furthermore, if foreground services are not responsive (51f, NO), then the message may be processed in background services in the same way as an anonymous message. The nodal device can be programmed so that owner will receive a push notification, including a command to open a screen on the user interface, depending on priority and context associated with the owner's identification or preset instructions as known to the cloud host. Essentially the owner gets a second opportunity to receive and see the message from a co-owned radiobeacon. Alternatively, even if the owner is unresponsive, the cloud host may be preconfigured to aggregate the message contents, such as any sensor payload, for later retrieval. The cloud host has access to other messages, and may also aggregate message 53 with messages from other community members, forming a larger picture that the owner of the radiobeacon can later access.

Forward broadcast 53 is captured by an internetwork portal and routed as per standard IP protocols to a designated cloud host 1000 operated by the system administrator. Each incoming message is parsed for content, including owner identifiers, sensor content, including any location information derived from the radiobeacon (many are in fixed locations) or from a geostamp applied by the nodal device. Location may be further deduced by the server from a pattern of contacts of nodal device 51 with proximate radiobeacons or nodal devices having geostamping capability that emulate radiobeacons.

Cloud host server (dashed box, 55) is a fully resourced computing environment for establishing rules-based policies and permissions. The server includes user accounts and at least one database 54 for storing owner information, parsing incoming messages, and processing or aggregating data. Aggregated data is used in making context-based decisions on behalf of individual users or on behalf of user communities according to rules established by the community and the system administrator.

The cloud host server may be accessed with a graphical user interface or through an application program interface, and includes an administrative interface for maintenance, subscription management, and quality assurance. Typically, the server is accessible through a dedicated web site, and may be able to publish and transmit web pages to individual users or communities of users in response to a query or command. Relational databases may include user profiles and aggregated data and may be dis-identified to protect identities of individuals where release of that level of detail is inappropriate. The system may also include a distribution server for installing the software application, which will typically include instructions for upswitching community messages and instructions for pushing notifications and for accessing the administrative server for account setup and maintenance.

The broadcast forward 53 is first parsed 55a for owner identifiers, sensor data in the original message payload, and any timestamp or geostamp in the broadcast. If the originating radiobeacon is owned by a co-owner of a nodal device (55b, YES), a command response or notification 56 may be initiated directly to the owner through either a wireless IP mode or a landline. If the sensor data is such as to actuate a trigger 55c for a defined action, the command response 56 will be given accordingly, either as a command or a notification. If any context, including the realtime merger of events and conditions that envelop the message, dictates 55d a modified decision, the response 56 will reflect the context to the extent permitted by policies established by the owner of the beacon and any global policies or prohibitions exercised by the administrator of the system. Messages may be re-routed as appropriate. While not shown, more than one internetwork server may be recruited for making a response. Thus the cloud host has the capacity, for example, to perform searches and to incorporate search data before issuing a command or notification 56.

Communications with client devices and machines are frequently bidirectional. Responses may be logged and stored 55e along with the initial commands and notifications for later retrieval, for use in tracking lost items, and for other aggregative uses. Several examples of applied uses are provided at the close of this section. The cloud host server will generally complete a process of responding to an incoming message and then stop 55f until another message arrives, but may be programmed to refresh its command executions at desired intervals, or when conditions change, or on selected calendar dates, for example. Thus the location of a friend can be reported on the occasion of a birthday, for example. The uses increase exponentially as the internet of things (IOT) expands.

In a final step, illustrated in dashed box 57, the cloud host server 55 transmits or otherwise conveys an actuation instruction 56 to a machine effector and/or actuation device (indicated collectively in exemplary variants). The instruction 56 may be conveyed to an "effector machine" or an "actuation device". These are generally smart machines having a limited but sufficient level of signal recognition and computing capability to perform a transformation in a physical sense, such as opening a garage door, turning off a stove, steering a driverless vehicle to a preselected destination, updating a display to show a map, or initiating a telephone call to an emergency responder when a strong jolt is detected by an accelerometer and gyroscope sensor package, and so forth. In some instances, the cloud host administrator will reserve action, or will aggregate data over time or geographical area before initiating an action. These and other features allow the operator of the system flexibility to initiate actions according to a broad range of contextual information and to learn by observing historical, geographical, and diurnal patterns, for example.

Effectors and actuators 57 include remote machines 3000, that may be operated directly as described already, or indirectly through a controller 4000, and may also include smart actuation devices 25 generally, whether addressed to individuals or to communities of users, and may also include other types of actuator devices 2000, where the object is to take an action and end 57b until further instructions are received. Chains of active machines having a sequence of actuation may also be engineered using the systems and network architectures of the invention.

Figure 6:
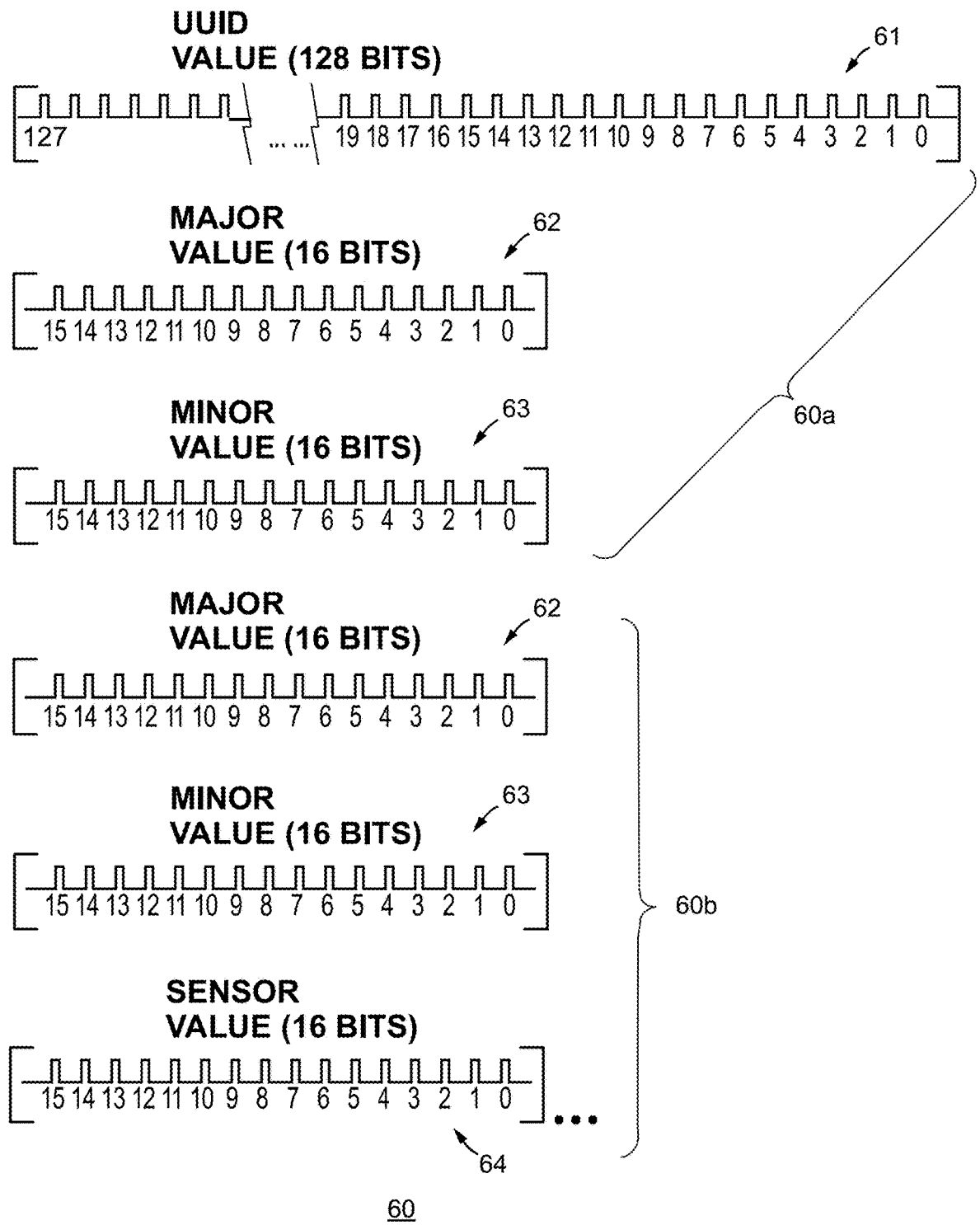
FIG. 6 is a bit diagram figuratively showing the structure of a message.

FIG. 6 is a bit diagram showing the digital structure of a first message 60a and a second message 60b streamed in series, the two parts making up a full digital radio signal 60. The second message includes a sensor payload 64, repeats major and minor values (62,63), but does not repeat earlier broadcast identifier 61. In this example, a radiobeacon is configured to emit an extended message that includes its UUID (61, generally a unique 128-bit word registering the make, model, and serial number of the radiobeacon device, as is sufficient to assign ownership), any major and minor values (62, 63), as can be indicative of location, sublocation, including owner secondary identifiers, generally in a highly structured format. The bracketed frames are representative of digitized data as formatted in a bluetoothed message. Sensor payload 64 may be transmitted in a second message 60b, shown here as a sensor value having sixteen bits in a frame in this example. Added sensor data may be streamed by appending concatenated message parts formatted as shown. The bits are numbered for illustration, but any number of bits in a frame are contemplated, including bits from 4 to 8 to 16 to 32 to 64 without limitation thereto. The bitstrings of each frame may be organized as bytes, but are more typically termed "values". Additional frames may be used, as indicated by an ellipsis at the lower right, to stream additional data. Added serial messages may be streamed each for example with realtime sensor data or with data from other components of the sensor package housed in the beacon. Alternatively, sensor data may be "stuffed" into the primary frames of the first message as illustrated and discussed with reference to FIG. 19.

Communications must follow a format standard. Bluetoothed format is one such coding language. In some variants, the host device or base station is configured to transmit relevant configuration information to the radiobeacon in order to tell that radiobeacon specifically what configuration of command language is needed. This can be implicit (e.g., the nodal device receives the preamble and UUID values received from the radiobeacon and enters a database or other source of information to determine a proper command protocol for the various subsystems of that particular radiobeacon, or explicit (e.g., where the radiobeacon explicitly instructs the nodal device what protocol to use, or even provides a communication properly formatted and with an appropriate preamble so that the receiving device is prompted to run a particular application in order to invoke the desired message handling operations. For example, radio emitters may be designed to emit radio signals according to a bluetoothed low energy interface standard such as the Eddystone protocol, and/or an iBeaconed communication protocol standard as known in the art, and may also be configured to emit radio signals according to data structures of the inventive network architectures and software applications.

Figure 7A:
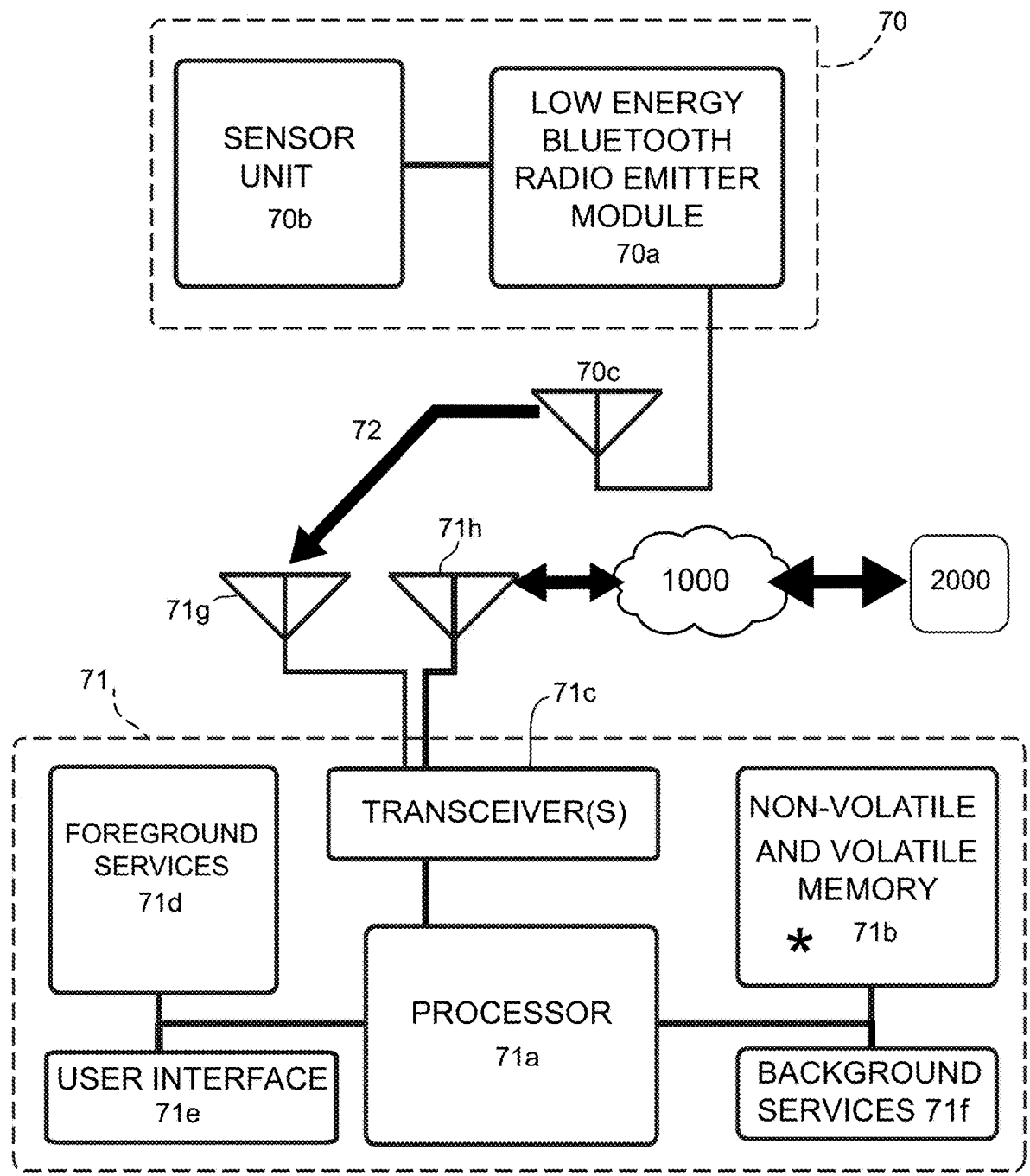
FIG. 7A is a block diagram of functional components of a radiobeacon having limited computing resources in radio communication with a compatible nodal device, the nodal device having a processor and application for receiving a radio signal loaded with sensor data and switching that signal to a broad area network.

FIG. 7A is a block diagram of functional components of a "limited-computing-resource" radiobeacon (dashed box, 70) and a compatible nodal device (dashed box, 71) in one-way radio communication where indicated by arrow 72. Typical nodal devices are provided with a processor 71a and an "application" (*, indicating resident processor-compatible instructions in memory 71b) for receiving radio signal 72 and for upswitching it to a transceiver 71c having power and frequency configured for broad area radio transmission to a cloud host 1000, also termed here a "broadcast forward".

Radio emitter module 70a of the radiobeacon loads sensor data from sensor unit 70b into a radio signal and emits message 72 on antenna 70c. The loading function may be performed by a software encoder programmed within the emitter module, which functions as a microcontroller with on-board non-volatile and volatile memory (not shown). The message is configured to contain an identifier value (UUID) and a payload of digital sensor data. Optionally one or more of the sensor data values may be insertedly encoded in the standard frames of a bluetoothed low energy radio protocol by overloading a frame as is described later with reference to FIG. 19. The encoder function may be integrated into the radio emitter module and is implemented using software or firmware or a combination of both. Radiobeacons may be battery powered or otherwise powered as known in the art.

Typically, these radiobeacons will operate at about 2.4 GHz or/and about 5 GHz, depending on the jurisdiction. For most purposes, only the 2.4 GHz band is used, and the two bands will be considered to be "one band" dedicated to bluetoothed protocols unless otherwise distinguished. With respect to nodal devices, multiple bands may be available for communicating to a broad area network through any compatible telecommunications system, including cellphone networks, and wired networks, or combinations thereof. These multipotent networking devices will be considered to be operating with one broad area frequency or band, merely for conceptual simplicity, the details of which may vary with regulatory jurisdiction.

In the networks of the invention, a soft switch configured in a nodal device by a software application of the invention provides the needed machine configuration to upswitch radio signals from a bluetoothed low energy radioset to a broad area radioset. The software is configured to facilitate sharing of radiobeacon signals with nodal devices that in turn may "upswitchingly transmit" data received from the radiobeacon to a broader network (optionally including multiple nodal devices), and thus serves as a mobile access point for forward broadcasting of messages to the Internet at large. In special circumstances, radio signals may be "downswitched" from a broad area radioset to a bluetoothed low energy radioset equipped with a receiver.

Nodal device 71, shown here schematically, switches signal 72 to a longer range transceiver 71c and network for delivery to cloud host 1000. The nodal device may include the following functional blocks: transceiver(s) 71c; processor 71a, memory 71b, foreground services 71d (often a mix of software and firmware); a user interface 71e; and background services 71f. Background services typically involve commands and function calls to lower machine and link level stacks or routines built into the machine hardware, typically lacking any direct user interface capacity. The device also includes two antennae: 71g and 71h. Antenna 71g receives signals 72 from low energy radiobeacon 70. Antenna 71g may also emit beacon-like signals advertising its own proximity. Antenna 71h is a higher power, broad area antenna configured for sending and receiving signals to a cloud host, and may use wireless systems or a cell tower network at radio frequency bands as jurisdictionally established. Additional antennas may be used as required and in some instances may be successfully combined in a single antenna package.

The switch is typically a "soft switch" and is implemented by software (*) executed by the processor of the nodal device using background resources. However, firmware may be used to supplant or supplement software in devices having integrated circuits capable of automating the required instruction set in a solid state pattern of logic gates and memory circuits. An ASIC is particularly favored for larger volume deployments of community nodal devices, but software is favored for installing into existing network and devices or when periodic across-network updates are anticipated.

At the cloud host 1000, generally the sensor data is extracted from the message using software developed to administer user needs. Relational databases may also be used to store data and detect changes or trends in the data. Based on ownership privileges, rules-based instructions, and context, the cloud host server will transmit a signal to a remote machine 2000 or other actuation device as warranted.

Nodal device 71 may be a stationary "hub" or a mobile device such as a smartphone and may be equipped with a portal to the Internet, an internetwork, a wide area network, or a local area network with Internet option, either wired or wireless; in this instance a wireless transceiver with antenna 71h is shown. Hubs are described in U.S. patent application Ser. No. 14/301,236, said patent application being co-assigned and co-pending. Processor 71a is configured to read and execute an application (*) or applications from non-volatile memory 71b and to receive and process the radio signal 72 as received on antenna 71g and amplified by transceiver 71c. Depending on the contents of the radio signal, particularly with respect to any contextual data encoded in the signal or known to the system, the processor will issue an instruction. For example, if co-ownership is recognized by the system, the foreground services unit 71d will push an alert or a notification onto the user interface 71e. This is often the case for hub installations in a private home or office. The device may also include a policy controller that controls foreground functions according to permissions set by the user.

The sensor unit or package 70b may include one or more sensors. Sensor output to be encoded in a frame or frames for transmission may include temperature, light intensity, smoke, voltage, sound, motion, displacement, acceleration, humidity, pressure, radiation, button-press event, compass direction, daylight levels, traffic levels, noise levels, NOX levels, ODB reports, and unusual noises such as gunshots or sirens, or self-reporting, such as reporting a low battery level, or other stimulus or sensor data, without limitation thereto. In some embodiments, sensor data may also include a combined multi-axis motion sensor and temperature sensor integrated into a BTLE radio emission module 70a, which includes an accelerometer, a gyroscope, and a magnetometer for each axis. Sensor power is commonly derived from the host, but in selected applications, a separate power supply may be provided.

FIG. 7B depicts a more complex system with a radiobeacon (top, 80) and the nodal device (bottom, 71) described in FIG. 7A. In this instance, however, both the radiobeacon and the nodal device have capacity to execute program instructions and have bidirectional radio capability represented by radio signal 73 (double headed arrow). The radiobeacon is configured with added processing capacity 80a, including a dedicated signal encoder 80b, non-volatile memory capacity 80c for storing an instruction set, and an independent power supply. The radiobeacon is also provided with a sensor unit or package 80d. The radio module 80e of the radiobeacon is for example a bluetoothed low energy radio transceiver and is adapted to convert radiobeacon identifier and sensor data from sensor unit 80d to a transmission "message" using encoder 80b. Signals may be transiently stored in volatile memory as needed. One or more receive and/or transmit amplifiers may optionally be used to amplify signals received or sent, as known in the art, but the transceiver is typically a low energy transceiver as used here to advantage for qualifying radio contacts limited to a discreet local area.

Both the radiobeacon and the nodal device include a radio transceiver (80e, 71c) capable of receiving and transmitting low energy radio signals, but the nodal device includes a second radioset 71c for transmitting and receiving at higher power over a wireless wide area network. While each device includes compatible antenna (80c, 71g) for low power inter-communication; the nodal device will also include a longer range antenna 71h for sending and receiving signals to and from a cloud host server 1000 on a broad area internetwork.

The cloud host 1000 may then transmit or otherwise convey an instruction to a compatible remote device, shown here as an actuation device 25, a smartphone under control of user 85 for example, having capability to transform something in a physical sense, such by displaying a location of a lost cat or lost keys on a map of the neighborhood, or sounding an alarm, or displaying a reminder message from the cloud host server every Friday.

The exemplary radiobeacon 80 of FIG. 7B further comprises supporting circuitry that is adapted to perform programmed instructions from memory or as supplied in firmware. Memory 80c also includes one or more storage devices capable of storing bits of RAM data. Thus these radiobeacons 80 provide a richer computing resource environment when compared to the more limited resource radiobeacons 70 illustrated in FIG. 7A. The sensor module may include one or more sensors as describe earlier, and may be capable of doing periodic data dumps in conjunction with memory, plotting trends, or detecting threshold levels. Generally however, these advanced functions are contained in the cloud host server, where the computing resources are larger.

Nodal device 71 may be a stationary "hub" or a mobile device such as a smartphone and may be equipped with a portal to the Internet or a network, either wired or wireless; in this instance a broad area wireless transceiver with antenna 71h is shown. Hubs are described in U.S. patent application Ser. No. 14/301,236, said patent application being co-assigned and co-pending.

Memory 71b in the nodal device 71 is typically larger than that of a radiobeacon. Memory includes any combination of volatile memory and non-volatile memory (for example, DRAM, SRAM, flash memory, SIM, EAROM, EPROM, EEPROM, and/or myriad types of other memory modules).

The nodal device is provided with a clock (not shown) so that radio contacts (including cellphone tower contacts) can be timestamped for storage. Optionally, incoming data such as photographs may also be geostamped if the device is provided with a global locator. The processor 71a capability may include a subroutine for transmitting GPS coordinates from a GPS receiver to a cloud host over a cellular or other wireless interface. For forward broadcasting, any location data may be associated with the sensor data payload in radiobeacon message 73. The processor is further adapted to execute one or more programs which, upon detecting a specific control signal, modify the functionality of the radiobeacon (or vice versa) according to the type of signal detected, or alternatively, by the contents of the signal provided (e.g., sensor data and identifiers embedded within the radiobeacon message, as described elsewhere herein). In one embodiment, once the nodal device functionality has been changed according to a governing policy or multiple policies, actions such as push notifications (generated by foreground services unit 71d) may be performed without a direct request from the owner of the host device. The foreground services module has access to a user interface 71e and may be configured, using applications and systems of the invention, to display or announce alerts in response to triggers, threshold levels, or signatures contained in the sensor payload received from the radiobeacon, either directly or indirectly (as via a server in receipt of the radiobeacon sensor payload and having programming capacity to craft notifications directed to particular users based on that sensor data, including input stimuli generally, and other data in one or more relational databases, for example).

Radiobeacon messages not addressed to the owner of the nodal device (i.e., addressed to a third party) are handled by background services unit 71f. These features generally require some degree of programming that may be executed by the host processor after the needed software application (*) is installed in the nodal device by accessing a distribution server or other program distribution methods known in the art. Alternatively, the instruction set may be accessed through computing resources in the cloud, although this is less resource parsimonious.

In some instances, the nodal device 71, the radiobeacon 80, and an actuation device 25 are owned by a common owner 85. According to permissions by the common owner, nodal device 71 will shunt services to foreground services 71*d* if possible, and that failing, will forward broadcast the message to device 25. In the case of nodal devices 14 controlled by third party users, as shown for example in FIG. 1, will switch messages to broad area radio transceiver 71*c* and antenna 71*h* for broadcast to cloud host 1000 as a background service implemented by the software application (*) in memory.

Generally, as part of nodal device processor functions, a "policy controller" comprises logic adapted to control signals received from connected devices and is implemented as one or more software routines resident in one or more memory sources and executed by the processor. In other devices, the policy controller may take the form of a network controller. The policy controller comprises logic adapted to store information pertaining to designated policies. For example, a given policy may require muted ringers and reduced lighting when a wireless device is determined to be in a certain zone, as triggered by a sensor data input from a radiobeacon. Some policies are implemented in the foreground services module 71*d*; others in the background services module 71*f* or in lower logic sub-routines and levels of machine function.

Also, in many embodiments, a policy controller facilitates the transfer of one or more control signals or commands to a network of devices. In one variant, the message signal comprises a command disposed within the message frames as formatted in 802.11 WiFi Interface protocol. In other variants, the radiobeacon message may comprise a plurality of vendor-specific information or data elements which may be used to convey policy information to a smart device. It will be recognized, however, that other software-enabled approaches for communicating with community nodal devices may be used as is consistent with the invention, including for example use of bluetoothed communications signals, or cellular forward/reverse traffic or control channels, etc. as applicable. These capabilities are commonly encountered in "smart devices", including those used here as nodal devices for information switching from one network to another.

FIG. 8 is a schematic view, showing an exemplary computer-implemented system 900 for servicing an owner in need of conveying a command or notification to a remote machine or actuation device in response to a sensor data payload from one or more radiobeacons. This description supplements but does not limit the remaining figures and specification. This exemplary system demonstrates a radiobeacon 34, a community nodal device 14, a cloud host 1000, and an owner's personal device 911, optionally being operated at a distance to actuate a remote machine 2000. Surprisingly, the system operates without any involvement of an individual owner 85 and can perform simultaneous operations on behalf of the owner and other community members, engineering sharing of the needed computing and sensor resources from multiple devices.

Implicitly, the coordinated implementation of a system of the invention requires that appropriate instructions be provided, thus the invention also includes software components stored in memory and accessible to a processor as needed. Beyond that, the network and the owner's smart device all function without intervention by, or exposure to, an operator; i.e., the system can function essentially autonomously. The final recipient or owner 85 of the radio message is essentially entirely relieved of the operation of the system (except during setup and when instructions are input on a personal smart device, 911). As embodied here, the system requires no direct human involvement in making the low energy radiobeacon transmissions, in upswitching a message using a community nodal device 14 as a proxy, or in processing the amplified message, context, identifier, and sensor payload by the cloud host, administrative server, and administrative database. Thus any command to an effector machine or actuation device 3000 is entirely automated and is handled by smart logic implemented in the system at several levels.

Beginning at the top of FIG. 8, a stationary beacon 34 broadcasts 902 a radio signal with sensor payload. A community nodal device 14 captures 904 the radio signal and begins processing by comparing the identifier in the message with identifiers associated with the owner of the nodal device (i.e., its owner). These nodal devices are frequently smart phones and rely on identifiers to distinguish traffic addressed to their owners from anonymous transmissions that are frequently encountered in the sea of radio transmissions around them. Incoming radio traffic is typically discarded 899 by conventional devices if the owner of the message is not recognized.

The invention changes that, preempting radio signals for forward broadcast in background. Low energy radio signals having a radio signal identifier are no longer discarded (X). By installing and operating an application of the invention (or a firmware equivalent thereof), radio signals received from anonymous devices are instead identified by characteristic messages identifiers as belonging to a broader class of community members. The nodal device is restructured by the application to organize nodal device hardware, stacks and layers into a "background services unit" having capability to detect, receive, amplify, and upswitchingly compose and transmit qualified radio messages to said cloud host according to rules implemented by the application. The restructured device includes a "soft switch" for shunting qualified radio messages to a broad area radioset for forward broadcast.

A decision tree 905 is shown. First, "YES", if the owner of the radiobeacon 34 is associated with the owner of the nodal device 14, then the radio signal processed 906 by the foreground services unit of the nodal device. If the owner's response is confirmed (907, as can be merely an unlocked screen or a ringtone in foreground services, any response that engages a graphical user interface or an automated foreground process), then the message is logged and stored 909 according to protocols established by the owner. Because foreground services are involved, the owner 85 may directly participate. Workflows 908 through 911 are bidirectional in that the user may directly control the process. Typically an action is taken 910 and the process ends. The user need not be directly involved but can later access the transaction. The message, timestamp, and any action taken is recorded in memory on the device 14.

On the other hand, ("NO", 905) if the identifier in the radio signal is not associated with the owner of device 14, then the message is processed by the "soft switch" of the invention and (instead of being dumped 899) is upswitched 920 as follows: Hardware connections are restructured to direct the message to a broad area radioset, restructuring or "encoding" it to conform to an internetwork compatible communications protocol (such as by adding a preamble and a routing address), while retaining the original message content. The radioset amplifies the message and forward broadcasts it on a dedicated antenna 922 so that it may be picked up by an internetwork portal and relayed to a designated cloud host 1000 from essentially anywhere around the world. The application is also configured to add any timestamp, proximity measurement, or geostamp generated by the nodal device to the radio signal and to compose a qualified radio message before it is amplified and upswitchingly transmitted via the broad area radioset to the cloud host.

Because the message is not presented to foreground services, it remains anonymous, and is neither displayed nor stored on the community nodal device 14. Although the incoming message may be augmented with a timestamp and even a geostamp from the receiving nodal device, the message is not stored and is not retrievable on a user interface—so as to preserve privacy and prevent accumulation of clutter. After all, the design of the inventive system is such that de minimus resources are borrowed or shared in background to achieve a community service, hence any unneeded function that would be an added burden on the owner's device is avoided—e.g., clearly, using any permanent memory resources would not be needed. While RAM memory is often needed for background stack execution, the memory is either wiped or written over after the upswitch and the broadcast transaction 924 is completed.

The upswitched message is transmitted through cloud host 1000 to a remote machine 911. In the cloud, under control of an administrative server 924, the message is logged, parsed to retrieve the message contents, and any context, identifiers, including UUID and major and minor values, plus any sensor data payload, including concatenated streaming sensor payloads structured as described in FIG. 6, are processed. Rules-based associations are made, typically using a relational database or other intelligent processing capability.

Associations may be limited to owner-associated context and rules, or may be expanded to include rules for parsing data in the context of aggregated data such as location, time of day, or issues of community interest such as microarea weather events, vehicle accidents, community events, disturbances, including earthquakes, fires, and so forth. Thus both personal notifications and commands and community-directed notifications and commands may be generated by the server. Example of community-directed notifications include summoning of first responder assistance or increasing light levels on a street at night in a particular block; an example of a personal command includes a command to map directions to the location of radiobeacon 34. In this respect, associations based on proximity and chronicity with respect to location and time are likely to serve as context for any actions implemented by the system host.

In this exemplary system, if the owner's response is not confirmed, a command or notification is broadcast or otherwise transmitted 926 to a personal device 911 operated by the owner of the message. This may take the form of a notification or may result in execution of a series of instructions. The owner's device may also actuate a peripheral 3000, and may cause execution of commands, causing direct actions such as to turn down a volume control, respond to an email, lock a vehicle, open a garage door and so forth, before ending 928. Direct contact 912 with the owner 85 is not a precondition for taking action, although the owner may set up a policy controller to monitor any commands and receive sensor data in the form of a graphical or audible display on a user interface. Summaries may be announced using voice synthesizer technology known in the art.

For those messages belonging to the owner of device 14, if foreground services 906 are non-responsive or not available, such as being "out of service", or if the owner's confirmation 907 is insufficient according to rules established in the administrative server, this invokes an alternate or secondary pathway. Message processing is preempted 930 by the application running in device 14. Again as a background process, relying on background services and hardware layers of the nodal device, the message 931 is upswitched 922 and a communicatively compatible internetwork version of the message, having the original message content addressed to a cloud host 1000 or hosts, is broadcast with amplification on a broad area radioset, such that it is picked up 924 by an internetwork portal and relayed to the administrative server 1000 of the system. The system evaluates according to rules and contextual information available to it, and actuates an alternate owner's device 911, either to deliver a notification or to cause local commands at home, at the "nest" site, or at a work location, to be executed. The sequence ends 928 when action has been taken. The owner's direct participation in the sequence is not required; but the input and outputs are logged and may be accessed by the owner from any device capable of accessing the administrative server. Thus the system acts as a personal assistant to the owner, taking care of issues that the owner may be unable to, or chose not to, personally attend to. The details of the action(s) taken are dependent on contextual information available to the administrative server 924 and any instructions and permissions set up by the owner.

While the owner's device is depicted figuratively as a smart device 911, any device capable of receiving digital commands may be operated and controlled in this way. In some instances, the smart device may have sufficient machine capability to execute a command without involvement of a peripheral 3000. For example, the smart device may be able to take a picture, or respond 925 by sending a location to the cloud host server, and so forth. Thus if the owner's response is insufficient because the device is lost, the cloud host may be programmed to command actions that will assist the owner in finding it. Numerous examples may be given of uses for the systems of the invention.

Figure 9A:
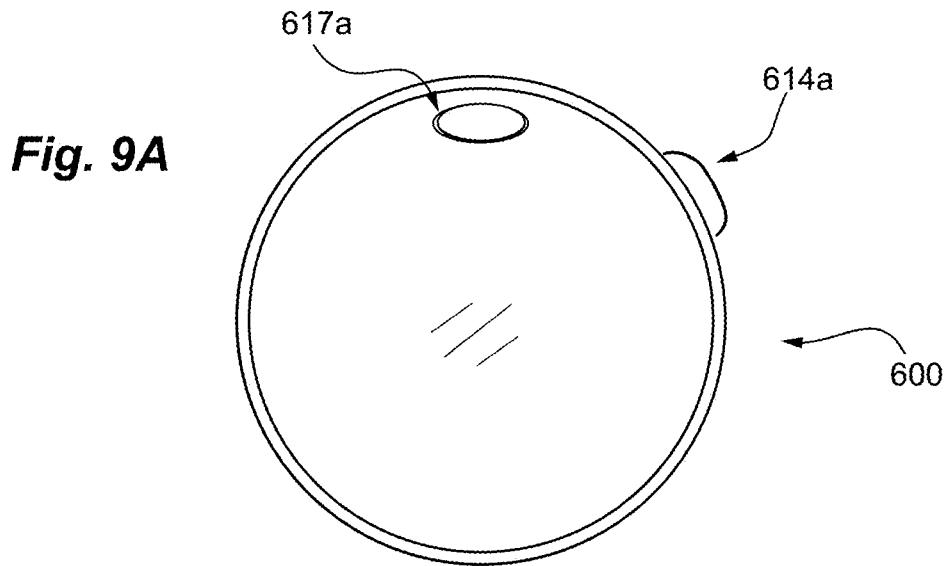
FIGS. 9A, 9B and 9C are plan and perspective views of an exemplary radiobeacon configured for use in the inventive systems and networks.
Figure 9B:
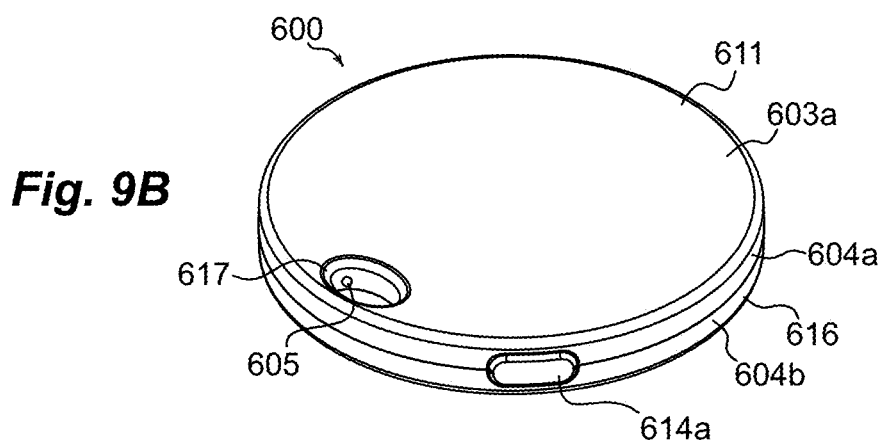
Figure 9C:
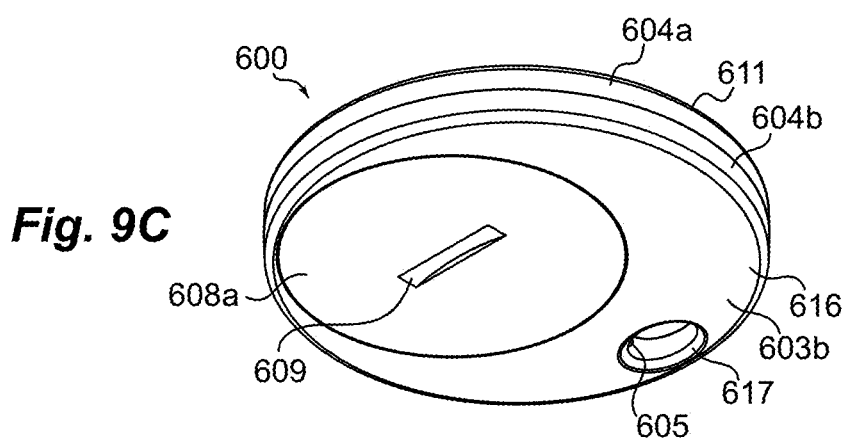

FIGS. 9A, 9B and 9C are plan and perspective views of an exemplary radiobeacon 600 configured for use in the inventive systems and networks. FIG. 9A identifies a radiobeacon with disk-shaped body, an edge-mounted button switch 614a, and a cord orifice 617 such as for securing the radiobeacon to a keychain or to an object in need of monitoring. FIGS. 9B and 9C are illustrations in perspective showing front and back features of a representative radiobeacon device 600. Incorporated by reference is U.S. patent application Ser. No. 14/301,236 titled "Tracking Device System", where further description is provided.

The radiobeacon 600 is an assembly having outside clamshell housing pieces 611, 616. The covers are made of glass filled acrylonitrile butadiene styrene (ABS) thermoplastic which is light in weight, can be injection molded and is resistant to impact, heat, water, acids, alkalis, alcohols and oils. The housing typically is partially translucent, and permits light to enter and exit one or more surfaces. The top and bottom clamshell housing pieces 611, 616 have circular-shaped bodies 603a, 603b, each with an annular wall 604a, 604b. The covers also form a through-hole 617 for receiving a cord or chain to attach the radiobeacon to an object, a pet or the clothing of a person. Sealing bung 605 inside the cord hole 617 prevents moisture from entering the internal cavity inside the radiobeacon housing. This is a vent for assembly and is closed after the body is sealed shut.

Multifunction button 614a is operable to perform one or more functions according to context and history. The button operates with one or more control programs resident on a host device during setup of alarms, to pair triggers, and if so enabled, to remotely control operations of the host device.

Figure 10A:
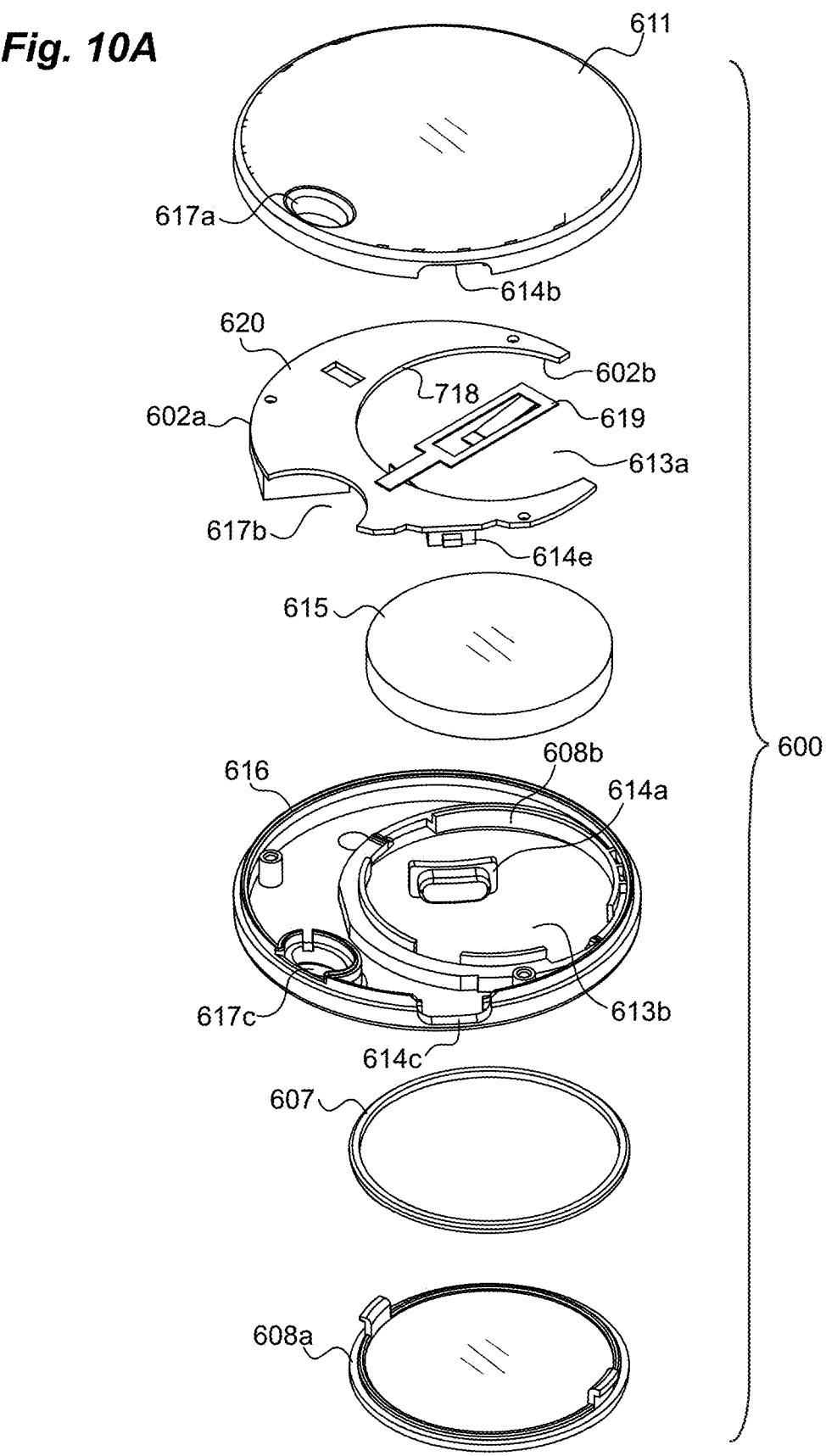
FIGS. 10A and 10B are exploded views of an exemplary radiobeacon configured for use in the inventive systems and networks.
Figure 10B:
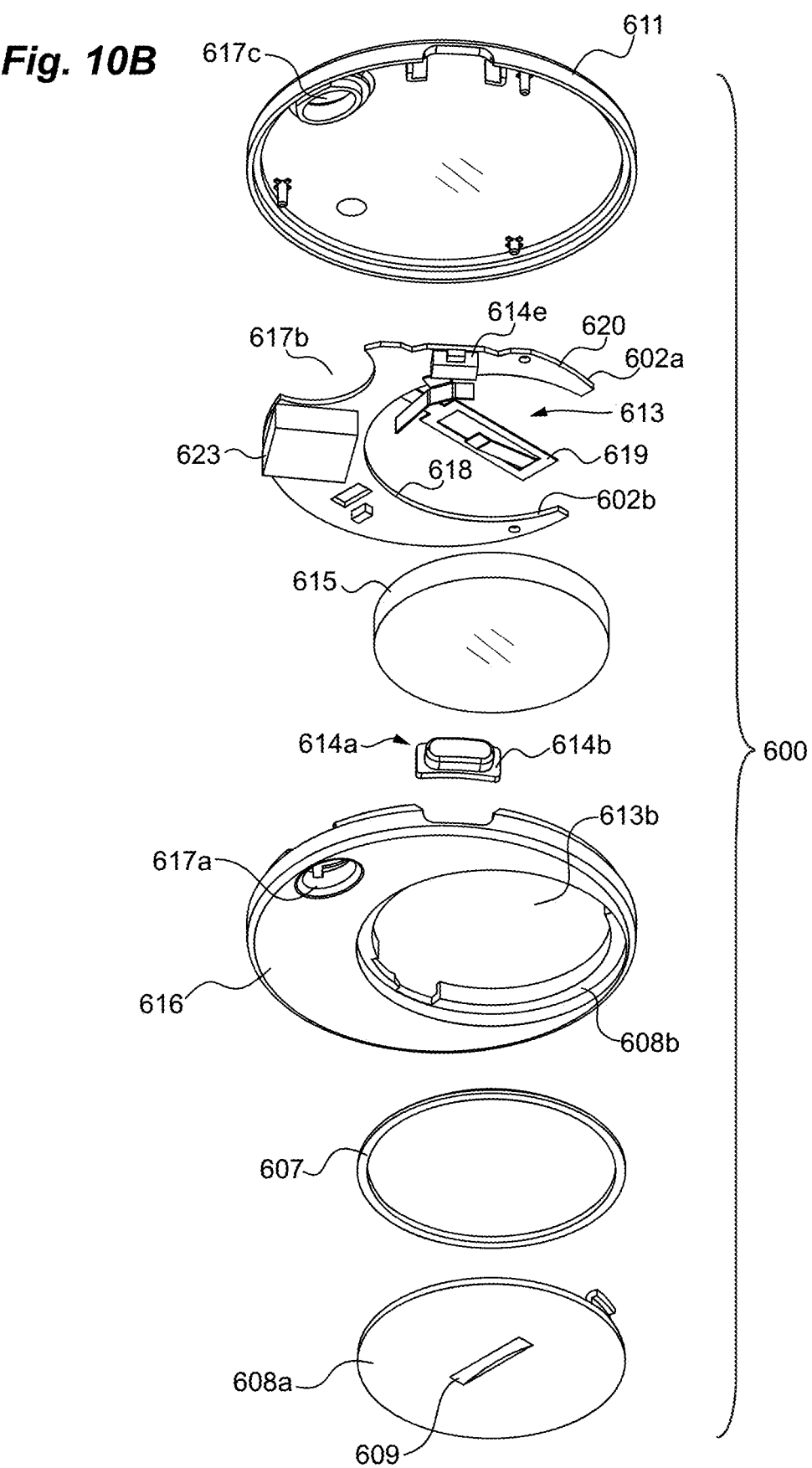

FIGS. 10A and 10B are exploded views of an exemplary radiobeacon. The radiobeacon 600 is an assembly having outside covers 611, 616. The covers are made of glass filled acrylonitrile butadiene styrene (ABS) thermoplastic which is light in weight, can be injection molded and is resistant to impact, heat, water, acids, alkalis, alcohols and oils. The top and bottom clamshell housing pieces 611, 616 have circular-shaped bodies 603a, 603b, each with an annular wall 604a, 604b. The covers also form a through-hole 617 for receiving a cord or chain to attach the radiobeacon to an object, a pet or the clothing of a person.

The clamshell pieces 611, 616 enclose a printed circuit board (PCB) 612 and a battery 615. The PCB 612 has a crescent-shaped body with an outer edge 602a having a radius of curvature slightly smaller than the radius of curvature of the covers 611, 616 and an inner edge 602b with a smaller radius of curvature. Two circular arcs of different diameters thus define the crescent shape of the PCB 612. The PCB 612 has an opening 613a for receiving a circular battery 615.

The diameter of the battery 615 is smaller than the diameter of opening 613a in the PCB 612. The battery 615 has one terminal on its surface and another terminal on its edge. The edge of the battery engages a conductive edge connector 618 on the inner edge 602b of the PCB 612. Another conductor has a spring-biased body 619 that extends from PCB 612 toward the middle of a surface of the battery 615. The battery 615 is held in the opening 613 between the two covers 611, 616 and against the conductive edge connector 618 on the inner edge 602b of the PCB 612.

Bottom housing piece 616 has an opening 613b sufficient to receive the battery 615. A threaded battery cover 608a, a matching threaded annular wall 608b and an O-ring 607, secures battery 615 in the openings 613a, 613b. A detent 609 in the surface of the battery cover 608 receives an opening tool, such a screwdriver or the edge of a coin (not shown). Inserting the tool in the detent and rotating the cover 608a open the cover to access the battery.

The radiobeacon is assembled by inserting a PCB 612 with component circuitry on the inside surface of housing base piece 616. The top housing 611 is placed on top of base 616 to define a cavity that holds the battery 615 and PCB 612. The two covers are ultrasonically sealed to resist water or other materials from entering the device 600. A battery is inserted through opening 613b in cover 616 and the battery lid 608a sealedly engages O-ring 607 and threaded wall 608b. Cover 608a rotates in opposite directions to close or open. By encircling the battery with the printed circuit board 612, the thickness of the assembly is not increased, and us determined only by the separation of covers 611, 616 and the thickness of the battery 615. Some embodiments are 5 mm thin and 40 mm in diameter. Unlike other devices that use batteries, the PCB does not contribute to the thickness of the device 600 because the battery 615 does not rest on the PCB 612 but is partially encircled by the opening 613a in the PCB 612.

A multi-function button 614a extends from an opening defined by half-oval walls 614b, 614c in the sidewall of the junction of the stubby cylindrical walls 604a, and 604b. In one embodiment there is a single multi-function rubber button 614a that extends from the edge of the device. Button 614a is held in place by wall edges 614b, 614c that overlap surface or "boot" 614d to hold the rubber button 614a inside the covers 611, 616. The rubber button is aligned with a mechanical switch 614e that is attached to the PCB 612 and coupled to the core circuit.

The covers 611, 616 and the PCB 612 have aligned openings 617a, 617b, 617c that create an external key ring hole 617 for holding a key ring, a carrying chain or cord. As will be explained below, the component circuitry has a speaker for sounding one or more alarms. The edge of the covers defines a key ring hole 617 that has on or more small holes that may be sealed. In those embodiments, removable rubber plugs 605 may be inserted into the hole to prevent moisture and water from entering the cavity holding the component circuitry 620. As an alternative, a larger rubber plug could fill the entire channel 617a through 617c or at least cover the annular inner surface of the keyhole.

Figure 11:
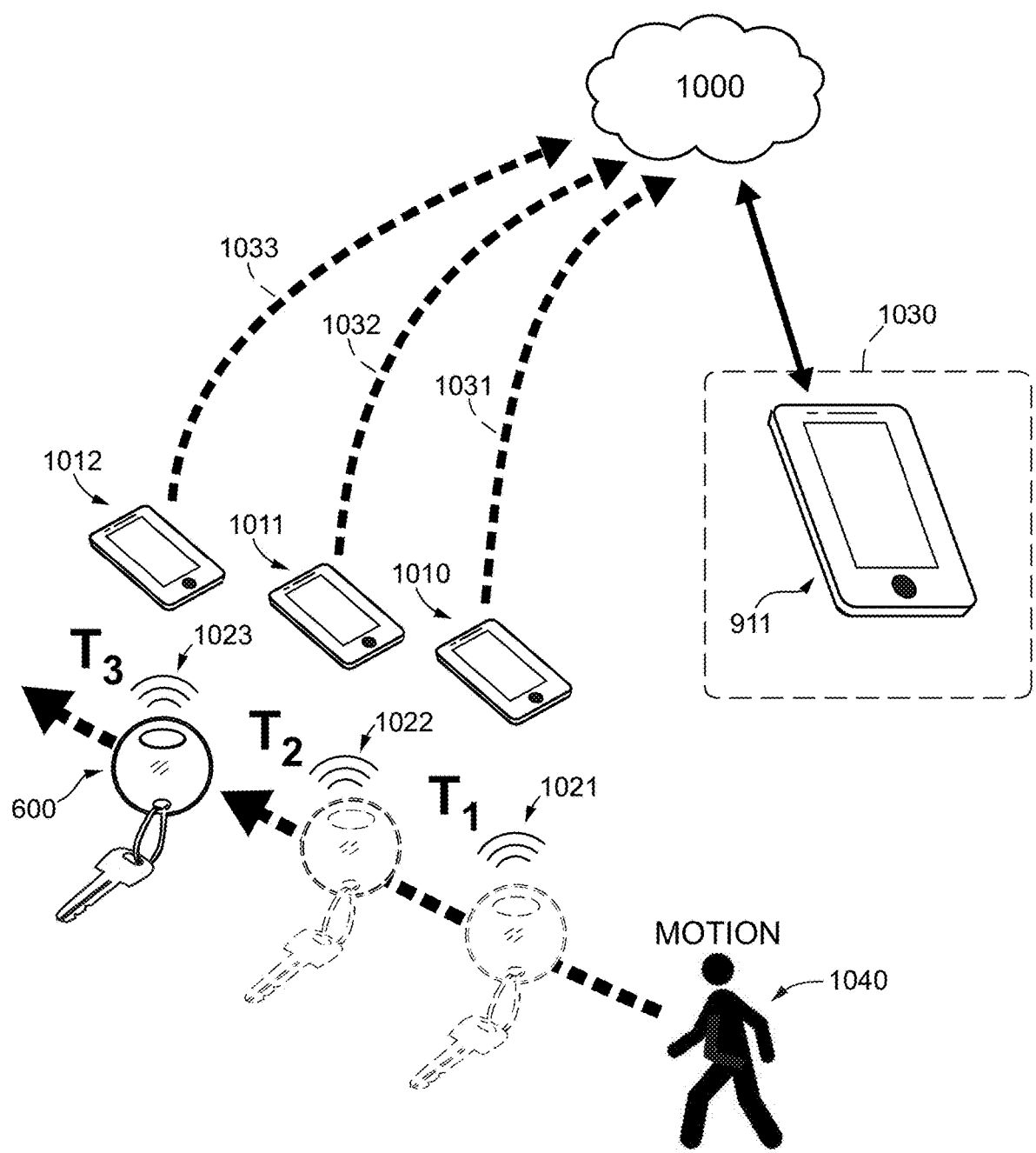
FIG. 11 is an animation showing a radiobeacon transiting a defined area so as to come into proximity with a series of three nodal devices.

FIG. 11 is an animation view showing a radiobeacon in three consecutive positions at times $T_1$, $T_2$, $T_3$. In each snapshot, the radiobeacon 600 transits a defined path (walking person 1040, MOTION, dashed heavy arrow) so as to come into proximity with a series of three community nodal devices (1010,1011,1012). Each nodal device registers a message (1021,1022,1023) from the radiobeacon in turn and upswitchingly transmits a broadband message in turn (1031, 1032,1033) to a cloud server 1000, which in turn may initiate a command transmission to a nodal device 911 in a remote location 1030. In this instance, the remote nodal device 911 relays the command to a remote machine 3000 for execution and monitors that the execution of the command was completed (double-headed arrow). The command might contain data for displaying a notification on device 911 to the owner of the radiobeacon 600 or to a friend having shared permissions. The smartphone 911 can report status to the cloud server: that the friend has acknowledged the notification and is trying to catch up with FIG. 1040.

Radio signals are indicated at three times $T_1$, $T_2$, and $T_3$, each corresponding to a point in time and a position in the right-to-left path of the walking person 1040. Each message may contain updated sensor content reflective of time and distance travelled. The cloud host server may use this information to track the radiobeacon 600, which in this example is attached to a keychain that has been unknowingly carried away by an individual 1040 in a borrowed jacket. The messages may also include other sensor information, such as microclimate indicators, insolation, and direct or indirect indicators of proximity and location.

In some instances, permission may be in place to engage foreground services. For example, local nodal device 1012 may include a virtual machine accessory video camera either integral to the smartphone or separately linked to the smart device by a USB or wireless link such as a headband or a pair of smart glasses worn on the head of a community member. The video can then be streamed to the cloud, and according to user permissions in an administrative server, forwarded to one or more display stations or websites to help track the errant keychain. This could be important when the person carrying the radiobeacon 600 has left their medications at home, or is missing and needs to be found. In another instance, the operator of radiobeacon 1012 could be invited to approach walking person 1040 and offer assistance.

Roles may be reversed, nodal device 911 may interchangeably insert itself into ad hoc networks by proximity to the radiobeacons of others, and serve as a shared community resource—either way, all community nodal devices will reciprocate in upswitchingly transmitting data from a radiobeacon to the cloud.

Nodal device 911 may also function as a radiobeacon, or may signal the cloud server to request devices 1010, 1011 and 1012 report their location so as to track the person carrying radiobeacon device 600. Generally, the messages are very short and result in a minimal load on the network. In other cases, some devices may have permission to permit sharing of foreground resources such as GPS location that can be used to track the keychain (or the missing person).

In some embodiments, the radiobeacon may carry its own GPS device and broadcast its latitude and longitude coordinates in the message (i.e., as a geostamp), accompanied by a timestamp. In other embodiments, the radiobeacon message may be stamped with the GPS coordinates of any nodal device that participates in systems such as shown in the preceding figures and is within an effective radio contact area of any radiobeacon. In still other embodiments, the location of one nodal device may be paired with the range of one radiobeacon 600. For example, in the system shown in FIG. 11, the nodal device 1012 provides a location using its GPS function and pairs that location with the proximity of radiobeacon 600 and the time of contact. These radiobeacons are sophisticated "radiotags" when attached to children, pets, property and so forth.

Where timestamps and geostamps can be aggregated, the host notification may include a tracking feature whereby a plurality of recent locations of said lost object are visually displayed in the form of a track over time superimposed on a map. The track may also include an extrapolation of at least one future position or a composite showing the locations of one or two friends who in position to intersect the track ahead of the lost object, thus potentially recovering it by activating a visual or audible alarm when in close range.

Figure 12:
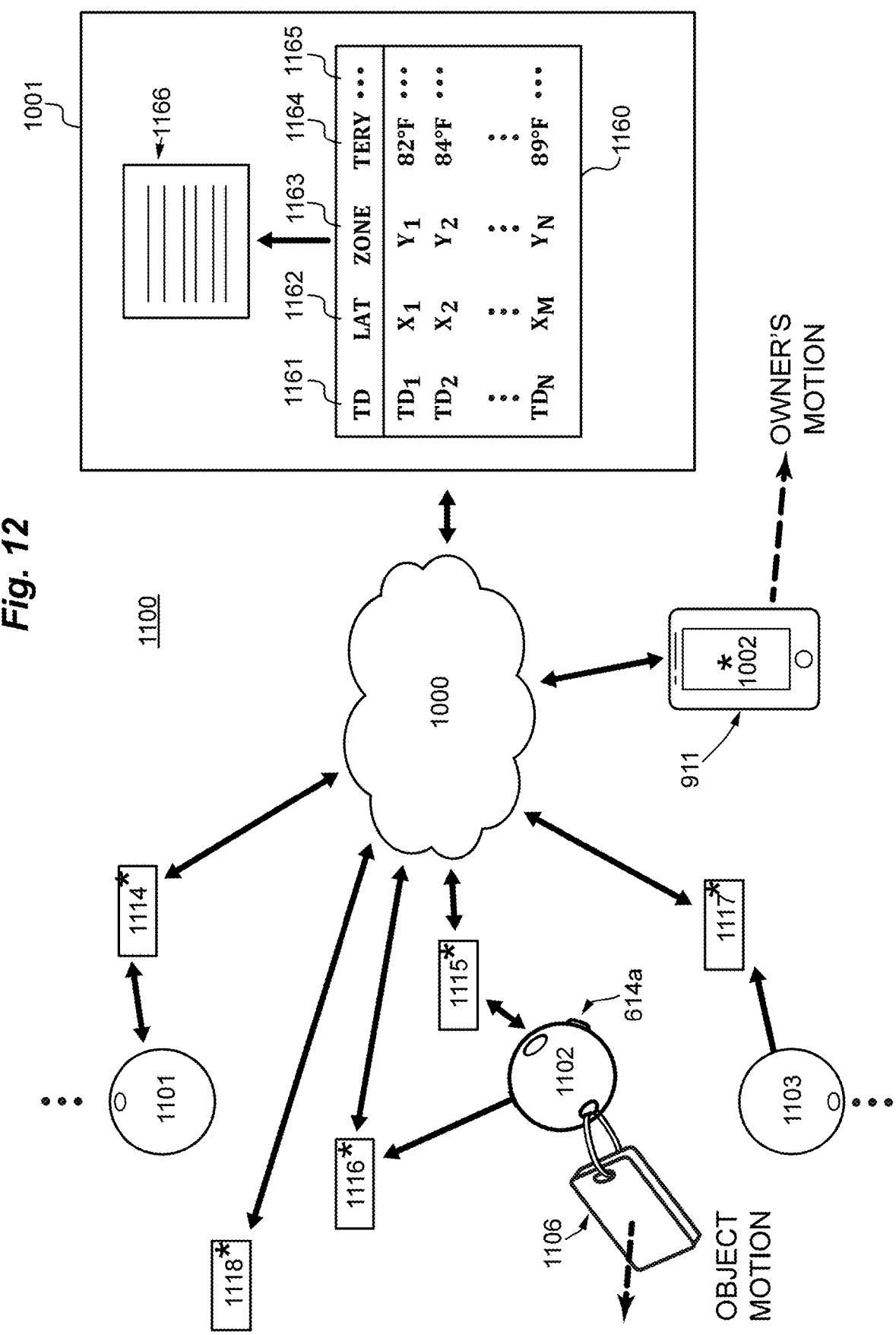
FIG. 12 is a schematic view of a system and network having three radiobeacons, a plurality of community nodal devices in proximity to one or more radiobeacons (one of which is depicted as a smartphone), a cloud host server, and an exemplary data structure and notification process in the cloud host server. One radiobeacon is tagged to an object in motion.

FIG. 12 is a schematic view of a system 1100 and network having three (or more) radiobeacons (1101, 1102, 1103), one smartphone 911 (with software "*", 1002) with owner/user in proximity to the radiobeacons, a cloud server 1000, and an accessible database 1001 configured to store information about radio contacts, including identifier, location, zone and temperature and to display that in a dashboard display 1166 broadcast to smart devices requesting it. Radiobeacon 1102 is tagged to an item 1106 such as a child's pocket tag (or may be attached with a safety pin). An owner/user's smartphone 911 is in motion away from the radiobeacons and will soon be out of radio broadcast range of the low energy transmissions. However, the smartphone remains in radio contact with cloud host 1000, and has installed application (asterisk, 1002) for receiving radiobeacon sensor data from the cloud host.

In this embodiment, the cloud host server includes one or more administrative databases 1001 that keep records on owners, users, location and sensor data from each radiobeacon in the system. For user of the network 1100, the database 1001 would show a table 1160 of the devices owned by the user (or those devices for which the user had granted or received one or more privileges or are marked for public access), the identity (column 1161) of each device that is owned or subject to a privilege granted or received, the information (columns 1164, 1165) reported by each sensor of each device, including and not limited to the time the information was received and the location (column 1162) of the devices 1101, 1102, 1103. At any time, the owner of the radiobeacons and nodal device 911 may view a report 1166 showing information on the location and sensors of each radiobeacon, including the last known location of the radiobeacon and when the last known location was recorded in the cloud administrative database 1001. Thus in a simple application, the owner's own smart device 911 can monitor radiobeacon 1102 as it approaches the limit of its broadcast range.

If the low energy broadcast range of radiobeacon 1102 from the owner's smart device 911 is exceeded as the owner walks away, no further information is received by the cloud host from smartphone 911. However, a number of other community nodal devices (1114, 1115, 1116, 1117, 1118) may be within radio range. If programmed to recognize the identifiers and message, the device will not discard the radio contact and message, but will instead upswitch the information in a wide area broadcast on a separate antenna to the cloud host 1000, in this case including the GPS location 1162 of "radiotag" 1102. The nodal device will forward the radiobeacon identity, sensor information, timestamp, and any GPS geostamp. As long as an application for sharing radiobeacon sensor data is running in background, each nodal device will upswitch any radiobeacon message from the radiobeacons. No permission is required to receive and upload the radiobeacon signal.

The upswitch and retransmission of radiobeacon information by the nodal devices (1114,1115,1116,1117,1118) imposes no hardship on the shared resources of the system.

Thus if the child carrying tag 1106 is moving in the opposite direction (OBJECT MOTION) of a parent (OWNER'S MOTION) and is out of range, an owner of radiobeacon 1102 may access the database 1001 and mark the object (with radiobeacon tag) as "lost." Assume another user carries nodal device 1115 and has no shared privileges for radiobeacon 1102. Nevertheless, when nodal device 1115 passes within range of the radiobeacon signal from radiobeacon 1102, the identity of the lost device 1102 and its approximate GPS location will be automatically relayed to the cloud host 1000 and recorded on the database 1001. The host will then prepare a report 1166 and forward it to the owner's smartphone 911. The report details the general location of the lost device; the location is periodically updated as the radiobeacon tag 1102 encounters other nodal devices, for example nodal device 1116. The approximate location can be displayed on a suitable application such as Google Maps, or MapQuest, to provide the owner with enough information to attempt to recover the device. As the owner gets in proximity, the owner's smartphone captures the signature ping from radiotag 1102 and can send a command that actuates the radiobeacon to sound an alarm or blink in the dark. Suddenly the exact location of the missing item is readily discoverable. Similarly, a child, discovering that he is lost, may press button 614a to alert the system and initiate a response that involves establishing the child's location and reuniting the child with his parent.

A user can have an alert triggered when the distance or proximity between the nodal device 911 and the radiobeacon 600 exceeds a predetermined distance selected by the operator of the nodal device.

Radiobeacons of the invention may be provided with speaker and a light emitting diode so as to tag an object for later recovery. To execute a search for the object, any nodal device with appropriate permissions may command the radiobeacon to emit an alert, including a buzz or flashing light. If an objecting tagged with the radiobeacon is inside a drawer or under a pillow, the person searching for the object will hear the buzz or see the flashing light. The nodal device may also set automatic alerts triggered by increasing or decreasing distance between the radiobeacon and the nodal device, for example.

The radiobeacon message includes identification information specific to the radiobeacon (generally manufacturer's make and model) and may include sensor output representative of the status of the charge of the battery. The program displays both the range and battery status information. As explained above, the location of the radiobeacon may be detected by other nodal devices, which may assist the owner in locating a lost object to which a radiobeacon is attached. Accordingly, the nodal device, if associated with network of other nodal devices, may acquire information about the location of a radiobeacon from other networked nodal devices (any proximate nodal device owned by an anonymous user). This sharing is promiscuous and ad hoc. The control program provides a feature for selecting a map displaying the remote location of each radiobeacon controlled by the owner.

Each radiobeacon (1101,1102,1103) is registered by the cloud host to an owner (using the unique UUID) and may have one or more shared users. As used in this disclosure, the term "owner" applies to a user of a radiobeacon who has primary control over the radiobeacon. The embodiment envisions local, regional, national and international networks within the scope of "internetworks". It also envisions registered owner-users of radiobeacons and other registered users all sharing a cloud host server or servers for collecting information about (and from) radiobeacons globally, or in a particular local area. An owner-user may grant one or more privileges to other users who are defined in the administrative database 1001 as "friends", so that the system will allow friends some level of access or control of the owner's radiobeacons and sensor output. For example, one owner-user may give a friend a privilege to view all data in a host database 1001 or webpage (or view data only associated with a selected subset of radiobeacons chosen by the owner-user for sharing). Even when the owner permits other users to see the data, some data may be marked "private" and excluded from the view of the shared user. An owner may also permit other users to control one, more, or all functions of individual radiobeacons of the owner. An owner may also allow device data to be posted publicly, so that any user can view the data.

The friend feature solves a potential problem of locating lost radiobeacons. If a friend finds a lost item of an owner by encountering a radio signal associated with the tag (such as tag 1102), the friend may discretely notify the owner that the friend has found the lost radiobeacon (and by extension the object 1106 attached to the device) by calling the owner or sending the owner an email or text message. The email could include a map with a pin showing the location.

In an alternative friend-based scenario, assume a user of nodal device 1115 (who was granted privileges for the lost radiotag 1102 by its owner) detects the lost device. The owner sees on the database that the user of nodal device 1115 is close to the lost radiotag 1102 and also has privileges on it. The owner may then contact the friend/user via telephone or email and ask the user to find the lost radiotag 1102 by initiating a sound or light alert while in proximity. The missing item 1106 is then easily found by sight or hearing.

Shared use has a number of advantages. For example, assume the owner of the radiobeacon 1101 is away from home and receives a call from a member of his family asking for help finding a lost object such as a pistol tagged by a radiotag. The owner could log into the cloud host server 1000 and send a suitable command to the radiobeacon 1101 to operate an internal speaker and LED. Perhaps more easily, if the owner had shared control of the radiobeacon with other family members, then the shared user could send the command to generate an audible "homing signal" directly. Objects lost anywhere in the world may be located by using position data provided by other nodal devices that carry the application and are registered to the cloud host administrative site 1000.

The database has numerous uses. Radiobeacons may be distributed over a large geographic area where each radiobeacon is periodically in contact with the cloud host as it makes radio contact with passing nodal devices. The radiobeacons may be installed at one or more known locations or may have been located by some mapping means when installed. The sensors on the radiobeacons will report their sensor package data, such as temperatures, air pressure, humidity, and other environmental characteristics, thus providing in aggregate a detailed local picture of the weather in a geographic area. Databases 1001 may include maps, tables, place names, or zones 1163.

Sensor data may serve as a trigger signal. There are virtually an unlimited number of sensors that can be used to provide trigger signals and a similar unlimited of responses or alerts that may be given in response to any trigger signals. Each radiobeacon may have a button 614a and may have one or more sensors as described earlier. The button and each sensor may generate a trigger signal. Trigger signals may be combined in any number of combinations and/or sequences of trigger signals to generate particular trigger signals depending upon the occurrence of predetermined combinations and/or sequences of trigger signals. The radiobeacons and nodal devices may thus also generate one or more unique responses or alerts upon receipt of any designated trigger signals and unique combinations thereof. Multifunction buttons and keypads may also be used to aid in programming and organizing notifications, triggers, and executable functions.

Figure 13:
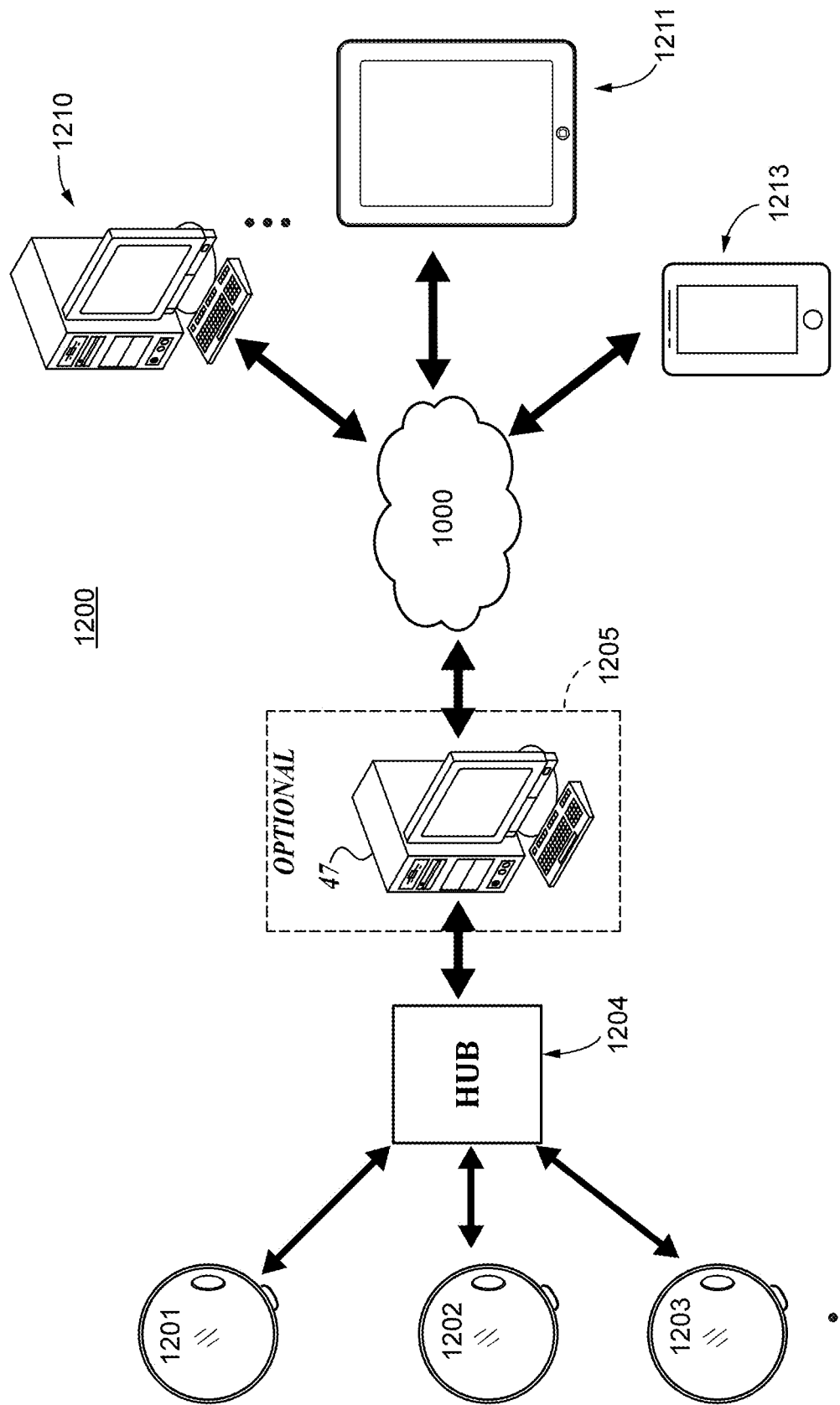
FIG. 13 is an exemplary view of a system and network having three or more radiobeacons, a nodal device hub, an optional computing device, a cloud-based cloud host server, and three client devices.

FIG. 13 is an exemplary view of a system 1200 and network having three radiobeacons (1201, 1202, 1203), a nodal device (identified here as a "hub" 1204), an optional computing device 1205, a cloud-based cloud host server, and three client devices. Radiobeacons (1201,1202,1203) are in wireless communication with hub 1204. The hub 1204 may be connected to a gateway computing resource 1205 that in turn is connected to the cloud host 1000. In some embodiments, the hub 1204 is directly connected to the cloud, bypassing optional desktop computer 1205. The hub 1204 listens for signals from the radiobeacons. The hub has a bluetoothed radioset or other wireless communication apparatus and can sense the range of each radiobeacon within its effective field. Upon receiving signals from one or more radiobeacons, the hub relays any sensor payload and identifier information associated with the radiobeacons to the cloud host server. Likewise, the hub may send control information received from the owner via the cloud host server to each or all the radiobeacons. For illustration, reports and updates may be sent to a remote computer 1210, a tablet 1211, or a user's smartphone 1213. Similarly, the smartphone, tablet or computer may be used to send commands to one or more of the beacons via hub 1204. Commands received from the host are downswitched to a bluetoothed compatible antenna at a frequency in the Bluetooth band for transmission to a radiobeacon having the transceiver feature described in FIG. 7B. Internet client 1205 (shown here as a desktop computer) is optional if hub 1204 is equipped with a wide area transceiver communicatively compatible with an internetwork portal.

These embodiments of networks rely on integrate multiple radiobeacons and bluetoothed devices into an ad hoc network by providing an application configured to switch bluetoothed radio signals to a higher powered internetwork and in reverse, from an internetwork to a short range bluetoothed signal. In this way, a nodal device (e.g. a smartphone) does not have to directly control the radiobeacons, however. All radiobeacons for an owner are registered in the hub 1204 and each can be securely accessed from a smartphone or other nodal device anywhere in the world. The registered radiobeacons can be used for home security, automation, or playing games with friends across the world, for example.

Figure 14:
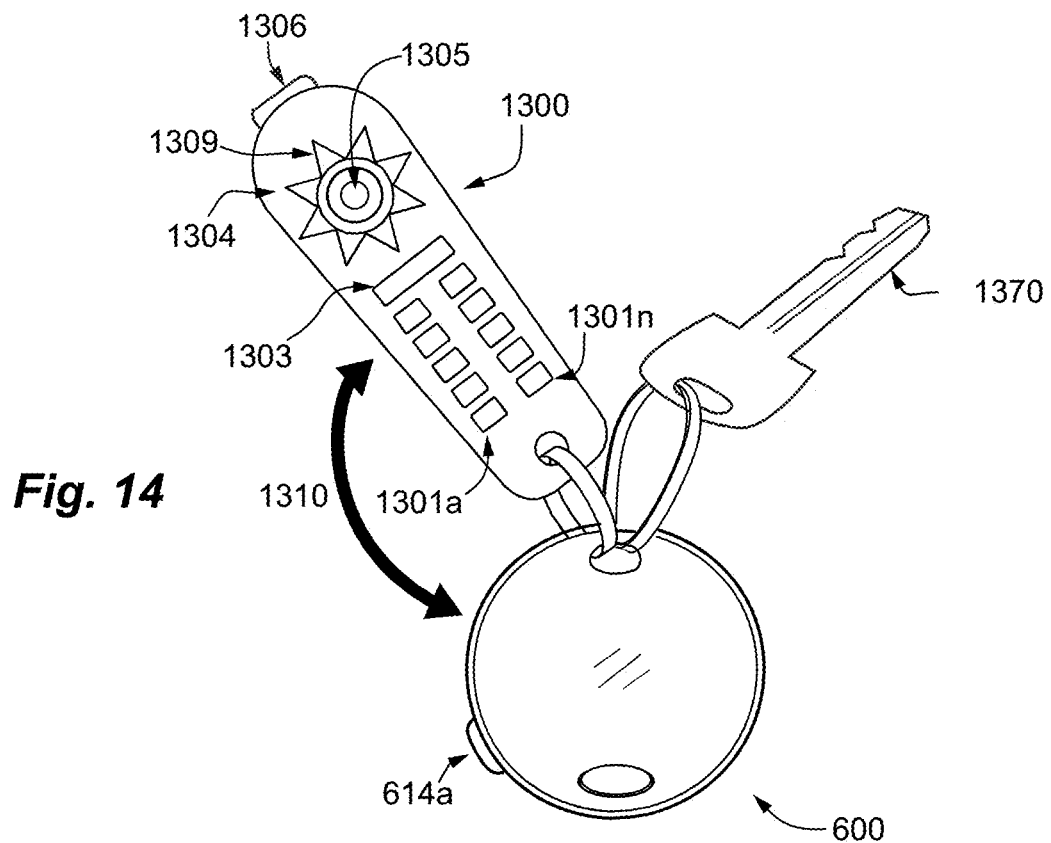
FIGS. 14 and 15 are views of an alternate radiobeacon and beaconmate of the invention. Shown is a simplified command and control system utilizing a beaconmate, a nodal device, and a cloud host server.
Figure 15:
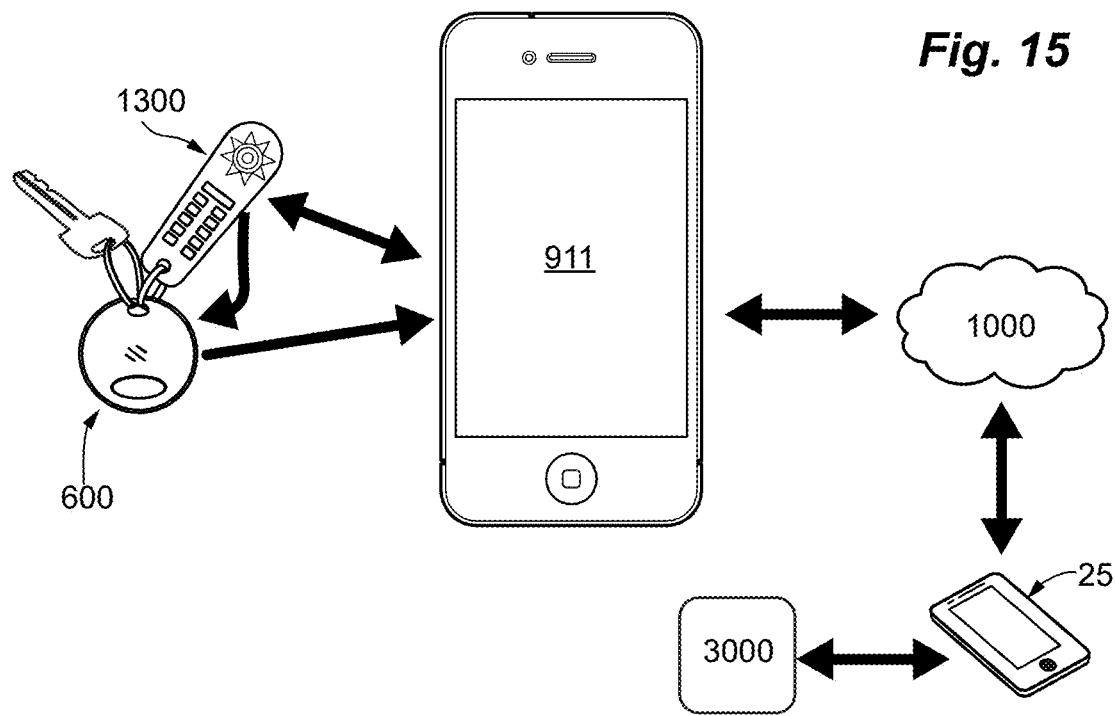

FIGS. 14 and 15 are views of an alternate system and network architecture of the invention. The system includes a radiobeacon 600 and an accessory "beaconmate" 1300. In this case, the radiobeacon is "radiotagging" a key 1370. The beaconmate 1300 is in bidirectional short range communication 1310 with the radiobeacon 600. Whereas the radiobeacon has only a single button 614*a*, the beaconmate has buttons 1301*a* through 1301*n*, and includes a special function bar 1303. Also included is an LED rose 1304 with eight compass pointers 1309 and a central "enter" button 1305. Center button 1305 is context sensitive, and for example can actuate a directional search on a first press and an audible homing signal from a misplaced smartphone (if equipped with a compatible application package) on a second press, thus aiding users in finding a phone before losing a call.

The buttons appeal to users less familiar with a gestural language to differentiate a lexicon of commands, and is less expensive to implement than a voice recognition system in the limited computing power environment of battery operated devices.

The beaconmate device can also include a flashlight 1306, a compass with individually illuminated LEDs (1309) that function as directional indicators in search mode and as capacitive switches in navigate mode. Also included in this embodiment is a detachable memory stick that when inserted into a USB port in the beaconmate, becomes the base flashlight 1306. Flashlight 1306 lights when button 1305 is held down. The device may also include a solar recharger (or RF recharger as described earlier) and a disposable battery power source. This device may alternatively have a retractable USB connector and may be plugged into a cellphone for setup of user functions in on-board flash memory.

In other embodiments, the flashlight/memory stick may be pulled out to expose a USB miniconnector, which would otherwise sit in a water resistant cavity and be electronically connected via a databus to the circuit board and processor inside. Because the device as so configured is capable of both bluetoothed and USB connectivity, added levels of function are achieved. The user would plug the memory stick into a phone, actuate bluetoothed pairing, transfer all the needed configuration information while operating in bluetoothed mode, and then plug the memory stick back into the beaconmate receptacle, where the setup configuration would be accessed during operation of the device. Removing the memory stick would render the device unworkable. Alternatively, the memory stick can be used to store photos from a smartphone, and then plugged into a computer or camera for further processing and archiving.

FIG. 15 is a view of a simplified command and control system utilizing beaconmate 1300, radiobeacon 600, nodal device 911, a cloud host 1000, and remote actuation device represented by smartphone 25. In this embodiment, the beaconmate and the radiobeacon are in radio contact with the nodal device, but the beaconmate adds the power of bidirectional communication with the host device. Using this system, the beaconmate may be configured to provide an alternate interface with button shortcuts for accessing functions of the smart device 911 and for triggering remote actuation of other machines and devices 3000 via cloud access to functions in actuation device 25.

Figure 16:
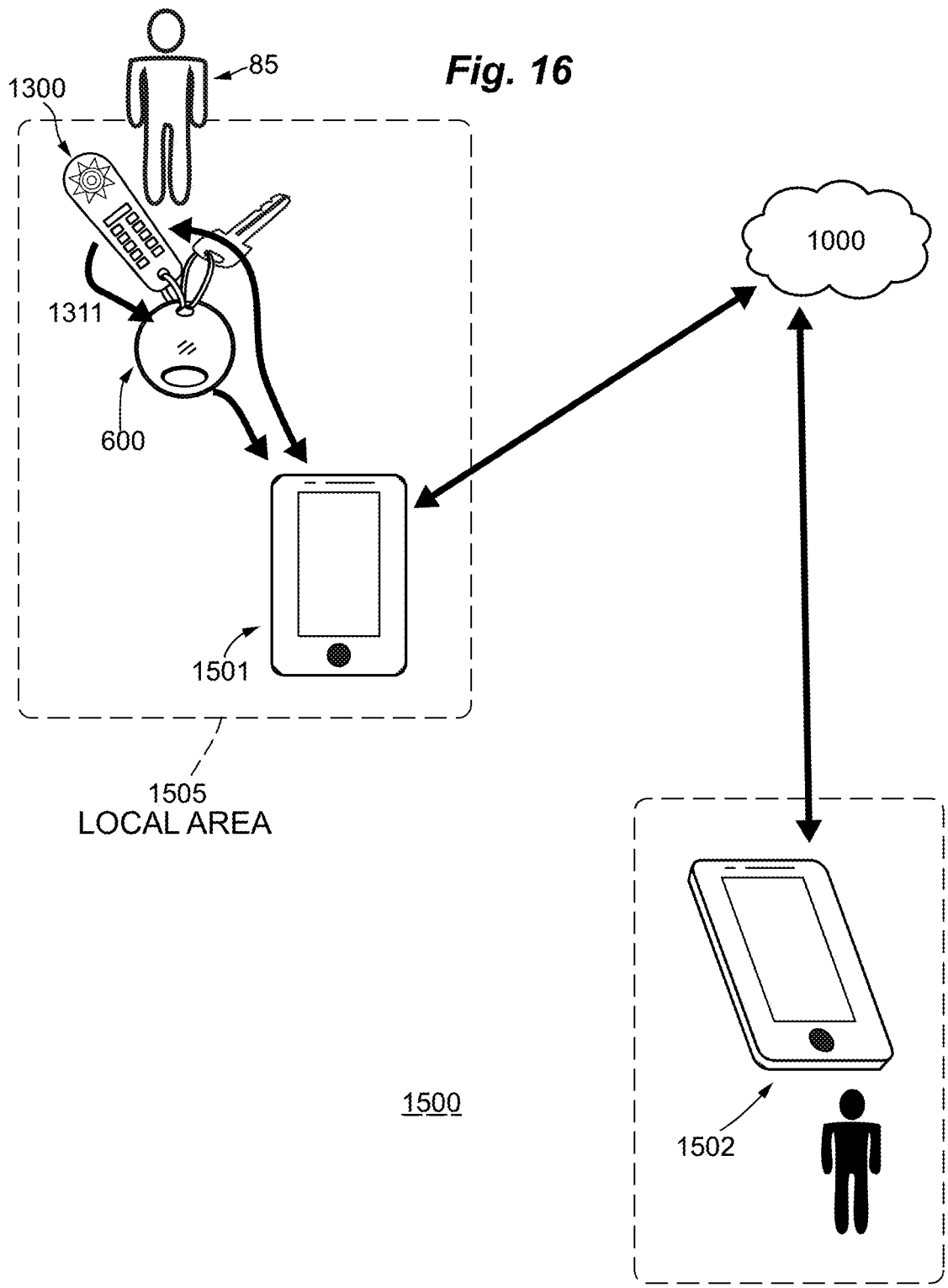
FIG. 16 is an exemplary view of a radiobeacon with beaconmate in digital communication with a nodal device. Transmission of commands can be direct (dashed arrow) or indirect (solid arrows).

FIG. 16 is an exemplary view of a system 1500 showing radiobeacon 600 with beaconmate 1300 in digital communication with a smartphone 1501 in local area proximity (represented by box 1505). Here a second smartphone 1502 initiates a call to the first smartphone. The call recipient 85 may have set down the phone and instead relies on the beaconmate to report and respond to the incoming telephone call according to pre-programmed rules. The keypad may be color coded to indicate whether the user knows the caller by the color of the key that lights up. The beaconmate can also be set up to send a signal to the beacon, triggering a sensor dump, in which the beacon reports any sensor data that provides needed context, a sort of "do not disturb" such as accelerometry indicating the call recipient is driving. In this way, beacons may be given enhanced functions. Beacons having one or more sensors may be supplemented, for example, with additional sensors mounted in the beaconmate. By using very low signal strength 1311 to communicate from the beaconmate to the radiobeacon, longer battery life of the accessory 1300 is achieved. Bold arrow 1311 represents ultra-low energy radio transmissions or "messages" between the radiobeacon 600 and beaconmate 1300.

Figure 17:
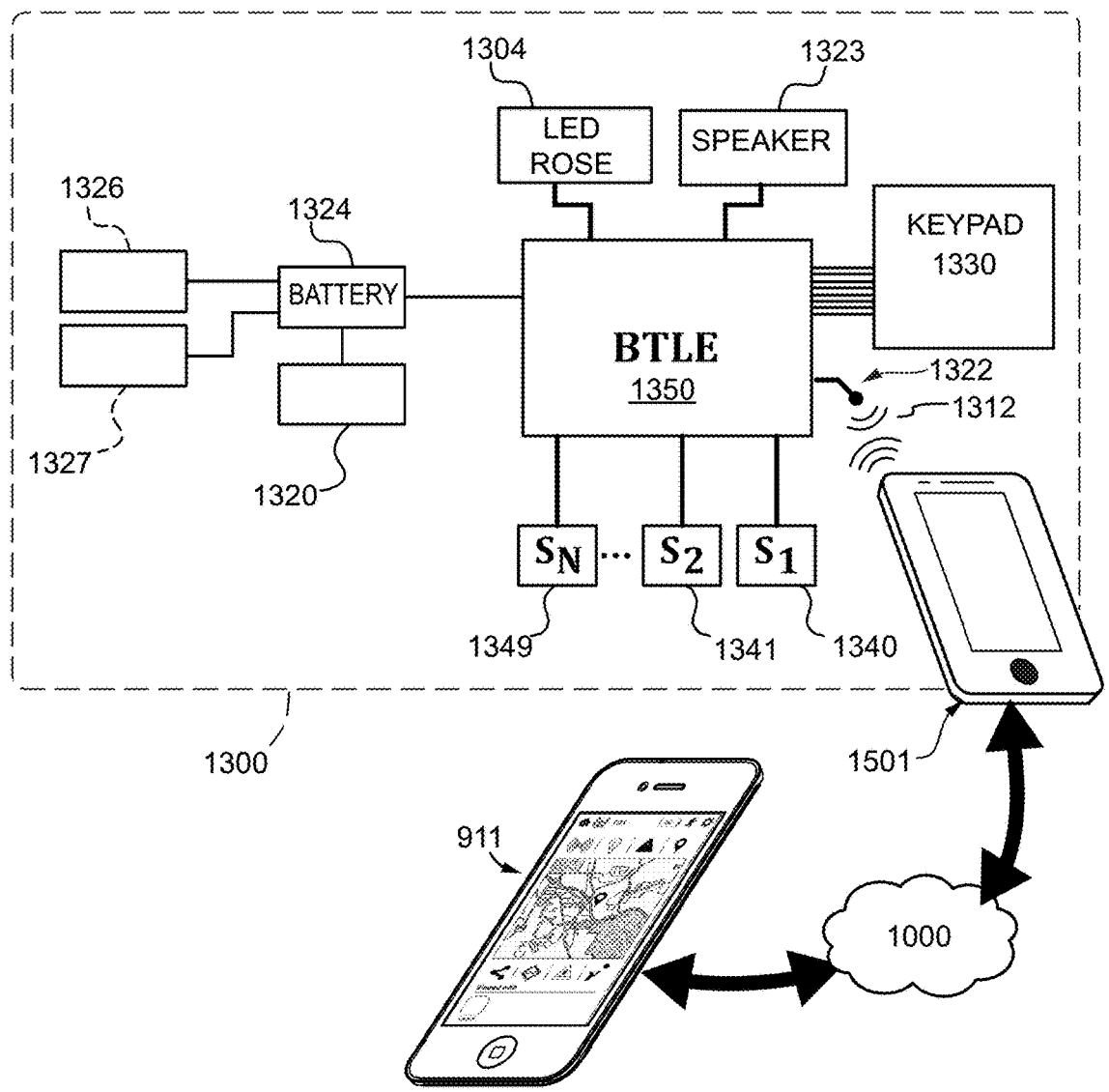
FIG. 17 is a component level view of a beaconmate in indirect radio communication with a smartphone through a community nodal device.

FIG. 17 is an exemplary schematic view of a beaconmate 1300 (dashed box) in direct digital communication with a nodal device (smartphone) 1501 at close range. Signals received by the nodal device are transmitted to a cloud host 1000, analyzed according to user-programmed rules and commands, and from there to a client device 911. A smartphone is represented but is to be indicative of any compatible nodal device, shown here displaying a map.

Components identified in this simplified block view include a bluetoothed low energy (BTLE) core device 1350. The core device includes an antenna 1322 for sending low energy radio signals 1312. The core device generally includes an integrated microcontroller, read only memory (ROM), random access memory (RAM) sufficient to support rudimentary control, or may be provided with firmware sufficient for basic functions. For some applications, a removable flash memory device may be incorporated. The memory device may be added through a slot in the outside walls or may be installed under the battery. The memory device may tabulate data collected by sensors mounted in the device for later retrieval and analysis.

The core device 1350 has a clock. The radiobeacon signal and any signal from a sensor may include the time any message or signal is sent. According to an application subroutine (such as a near field communications sensor unit), nodal device 1360 may wake the device 1300, receive sensor output, and then set the device back to sleep such that its broadcast signal is only active when the two units are in close proximity. A second nodal device 911 may again later wake up the radiobeacon and receive a signal. The core device also tracks time and any alert may be paired to one or more chosen times or day, week, month or year.

The core device 1350 is assigned a unique identification code (UUID) and will generally broadcast at periodic intervals as programmed by the developer. Transmissions 1312 may be made using a ceramic antenna, a loop antenna, fractal antenna, or dipole antenna 1322, or other antenna known in the art, selected for optimal power per unit current.

The core device 1350 controls a speaker 1323 and an array 1304 of light emitting diodes formed as a compass rose as a navigation and tracking aid. The speaker 1323 and the LED "rose" array 1304 are configured to communicate alarms directly to a user and to assist in tracking and locating lost items, among other functions.

The core device 1350 is connected to one or more sensors (1340,1341), or any number of sensors 1349 (SN). Exemplary sensors sense environmental and physical parameters experienced by the radiobeacon, including and not limited to temperature, light intensity, smoke, voltage, sound, motion, displacement, acceleration, humidity, pressure, radiation, button-press event, compass direction, or to report daylight levels, traffic levels, noise levels, NOX levels, and unusual noises such as gunshots or sirens, or self-reporting, such as reporting a low battery level, or other stimulus, sensor data, or environmental parameters, without limitation thereto. In some embodiments, a sensor is a combined multi-axis motion sensor and temperature sensor. In one embodiment, the sensor has an accelerometer, a gyroscope, a compass, and a magnetometer for each axis. The information or "sensor data" output by the multi-axis motion sensor enables the receiver (i.e., a host device such as a smartphone) to monitor and track the beaconmate (which is radiotagged by a radiobeacon) as it moves from one location to another. Alternatively, the beaconmate may include a GPS-based location sensor. The motion of the device can be monitored continuously by a cloud host server 1000 as long as the receiver 1360 is close enough to be in wireless contact with the sensor package on board or alternatively with a radiobeacon in wireless contact with the beaconmate. As an alternative, the information may be stored in a memory in the device and accessed later.

Some embodiments of the beaconmate of the invention are equipped with rechargeable batteries 1324 that may be recharged via an inductive charger 1326. Wireless chargers, also known as induction chargers, typically place one coil in a charging device or pad that is connected to an AC power source. Battery top off controls and discharge controls are known in the art and may be implemented where warranted.

Other embodiments of the invention may have wired rechargers. These are well-known devices and may be incorporated into beaconmate devices of the invention by providing a suitable port (not shown) to receive power from an external power supply. However, such external ports provide openings in the housing that are not desirable, and hence indirect charging means are preferred. A separate disposable battery 1320 may be included.

Other embodiments may have solar power cells and chargers 1327, so that battery 1324 is rechargeable by exposure to light. Solar cells have a dual role by acting as light sensors. This allows flexibility in configuring notifications to the user by pairing sensor data and other contextual data to the presence or absence of light. The amount of current generated by the solar cells is indicative of the intensity of the light falling on the beaconmate sensor.

While not shown, other embodiments of the beaconmate have antennas and circuitry for harvesting RF power to recharge battery 1324. RF harvesters having a GMS antenna, one or more resident circuits, boosters, peak detectors, and an adder, are known in the art. The circuit contains passive components and is designed to have tuned circuits at known frequencies of cell phone towers (960 MHz) and bluetoothed devices (2.4 GHz). The boosters are Villard voltage multipliers. Reported test results show the RF harvester located within five hundred meters of a cell tower was capable of generating 0.16 microWatt and successfully operated a calculator and a light emitting diode. Related advances include Dickson cascade diode capacitor circuits, charge pumps, Karthaus-Fischer cascade voltage doublers and rectantennas known in the art.

Actuation device 911 may be a smartphone or pad for displaying a map as shown. The map may be an interactive map and may include a voice overlay or data overlay. Maps may include aggregate data, such as traffic, radio traffic, tremors, fog, crowding, or special offers, sites of interest, meeting places, and so forth.

Figure 18:
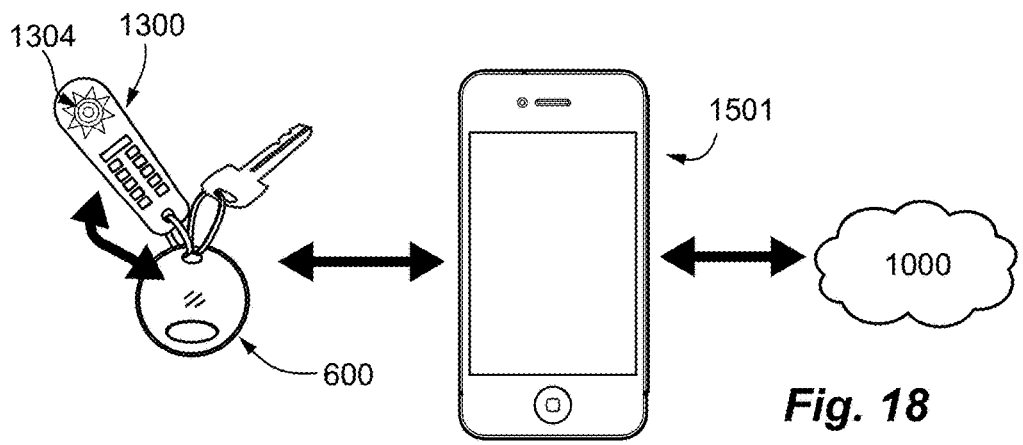
FIG. 18 is a simplified view of a system for using a beaconmate to operate a smart device according to the systems and methods of the invention.

FIG. 18 is an alternative system and network having a radiobeacon 600, a beaconmate 1300, a smartphone 1501, and a cloud-based cloud host server 1000. Commands issued from the host platform 1000 may be directed using one of the buttons on the beaconmate, such that various preprogrammed responses are selectable with a button press depending which button is pressed and on context. Other responses may be selected with a combination of button presses. The radiobeacon periodically pings the user's phone and a notification is generated in the beaconmate if the phone 1501 is no longer in very close proximity. In an improvement over the "hot-cold" proximity sensors of the art, direction pointers in the LED rose 1304 will light up according to the last known position of the phone. In this way, the user need not carry the phone directly on his person, and will be reminded if he moves too far away from the phone and could miss a call.

Similar networks may be set up for controlling remote machines. In one exemplary variant, a user may press a button on the beaconmate to remotely take a photo, such as a "selfie", with his cellphone 911. In another variant, the beaconmate buttons may be assigned functions, such as opening a garage door, tracking a child, or calling a particular friend. The beaconmate may illuminate particular buttons or colors of the compass rose according to who is calling. Also, the beaconmate may receive reports of a low battery in either the radiobeacon or the phone and may cause a message to be initiated and displayed on the phone to the user before power levels become critical.

Thus the beaconmate is an extension of the radiobeacon and is an improvement over embodiments having only a single button 614*a*. More complex systems can be conceived. The beaconmate may also include voice actuation commands and may do mathematical problems like adding, subtracting, or calculating mortgage payments from principal and interest rate by voice commands. The beaconmate has a program that allows the user to create custom trigger signals including combinations and/or sequences of individual trigger signals, thus serving as a personal assistant while being small enough to be pocketed or pinned to a lapel.

Figure 19:
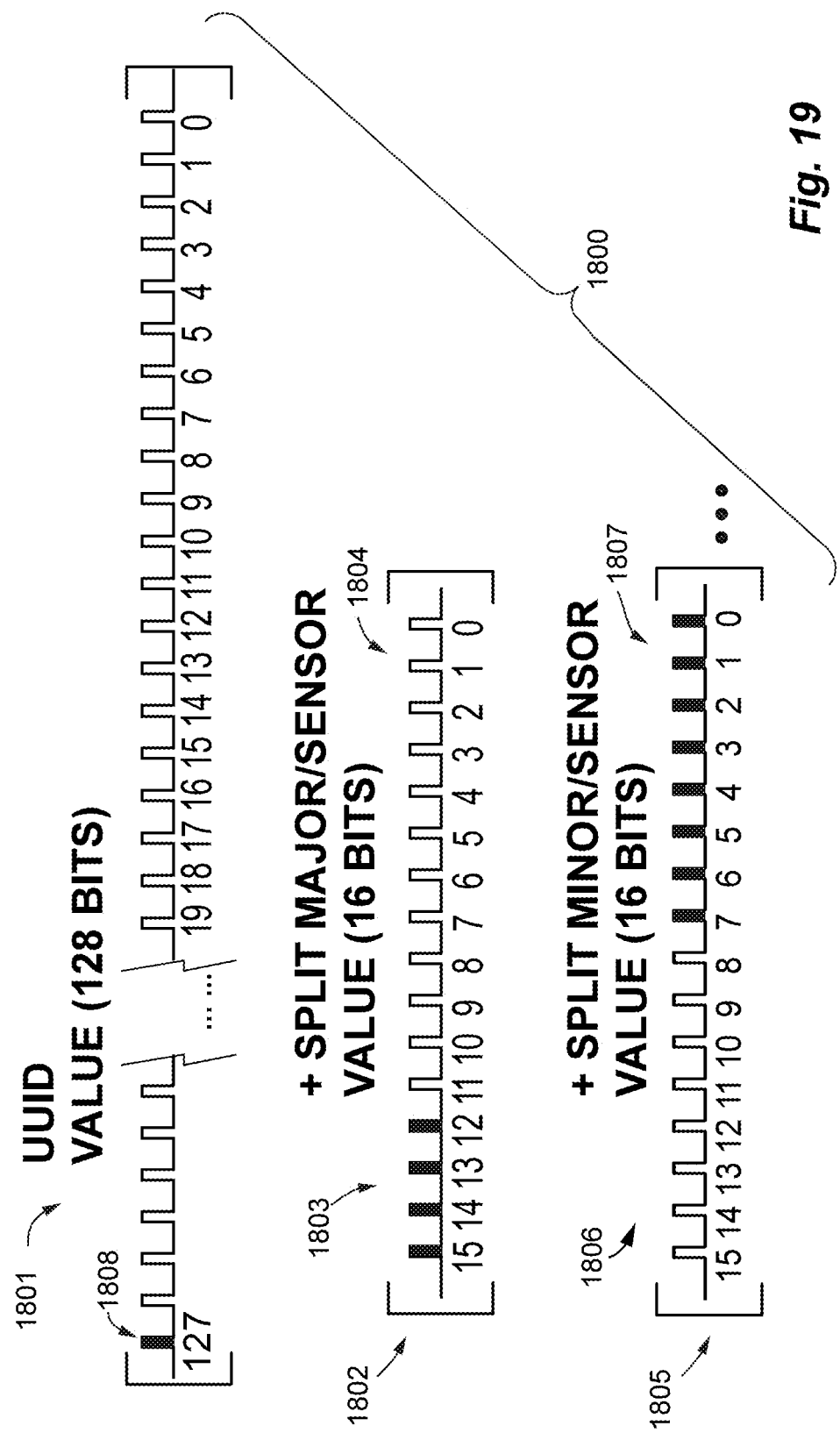
FIG. 19 illustrates a view of a message in which "bit overloading" of frames is used to transmit sensor signals within the bit structure of a standard communications protocol.

FIG. 19 shows a view of a message in which bit overloading is used to transmit sensor signals. Advantageously, because the data is highly compressed, typically a few hundred bytes or less per transmission, the load on the network is minimal. Thus a network may include more transmissions per unit time, but because each transmission is a flickering transmission, the network is not slowed significantly by the increased radio traffic. Rather than collect sensor data by asking the host to perform top-down queries, the sensor data is promiscuously uploaded whenever an opportunity presents, and the cloud host works with messages as they are received. This simplifies the organization and execution, leading to improved resource efficiency through sharing.

Sensor data may be overloaded into messages in "first sensor value" and "second sensor value" frames within a standard communications protocol. The formatting is configured to be compliant with a low power packet communications format (without disrupting the underlying protocol) but contains encoded sensor output from a sensor unit associated with the originating radiobeacon. These messages may be upswitchedly transmitted in a broadband communications protocol to a cloud host that is competent to decode the sensor data.

In order to conserve bandwidth and to ensure unambiguous transmission of sensor data from the radiobeacons, framing of signals and loading of the sensor data is performed. The loading function may be performed by an encoder associated with a radio emitter or may be performed by software executed in the emitter module or by a processor associated with the emitter. The signal broadcast by the radio is generally packeted or otherwise configured to contain an identifier value (UUID), and one or more frames of the message, where, in part at least, output in digitized form insertedly encoded in one or more standard frames of a communications protocol as describe above. Thus the encoder function (see for example 80b, FIG. 7B) may be a stand-alone circuit operating to configure the radio signal or may be integrated into either the processor or the radio emitter if desired and may be implemented using software or firmware or a combination of both.

For overloaded transmission message 1800, both the first frame 1802 and the second frame 1805 are split between static conventional data and dynamic sensor data. UUID broadcast 1801 is followed by a split value in which the protocol allows four reserved bits 1803 for owner-specified information such as location or direction and up to twelve reserved bits 1804 for a digitized dynamic output from one or more sensors. Similarly, a next frame may contain eight reserved bits 1806 for beacon naming and eight reserved bits 1807 for dynamic sensor data. Some frames may be termed "major value" and "minor value" and may be overloaded with sensor data as described here. The message with reserved bits may be read by the processor, may be written to memory, or may be upswitchedly transmitted onto a cloud host in a broad area network. Reserved bits may be selected from least significant bits or most significant bits, or may be reserved bits at any point in the frame. For example, bit 1808 may be high or low as indicative of whether a switch is open or closed. In this way sensor data is overloaded on transmissions while complying with standardized radio communication protocols so as to minimize cost to the system for implementation.

Figure 20A:
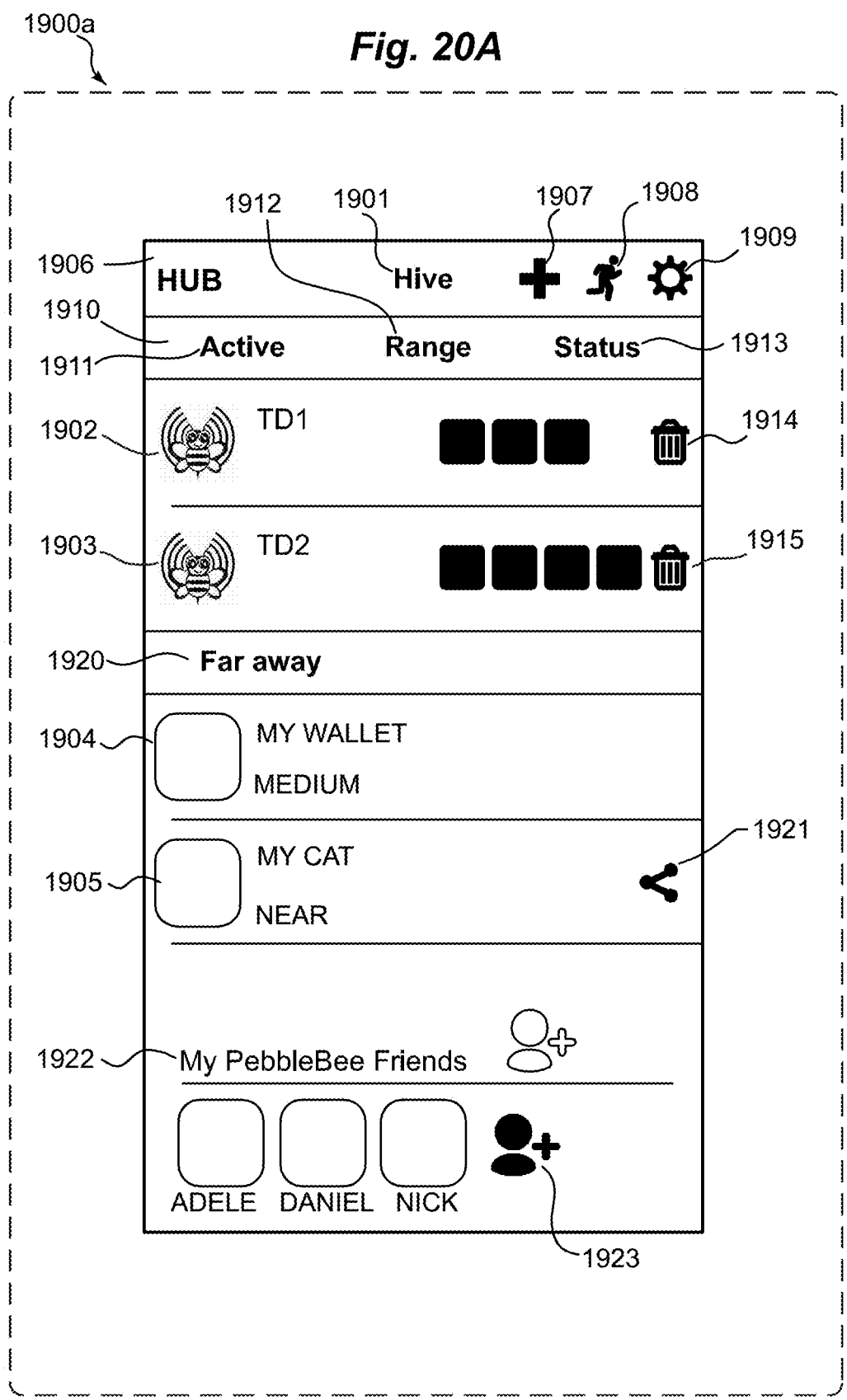
FIGS. 20A and 20B are screenshot views of graphical user interface displays. The displays are generated by an exemplary software application of the invention on a nodal device or other computing machine.
Figure 20B:
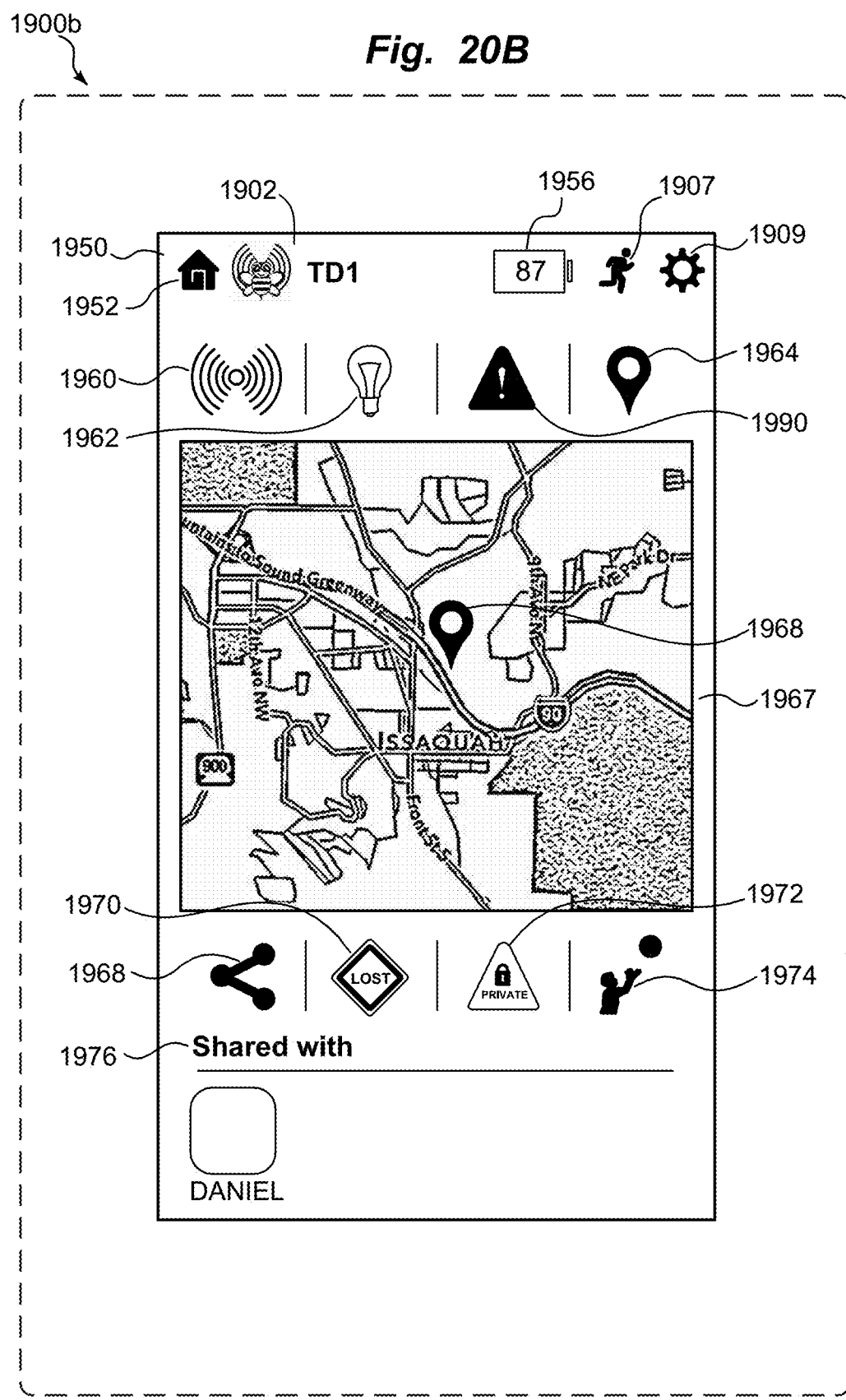

FIGS. 20A and 20B are representative views to illustrate screenshots of graphical user interface displays generated by an exemplary software application of the invention as displayed on a nodal device or other computing machine, here represented by a common smartphone screen.

FIG. 20A illustrates a first screenshot 1900a. The application is operative in cooperation with a cloud host in managing a radiobeacon notification system. A setup routine detects radiobeacons indicated by icons 1902, 1903 in the vicinity and offers the user tools to monitor and configure the rules and privileges associated with each radiobeacon. The rules and permissions may be stored on the nodal device or on an administrative server. Radiobeacons may be physically attached to objects of interest by the owner; a process termed here "radiotagging". The cluster of radiobeacons 1902, 1903 on defines a hive (icon, 1901) administered by a hub. The screenshot illustrates how to configure the hive. In the top banner 1906, shown are control buttons 1907, 1908 and 1909, respectively, for enabling the smartphone to receive and send bluetoothed transmissions, for releasing one or more of the radiobeacons from the hive, and for setting a toolbox of settings for the radiobeacons. Banner 1910 defines columns for active devices 1911, their range 1912, and their status 1913. For example, radiobeacon 1902 (icon TD1) has a range indicated by three bars and a status showing a can icon 1914. In the next row, another radiobeacon 1903 (icon TD2) with signal bars and can 1915. The can icon is used to indicate that the radiobeacon is under the owner's control but can be released if so desired.

In the hive there are several more radiotagged objects below the banner titled "Far away" (1520). These radiobeacons are not within range of the low energy radioset. The faraway objects include My Wallet 1904 and another object named "cat" (1905). The cat is networked (icon 1521) to indicate that the radiobeacon physically linked to the cat's collar is shared with another user.

Near the bottom of the screenshot, banner 1522 shows "Friends". A friend is any other user who has some control and shared access over one or more of the radiobeacons. The icon 1523 may be pressed to add new friends. Also shown are existing friends, as may be updated by pressing any of the buttons in the row.

The computer program enables the nodal device to detect radiobeacons within range of the nodal device and acquire control of the radiobeacon unless another nodal device already controls the device. The nodal device may also release from its control one or more selected radiobeacons. The control program also allows the user to keep private the information of the tracking device. Once set to private, only the nodal device or other designated apparatuses or individuals will have access to data from the radiobeacon.

The control program allows the user of the user to select at least one alert. The nodal device or the radiobeacon or both may generate the alerts. In order to trigger the alert, the radiobeacon broadcasts a radiobeacon signal via a bluetoothed transceiver.

In a preferred embodiment, range is a trigger for the radiobeacons. On the nodal device the user may define one or more ranges for generating responses including alerts. One potential use is keeping a parent advised of the relative location of a child while shopping in a store. Different responses or alerts could be given at different ranges as the distance between the child and the parent varies. When used with a hive, a trigger may be given when a radiobeacon leaves or enters the hive.

The signal strength of the radiobeacon signal received by the nodal device is representative of the distance or range between the nodal device and the tacking apparatus. The signal strength is considered a condition for a distance alert. If a nodal device suddenly receives a radiobeacon signal of a controlled radiobeacon, the nodal device may indicate the device has returned to a location proximate the nodal device. Likewise, failure to detect a radiobeacon signal of a controlled radiobeacon indicates the device is outside the range of the nodal device. The relative strength of the radiobeacon signal is proportional to the proximity between the nodal device and the controlled radiobeacon.

The nodal device or the radiobeacon or both may monitor other conditions. Each other condition and combinations of two or more conditions may be paired or otherwise associated with each other to provide multiple conditions for triggering an alert. In addition to the range signal radiobeacon, the radiobeacon may carry one or more sensors and each sensor may output one or more signals representative of other conditions monitored by the sensors. Other conditions include and are not limited to motion of the sensor in any direction or in a particular direction; temperature and other signals representative of time, the geographic location of the radiobeacon or motion and other physical, biological or chemical conditions being monitored by sensors. As such, each condition monitored may be associated or paired with any other one or more conditions to provide multiple conditions that must be met to trigger an alert.

Time of day may be combined with other trigger signals to enable or disable one or more alerts, such as enabling a motion alert during the night but disabling the alert during the day. Other trigger signals and their combinations and/or sequences are possible with added sensors. The radiobeacons of the embodiments of the invention may use any of a vast number of sensors including and not limited to sensors for motion. Distance, velocity and acceleration, temperature, pressure, battery status, magnetic fields, gravity, humidity, moisture, vibration, pressure, light, electrical fields, ionizing and non-ionizing radiation, cosmic rays, and other physical aspects of the external environment; analytes for chemical or biological substances including and not limited to sensors for detecting toxic compositions such as carbon monoxide, carbon dioxide, methane, and other hazardous or poisonous components. The radiobeacons may be worn as badges by personnel to detect ambient analytes and physical parameters. The data collected by the radiobeacon may be sent to the data collection center of a cloud host 1000 where others can analyze it and provide responses or alerts to the personnel wearing the radiobeacons.

FIG. 20B is a screenshot 1900b representing an exemplary graphical user interface for reporting locations of radiobeacons superimposed on a physical map of a defined area as displayed on a typical smartphone. The map can be zoomed in or zoomed out. Objects associated with a particular radiobeacon by an owner of the radiobeacon can be reported as lost to the cloud host server and if the radiobeacon identifier is detected by one or more other nodal devices, the cloud host server generates a map for the owner showing an approximate location of the device, for example as a set of GPS coordinates and a thumbtack centered over the objects likely location.

A top banner indicates an exit to a home page (icon 1952), and an indicium 1902, indicating that the display relates strictly to radiobeacon TD1. Indicium 1956 shows battery strength for the radiobeacon in percent; indicium 1907 is the release control command, and 1909 opens a toolbox of advanced user settings for configuring the radiobeacon. The next banner shows leftmost an indicium 1960 which when touched with immediately sound the audible homing signal for locating the radiobeacon when lost. The speaker in the radiobeacon will sound intermittently until the user finds it. Similarly, the indicium 1962 when touched activates an LED in the radiobeacon, making it easy to find in a darkened room or at night. Light is strobed periodically to help the user find the missing radiotag. If the radiobeacon is equipped with a vibrator, another symbol would be shown to activate the vibration. Triangular icon 1990 takes the user to a screen with options for setting alerts. The user may select the kind of alert (audio, light, vibration) and may pair the alert with contingencies such as distance or motion. Remote control may also be established between the smartphone and the radiobeacon. As explained above, a radiobeacon may control the smartphone and vice versa. If desired, the user may have an alert show up on the user's smart phone under one or more conditions. The user may operate a loudspeaker on the radiobeacon. The user may also for example set an alert when the battery is low. Other alerts can be set for separation distance of the radiobeacon and the smartphone. Controls will also configure the multi-function button, allowing the user to remotely operate the camera of the cellphone, or to send a pre-determined email or message by the press of a button. Further alert settings may depend on conditions such as location pairing. In this case, the alert is conditional and occurs only when the radiobeacon is at home, such that other alerts apply when the user is at work. Locations are identifiable by latitude and longitude and by range.

Icon 1964 is a map pin. Touching the map pin changes the screen shot from a range grid to a physical map 1967. The map includes a map pin symbol 1968 showing the approximate location of the radiobeacon 1902. The location is acquired from other nodal devices in its vicinity by sharing resources as described above. In the lower banners, icon 1968 again indicates shared control or access to a particular radiobeacon. Icon 1970 allows the user to quickly post a lost device on the cloud host. Selecting symbol 1972 marks the TD1 radiobeacon as private and only a privileged user may see the data generated from TD1 as well as the location of TD1. Data may be encrypted by the encoder as needed. Encrypting means are described for example in U.S. Pat. Appl. Doc. No. 61/892,178 titled: "Beacon Obfuscation by Time Based Association Key" which is incorporated herein in full by reference. Other encryption methods are known in the art. Symbol 1974 allows the user to release all control of the radiotag TD1. At that point, the radiotag TD1 may be claimed and controlled by any other authorized user. The bottom banner 1976 indicates other users with whom the current user has shared TD1.

Radiobeacon embodiments with a nine-axis temperature sensor package may be used to pair location, time, temperature, direction, and position, velocity and acceleration in each of three directions. For example, a user could set an alert to show whether the speed of a radiobeacon 1902 exceeded a threshold of ten miles per hour in the time between 10 AM to 11 AM on Aug. 4, 2014, when the temperature was between 75-85° F. while traveling north (0-90°) within the city limits of Seattle, WA. As such, motion, time, temperature, heading, and location may all be paired together or in any combination of one or more types of sensed information to set an alert. The pairing of radiobeacon 1902 with a smartphone having GPS has endless possibilities. Motion data can be configured to user-defined alerts that include activating the speaker and LED. For instance, if a user was jogging and his speed dropped below a threshold, the speaker on the radiobeacon would buzz. In another embodiment the radiobeacon monitors temperature outdoors, and buzz from speaker accompanied by a notification on a smartphone could warn the user when the temperature dropped below a level that would harm outdoor plants.

In some embodiments the 9-axis sensor enables the systems of the invention for gestural control of functions of nodal devices. A program application installed on a nodal device records motion of a radiobeacon and associates the recorded motion with a function of the nodal device. With the application installed and running, the nodal device records a motion or set of motions of the radiobeacon such as a gesture. In other application-driven uses, a user may map out specific locations, click the button and the radiobeacon will save the place of interest. For example, a surveyor could walk a specific path, and mark specific points of interest such as corners of a road, or edges of a hill. The geographic properties of each point of interest would be saved and mapped out. Thus, the radiobeacons when used with systems and network architectures of the invention have uses in the fields of gardening, home security, child monitoring, health/fitness, sports applications, navigation, commercial and industrial monitoring and safety appliances, while not limited thereto.

Figure 21A:
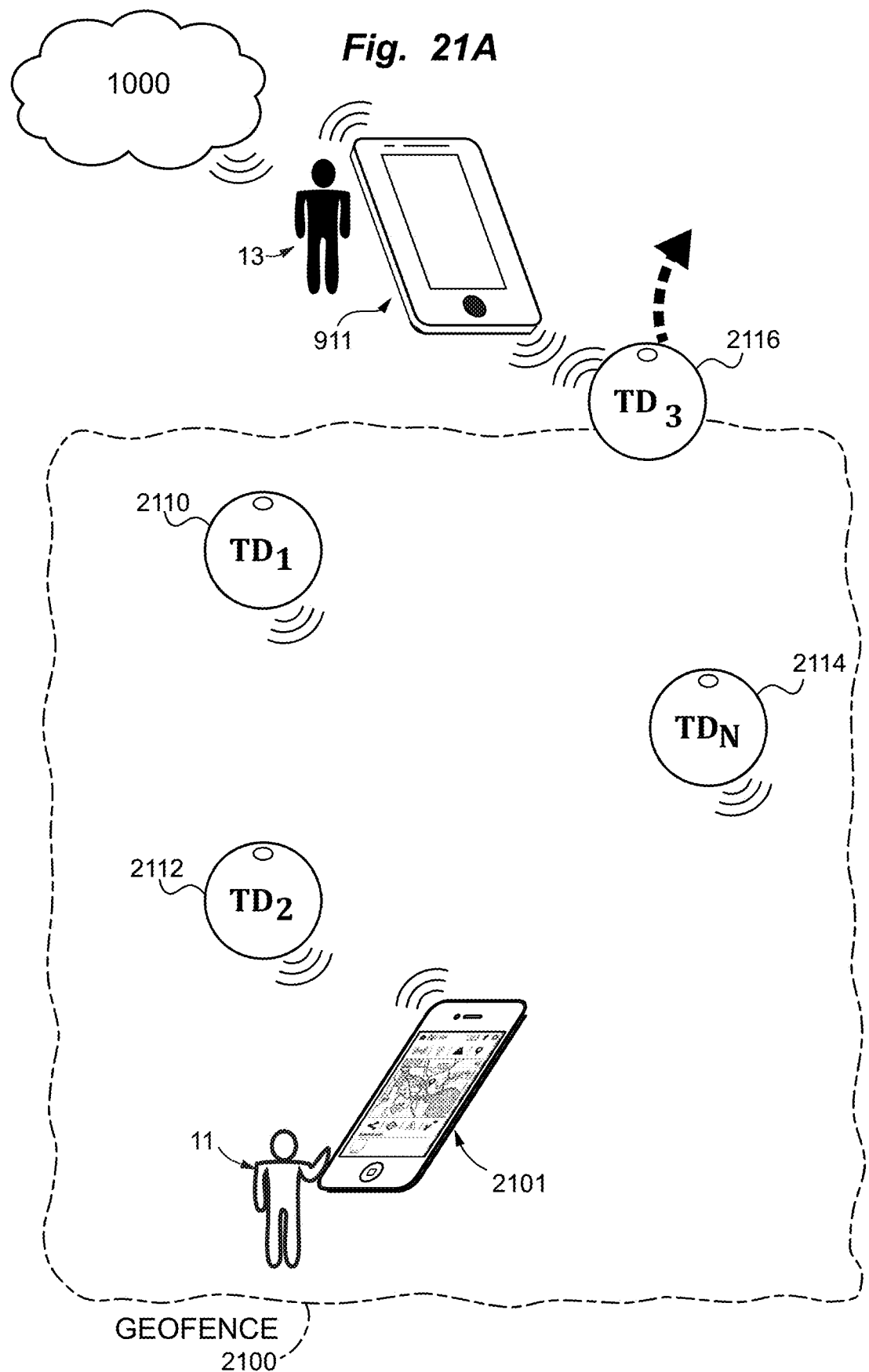
FIG. 21A is a view of a system for using a geofence to monitor the location of a plurality of radiotags.

FIG. 21A describes the use of cloud cutting to enforce a geofence 2100. For illustration, radiotags TD1, TD2, TD3, TDN (2110, 2112, 2116, 2114) are assumed to be associated with selected assets belonging to or of interest to user 11, where 'N' is an integer indicating a number of assets having radiotags. While the radiotags may be associated externally with assets by any convenient mounting or attachment hardware, the tags may also be build into or embedded in the assets. Each radiotag is registered on the user's personal smart device, shown here as user/owner's smartphone 2101 for example, on which is operated an "application" or "control program" that includes user-customizable instructions and user interfaces for tracking radiotags. Also defined by programmable software on the smartphone 2101 is geofence 2100. The geofence is defined as a zone or location by the user and is stored in a user profile on a cloud host or in the user's smart device.

Geofences may be stationary around a fixed location, or may be mobile and move with the owner, for example. A stationary geofence can be defined by GPS coordinates or by reference to a location such as "home" or "office" having fixed coordinates. For example, the geofence can be described by (a) coordinates for a northwest corner and a southeast corner of a rectangle or more properly a "spherical rectangle" to describe a geographic area, (b) a center coordinate and a radius or diameter, or (c) a GeoJson-formatted list of points that outline a polygon; (d) the geographic area between any two latitudes and any two longitudes; (e) the area above or below an altitude bounding a hill or a valle; (f) known dimensions of a room or building with reference to a fixed point in space and time; without limitation thereto. A stationary geofence may also be defined by a range in radio proximity to a fixed transmitter.

Mobile geofences may be defined by the boundaries of radio contact or proximity to a moving radio transmitter, such as user's smartphone, for example.

Each geofence having been defined by the user and stored, the cloud host then manages the system so that any report to the cloud of a radio contact with any one of the radiotags TDN for which associated location information in radio contact report is in discrepancy with the expected boundary conditions of the geofence results in an "exception notification" to the user/owner 11 via smartphone 2101 or an equivalent. The exception notification can take the form of a LEFT BEHIND ALERT or a LOST ALERT, for example.

The system includes a community of users, each operating a nodal device that scans for radio contacts and reports them to the cloud host. In this system, radio contact reports will contain a timestamp and a geostamp. Nodal devices having a copacetic application will routinely report radio contacts to the cloud host, even if the report is made by an anonymous user of the community of nodal devices. The "exception notification" is made when the radiotag location associated with the reported radio contact at some future time when the radiotag is not where it is expected to be. The discrepancy likely indicates that the associated asset has been taken away or has left with some other agency, not the owner, or alternatively that the radiotag has been left behind or dropped when the owner moved on. Effectively, the system becomes a watchdog that monitors location of the assets and issues an alert to the registered user/owner if a detected location is not within the geofence.

Thus for example if an asset associated with radiotag TD3 (2116) leaves the area demarcated by geofence 2100, the next radio contact with a nodal device 911 will result in a radio contact report to the cloud host and the cloud host will issue a notification to owner's smart device 2101 that indicates the time and location that the errant radiotag 2116 was detected. This reporting is done courtesy of the community of users in background so that anonymous user 13 is not required to make any effort to provide that service via nodal device 911.

By extension, multiple nodal devices may provide a continuing trail of radio contact reports that show movements of the errant radiotag 2116 outside the geofenced area. And if the asset TD3 left with some authorized user, the system may be able to note that radiotag TD3 has paired via its bluetooth radioset with the authorized user's smart device, and that information will also be forwarded via the authorized user's smart device to the cloud host if that smart device also operates the system-compatible application. In this way, for example, an employer can keep track of assets that are routinely taken to job sites by employees and returned at the end of the day to a shop or central warehouse. The timestamp may also be helpful in allowing a user to set complementary time restrictions on the geofence so that short term borrowing by authorized users is permitted, but overnight deviations of location reports from the expected location within the geofence results in an exception notification. Where the asset left with an authorized user, the notification can also be sent to the authorized user with a query asking for an explanation, and when the asset left with a stranger, the system can attempt to track the device using reports from nodal devices of the community of users until the asset is returned to its expected location within the geofence.

Figure 21B:
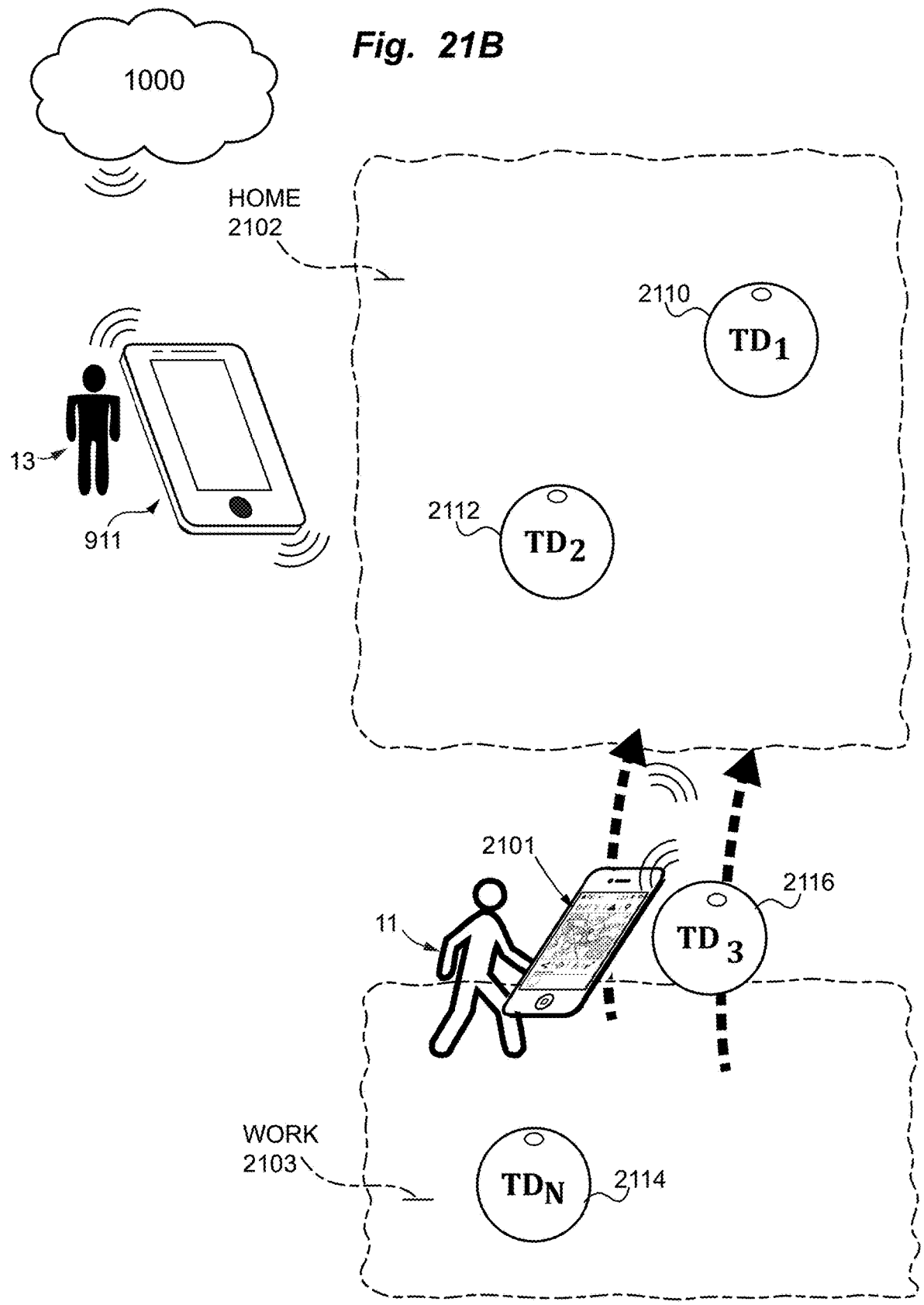
FIG. 21B illustrates the user of multiple geofences to automate monitoring of the location of a plurality of radiotags

FIG. 21B shows a variation in which a user programs a first and a second geofence, shown here as a home location 2102 and a work location 2103. Each geofenced area 2102 and 2103 is defined by GPS coordinates or by a radius around a fixed location. In this instance, the user 11 may carry an asset tagged with radiotag TD3 between the two geofenced areas. If the system is routinely receiving radio contact reports from the user/owner's smartphone 2101 that indicate the radiotag is travelling with the user, then any radio contact reports received from an anonymous user 13 via nodal device 911 are ignored, and once TD3 is moved from one geofenced area 2103 to the other geofenced area 2102, any report of contact with radiotag TD3 indicates a satisfactory condition—provided the signal is consistent with a location inside one of the geofenced areas. However, a report of a signal receive outside both designated safe areas when not in the company of the owner's smart device will result in an exception notification. Similarly, radiotags TD1, TD2 and TDN may be located in either geofenced area, and no alert will be issued unless those radiotags are detected outside their home or office locations when not accompanied by the owner's smartphone 2101. If any of the radiotagged assets are not in their expected local areas at designated times programmed by the user/owner, then a "taken away" or "left with" alert will be issued to the user/owner via smartphone 2101 or to a secondary authorized user via the smart device carried by that user. In this way friends and associates can share assets will still ensuring that unauthorized removal of an asset will be noted and tracked by the cloud host. These actions are all managed on the cloud host with essentially no burden on the community of users.

The geofence can also be defined by a boundary in radio proximity to a reference or master radio device such as smart device, to a mobile hub, or to a master radiobeacon, in which the geofence moves with the master radio device. Two or more radiotags can define a geofence such that the boundary is a zone contiguous with an area limited by a range or a radio signal strength of any one of the master radiotags. A "hive" may define a geofence with respect to the members of the hive such that any device that falls out of contact with the hive has left the geofenced area and could trigger an exception notification to the owner/user.

And a geofence can be time-dependent, such that geofences are enforced only in certain time blocks, for example. Geofences can be exclusive or additive, such that any two geofences may define a single safe zone, and the administrative host will not generate an alert unless the radiotag is not within either of the two geofences.

Other sensor information can complement administration of a geofence. As illustrated in FIG. 21B, any discrepancy between the motion of the hub or radiobeacon and the radiotags will result in an alert. In this instance, TD3 (2116) is moving with user 11 but TDN (2114) is not, causing a LEFT BEHIND ALERT to be issued even before the owner has left the area defined by work geofence 2103. Motion discrepancies can involve loss of signal and/or signal detection outside a boundary defined by radio contact with the designated mobile hub or radiobeacon. Motion discrepancies may also be detected if relative signal strength is changing at a receiver. Preemptive alerts can also be issued by the system if accelerometric motion of the assets is not copacetic with accelerometric motion of the designated hub or radiobeacon, as would be evident if motion of a user/owner's smart device (having an internal radiobeacon and accelerometer) is not consistent with accelerometric motion data reported by a radiotag TD1, TD2, TD3 or TDN. Any radiotag that is stationary when the user's smartphone is mobile could indicate that something has been left behind, and any device that is moving but moving in a direction away from the user's smart device would also trigger a wayward motion alert.

In this way, the user can establish a mobile safe zone 2104 as shown in FIG. 21C. Within the safe zone, if one radiotag, for example TD2 is moving away from the user 11, but another radiotag TD1 is moving with the owner, the relative motion suggests a discrepancy that can trigger an alert from the cloud host, as would be sent to smartphone 2101 and pushed onto the display, or made evident by vibration of the smartphone, for example, to alert the user that something that was being carried is missing, dropped or otherwise no longer where it should be. Advantageously, by monitoring relative motion, the cloud host or the user's smart device, can detect the discrepancy before the radio signal is lost. Prompt alerts simplify the process of retracing one's steps to find the lost item and thus motion data, when paired by the cloud or by the user's smart device, can indicate a discrepancy between where an asset is relative to where the user is going that can be converted into a valuable exception notification. Radiotags equipped with motion detectors can provide a valuable stream of data that can be compared with output from a like motion detector in the user's smart device. To minimize false alarms, a filter is provided that bins consecutive motions to detect any cumulative motion that departs from a copacetic pattern, such as a discrepancy in a simple pattern of impacts in a user's footsteps that may be lacking in the motion reported by the radiotag or reflect a change in cadence. Other easily recognized discrepancies are the changes associated with a getting into or riding in a moving vehicle, which would be readily detected even before radio signal was lost.

Referring again to FIG. 21C, objects left behind in an office (TDN and TD3) are distinguished by the system as having a location within the work geofence 2103 and are stationary. These are properties that can be distinguished from asset TD2 (2112) which was with the user upon leaving work but now has a vector and motion 2113a output that is at odds with the motion 2113b of the user 11. The system will report, for example, that the user has the radiotag (2110, TD1) attached to their keys with them, but the radiotag (2112, TD2) in their wallet is about to be lost (along with the wallet). Radiotag (2114, TD3) attached to an umbrella, and radiotag (2116, TD4) attached to a briefcase are left in the geofenced area 2103 at the office.

Figure 22A:
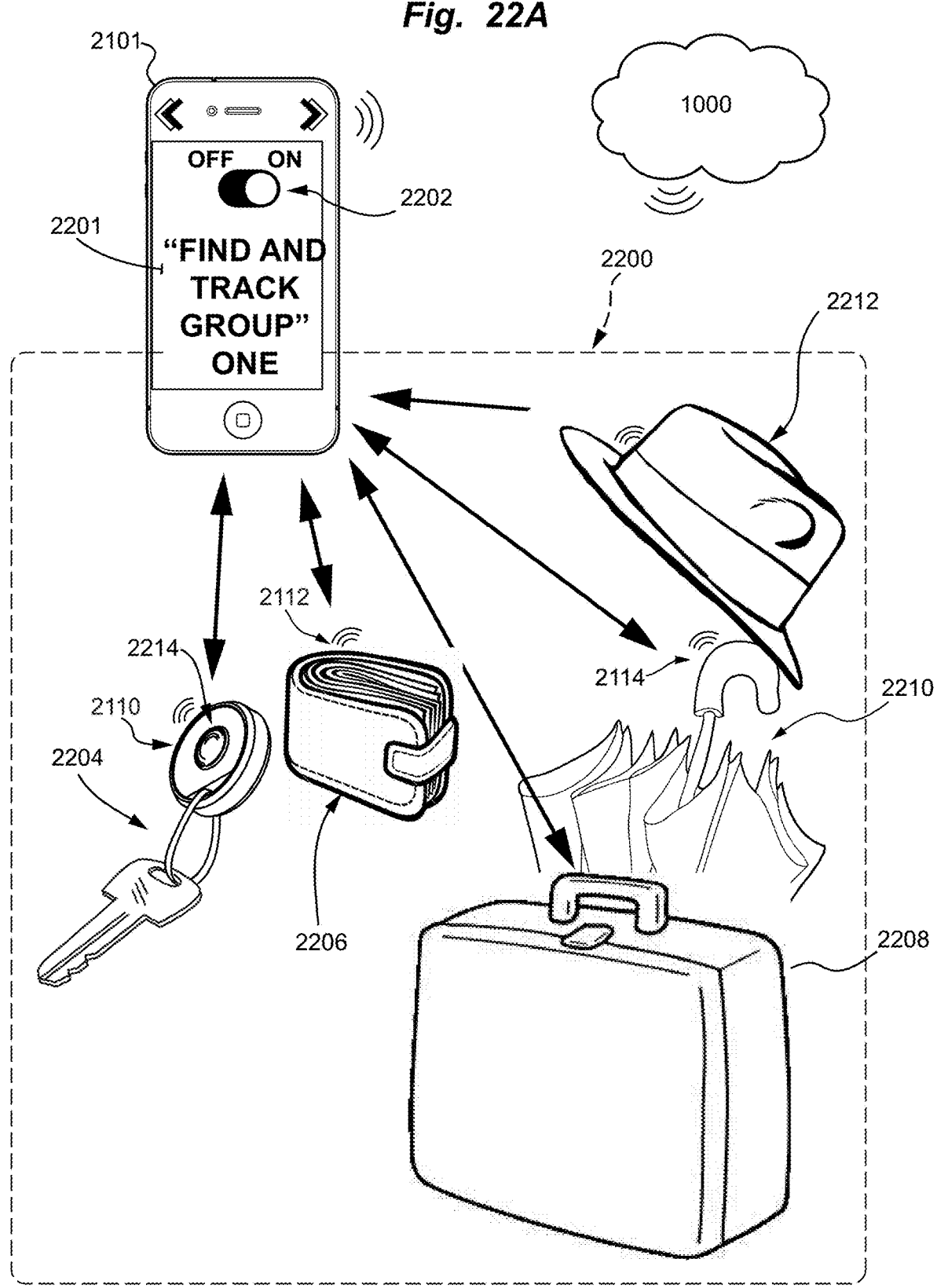
FIG. 22A introduces tools for managing location monitoring and tracking radiotags associated with a group of assets.

FIG. 22A illustrates a system for tracking radiotagged objects as a user-defined group. Here five objects (having five radiotags) are part of a group 2200 that includes a keychain 2204, a wallet 2206, a briefcase 2208, the umbrella 2210, and also a hat 2212 is shown in the following figure. Each object is associated with a radiotag that may be attached physically as shown for radiotag 2110 (attached to a keychain 2204), may be inserted as for example a credit-card sized radiotag in wallet 2206, may be placed inside a object such as briefcase 2208, or in a hatbrim, for example, or may be permanently built into the object, as for example a radiotag 2114 embedded in a plastic handle of umbrella 2210.

The system requires an application installed on a smart device 2101. The application or control program 2201 includes instructions executable by a processor of the smart device that cause a display of a user interface and tools for managing a group of radiotags. The interface is designed to allow the user to define a group or groups of objects (each having a radiotag attached or embedded in the object) and to find or track those objects as a group or individually. The teachings of co-owned U.S. patent Ser. No. 16/207,192 titled "Tracking Device Program" are incorporated herein in full by reference.

A single screen is used for each group. Each object is fitted with a tracking device or the tracking device is embedded in the object. FIG. 22A illustrates a control device (here smartphone 2101) set up to track multiple radiotags attached to objects that make up user-defined group 2200 and to operate in coordination with an administrative server or cloud host 1000. The control program 2201 is referred to generally as a "find and track group" feature and enables a user to individually locate items using radio proximity or using a buzzer, bell or light built into the radiotag. The group feature may be turned on and off using soft slider control 2202. In this illustration, the keychain 2204, wallet 2205, briefcase 2206, umbrella 2207, and hat 2208 are selected as a group that is typically needed before going to work.

As for the FIND PHONE feature described earlier, the multifunction smart button 2214 of a radiotag can also be used to round up any of the other object/radiotags that are missing, avoiding the need to pull out the smart phone and navigate to the user interface. For example, by pressing and holding smart button 2214, the other members of the group, including the smartphone 2101, will light up or sound off to make their locations known. Thus the keychain can serve as a simple radio tether that is useful in keeping track of other essential items of the group. The application 2201 installed on the smartphone 2101 can coordinate the radio signals sent to each member of the group, or for some Bluetooth-enabled systems (described further below) the members of the group can send signals to each other.

If some member of the group is not responsive, or is lost, the cloud host 1000 is able to begin a search. The nodal devices of the broader community will detect the Bluetooth signals from the radiotags of the group, report the signals to the cloud host, and the cloud host will send a notification to the owner-user of the group. The notification can be sent, for example, to the display of smartphone 2101, and can include a map showing where the missing radiotag is. The owner-user can manage the group and the individual radiotags of the group essentially as described for FIGS. 20A and 20B but with the added convenience of being able to manage the objects as a group of related objects. A contractor who tags power tools with radiotags can also organize a group that shows where all the tools are on a single screen accessible with a single command in one embodiment. A sample user interface demonstrating group management tools is shown in the following figure.

Figure 22B:
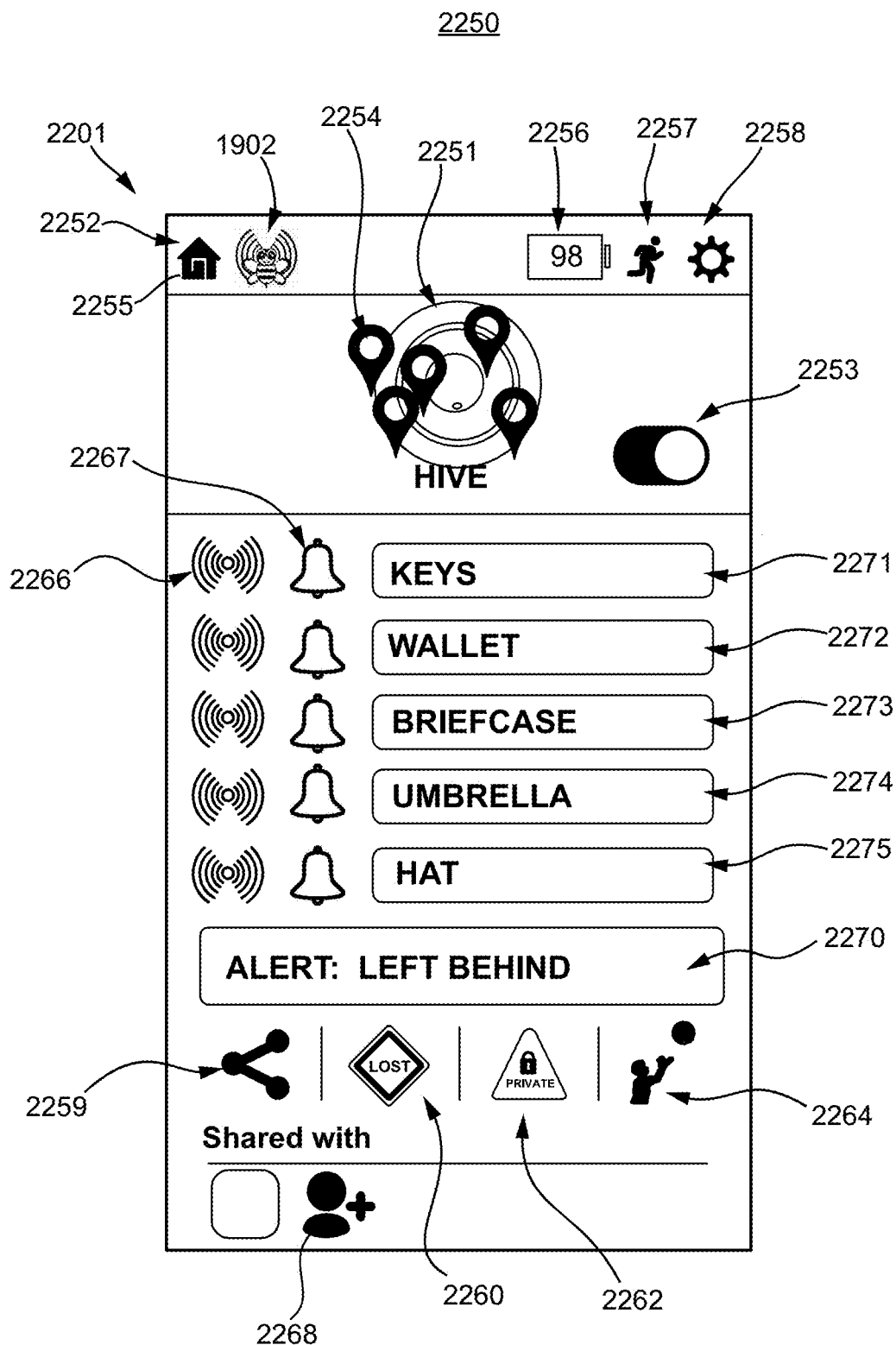
FIG. 22B illustrates some of the tools available in a screenshot of a program or "app" for monitoring and tracking the group as a unit on a smartphone.

FIG. 22B is a view of a screen shot 2250 of a control program with graphical user interface, the screen having user interactive controls for finding and tracking groups of objects. The application 2201 when installed on the user's smart device 2101 (FIG. 22A), causes the interactive screen to be displayed and manages user entry of program choices. Top center includes a bullseye 2251 that represents a general map of the radio field around the control device. Each of the five objects is mapped with a map pin 2254. Soft switch 2253 enables the user to switch off the group when for example only the car keys are in the user's pocket and the user intends to leave the other items where they are. If soft switch 2253 is turned ON, then the system will alert the user if any of the radiotags of the group are left behind or if there is an exception to expected location or motion of any one of the items.

The control program also permits the user to define a geofenced area 2200 where the radiotags are expected to be. The geofenced area can be a set of coordinates for a place, but can also be an area or zone defined by radio proximity to a radiobeacon in another embodiment.

Also shown on the top banner 2252 are soft buttons for "home" (2255), for hive (1902, referencing FIG. 20B), a battery charge indicator 2256, a soft button 2257 used to release control of the radiotags, as used to change ownership or change permissions, and a menu pulldown 2258 for general settings. In the bottom banner, symbol 2259 indicates networking, sharing a designated radiotag with a friend or another user. Soft button 2260 designates a radiotag (and attached object) as lost. Soft button 2253 reserves the radiotag for private use and limits access. Soft button 2264 allows release of a particular radiotag.

Five fields (up to seven are possible in this embodiment) are provided so that the user can label each radiotag with a familiar name. Shown here are user-defined fields that are user-labelled as "KEYS" 2271, "WALLET" 2272, "BRIEF-CASE" 2273, "UMBRELLA" 2274, and "HAT" 2275. These correspond to the objects shown in FIG. 22A, but any objects selected by the user may be programmed as a group and the example given here is not limiting to the applications that a user may create.

Icons 2266 show that each radiotag signal is being received by the control device. Soft buttons 2267 allow the user to generate a visual or audible alarm in any one of the objects of the group. Soft button 2268 allows the user to designate shared use of some items, such as an umbrella, so that its location or motion when accompanied by a shared user does not trigger an unwanted alert.

During the day, all the radiotag signals are monitored by the control device processor, each signal having a unique identifier and a sensor data payload. Depending on how the user sets up alerts, motion, proximity, temperature, or other sensor outputs can cause the processor to execute an alert.

An EXCEPTION ALERT occur when the system detects an exception to a rule. An exception notification may be sent to the owner/user according to a set of rules established by the owner/user or by a system administrator. Here, a sample alert LEFT BEHIND is displayed 2270 on the screen 2250. This would occur if the group was registering movement or a change in location, such as when the owner is leaving a room or walking on the sidewalk, but one member of the group was not showing corresponding motion or was showing a decreasing received signal strength indication on an owner's smart device. The alert will occur on the control device if the group member is left behind. An alert will occur on the radiotag or radiotags if the control device is left behind. Comparison of discrepancies in motion signal data can be interpreted to determine which situation exists. A related alert is an OUT OF RANGE alert when a device has dropped out of radio contact unexpectedly.

The alerts can be staged so that a first geofenced area is active between the hours of 8 AM to 5 PM for example, when the tagged objects are expected to be at work, but a second geofenced area is active between the hours of 10 PM to 7 AM for example, when the objects are expected to be at home. Multiple geofences can also be used. One geofence can be a physical area, as for example home or work, and the other geofence can be a radiofence defined by radio proximity to the owner's smart device.

The OUT OF RANGE alert will typically occur on the control device 2101 if any one member of the group loses radio contact with the control device; if multiple members of the group lose radio contact with the control device, the alert can be configured to occur on at least one of the radiotags that are members of the group. The loss of contact may be preceded by a trend toward lower received signal strength, and the trend may trigger the execution a conditional rule as an alternative to a loss of contact or a threshold decay level of contact. In one instance, a weak signal can cause the system server to issue a command, via a proximate nodal device, to the radiobeacon, instructing the radiobeacon to, at least temporarily, increase its transmitted radio signal strength and to report the transmitted signal strength.

A WAYWARD OBJECT may occur if the smart device is moving in one direction or at one velocity and an object is moving in another direction or at another velocity. This is more likely to suggest that the object (radiotagged) has been taken by a stranger or left in a taxi, for example. By actuation of a LOST button, the user can record the object as missing and can use cloud host resources to find and track the lost object as described earlier.

An OVER LIMIT alert can occur if sensor data exceeds a preset threshold. Similarly, an UNDER LIMIT alert can be preprogrammed. This is useful for example in the wine chiller shown in FIG. 15.

A SEND HELP alert can occur if there is a sudden impact, a rapid increase or decrease in accelerometry data, a sharp noise, very low temperatures, or sustained shaking. The user can confirm a need for help by pressing the multifunction button 11. Similarly, a steady pressure or some recognizable pulse sequence on the button can cause the cloud host server to communicate a possible injury or threat to a 911 operator and provide a location of the radiotag.

Another alarm is a LOW BATTERY alarm. Generally this will occur in daylight hours (as determined by a photocell in the radiotag), and indicates that the user should either recharge or replace the battery supplied with the radiotag.

Other alerts can readily be programmed using basic rules-based instructions and one or more sensor conditions. Sensor data, such as a drop in temperature to freezing or a rise in temperature above freezing, can trigger a fresh set of alerts that are conditional on the sensor data.

Figure 23A:
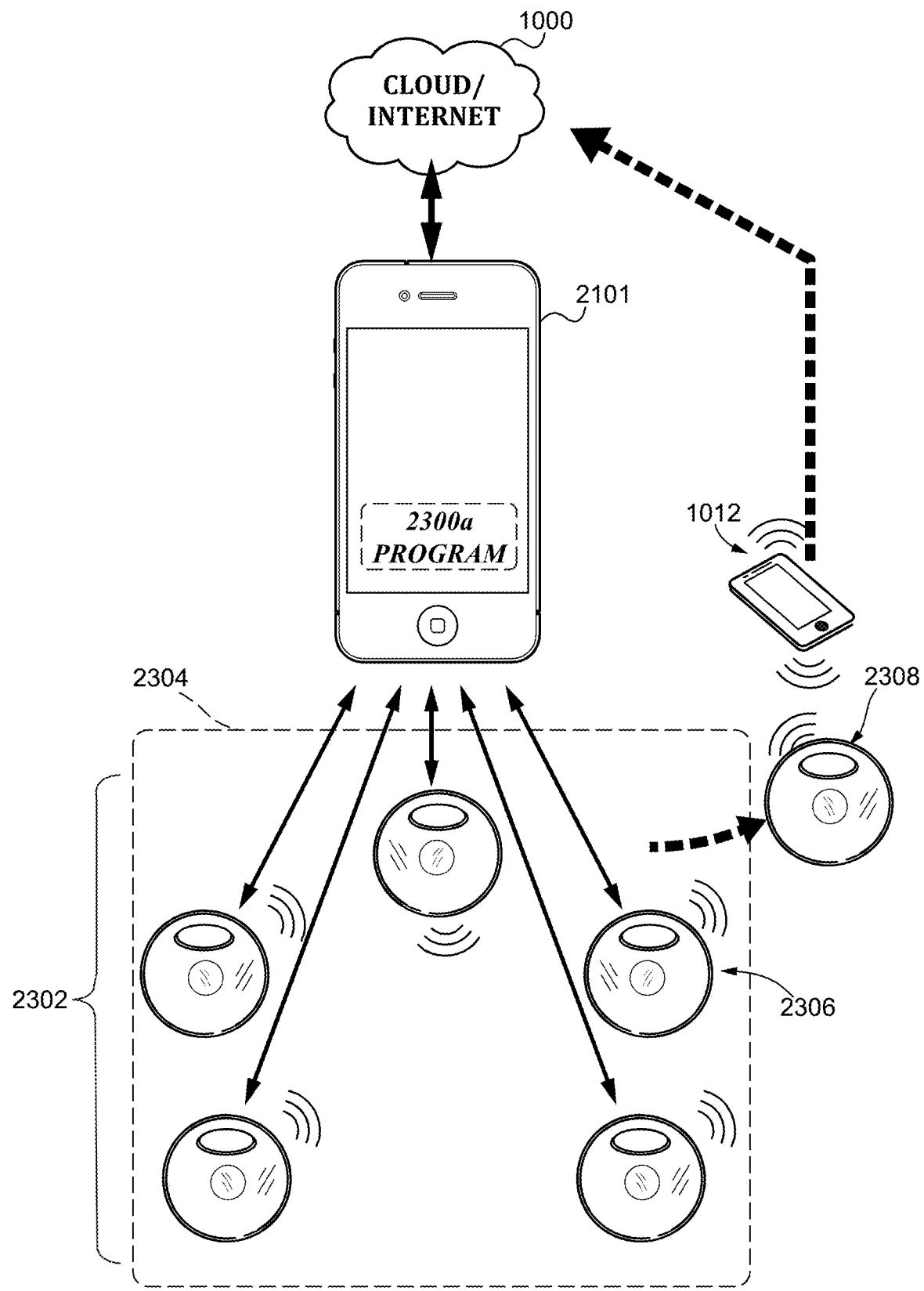
In FIG. 23A, the radiotags of a group are in radio contact with a smart device and the radio contact pattern of a lost radiotag is illustrated as part of a smart network with cloud host.

FIG. 23A is a representation of an application or control program 2300*a* operated on a smart device 2101 that monitors Bluetooth radiobeacon signals from multiple radiotags of a group 2302. Signals from each radiotag of the group are received by smart device 2101 and reported to a cloud host 1000. Typically the smart device is a companion device that is carried by an owner/user and acts as a sort of electronic personal assistant for various functions. In this instance, executive functions in the system reside in the smart device and the cloud host. Using installable application 2300*a*, the smart device is programmed to add a timestamp and a geostamp to the radio contact reports before forwarding the contact records to the cloud host. The smart device may also sort radio contacts so that those radiotags owned by the user/owner of the smart device receive preferential treatment over radiotag signals not recognized. Each Bluetooth radiotag typically reports a unique identifier (UUID) or MAC address as a header and up to several frames or hyperframes of data. As in the discussions of foreground and background services of FIGS. 7A, 7B and 8, the identifiers of radiotags owned in common or shared by the user/owner of the smart device are routed for foreground attention and action according to program instructions whereas signals that have a community identifier but are not associated with the owner/user are routed using background smart device resources to the cloud host. Thus the radiotags are not typically doing more than repeatedly transmitting a simple bitstring that contains their identifier and some programmable fields that might be used, for example, to carry a sensor data payload. As described in FIG. 18, there may be sensor data that is collected by the radiotags, and that is transmitted to the smart device or the cloud host, for example, but the processing of the sensor output is done at higher network levels.

The radiotags of the group 2302 may be in an area 2304 defined by a geofence definition such that any radiotag 2306 that is within the geofenced area is assumed to be where it should be, but any radiotag 2308 that leaves the geofenced area will trigger an exception notification. The exception notification is made when the radiotag signal is detected outside the geofenced area by another community nodal device 1012. The role of community nodal device 1012 is to report the beacon signal of radiotag 2308 to the cloud host 1000. The cloud host determines that the location of the radiotag 2308 is outside the area that is user-defined as geofenced area 2304. According to rules set up by the user or by the system administrator, the system generates an exception notification and sends the message to owner-user smart device 2101. The owner-user can then take corrective action to retrieve the lost or wayward radiotag and any attached asset.

Thus in a first instance, control program 2300a is a non-transitory computer-readable medium storing instructions that when executed by a processor within a host smart device cause the host smart device to perform operations that include a) receiving, from a radiotag, a Bluetooth radio signal, the radio signal having information that includes a radiotag-owner identifier, where the radiotag owner identifier can be a UUID or a MAC address, and can include a community identifier; b) generating a message formatted for a wide area network that includes the information, a geostamp location, and a timestamp, wherein the geostamp location records the location of the host smart device making the timestamp when the radio signal is received; and c) sending the radio message to an administrative server at a designated IP address, wherein the administrative server is enabled to i) in response to the radiotag-owner identifier, associate the radio message with a user profile stored in an administrative database and access a computer-readable definition of a geofenced area in the user profile; ii) in response to the geofenced area and the geostamp location, generate a command or notification based on a conditional rule or rules associated with the user profile and community policies and permissions; and, iii) send the command or notification to a smart device, a remote machine, or an actuation device. The cloud host will compare the location indicated by the geostamp with the geofenced area defined in the user profile, and if the current location is not in the geofenced area, will generate an exception report and send it to the owner-user, or take some other administrative action. The software on the smart device causes any smart device having the software to take actions on behalf of a community of users. And in turn, all those community of users can own radiotags and manage those radiotags individually or in groups. The software also includes an instruction set that enables the smart devices to perform operations of displaying a user interface adapted for displaying the command or notification; displaying a user interface adapted for programming a conditional rule or rules; and displaying a user interface adapted for programming a definition of a geofenced area.

Programming a definition of a geofenced area can occur according to a perimeter defined by a fixed set of coordinates that are entered on the user interface. A definition of a geofenced area can also occur by entering a radius as a distance around a location of a mobile smart device, hub or beacon, for example, so that the geofence is not at a fixed location but instead encircles a defined distance from a mobile radio device. In another instance, the definition of a geofenced area can be made according to a perimeter defined by three or more radiobeacons, each radiobeacon having a fixed location, so that several stationary beacon such as in a smart home, can be used to put an invisible fence around any radiotagged objects inside the structure. The timestamp can also be a factor in enforcement of a geofence.

Radio messages received by smart devices are, according to the Bluetooth protocol, typically are measured for signal strength as an indication of radiotag proximity. The radio proximity measurement is typically a Received signal strength indication (RSSI) and is given a digital value by a Bluetooth transceiver. Logic circuitry in the Bluetooth core of the smart device can use the digital value of RSSI when decided which connection requests to accept, for example. And any alert can be made dependent on the RSSI value of the signal from a particular radiotag, for example.

Figure 23B:
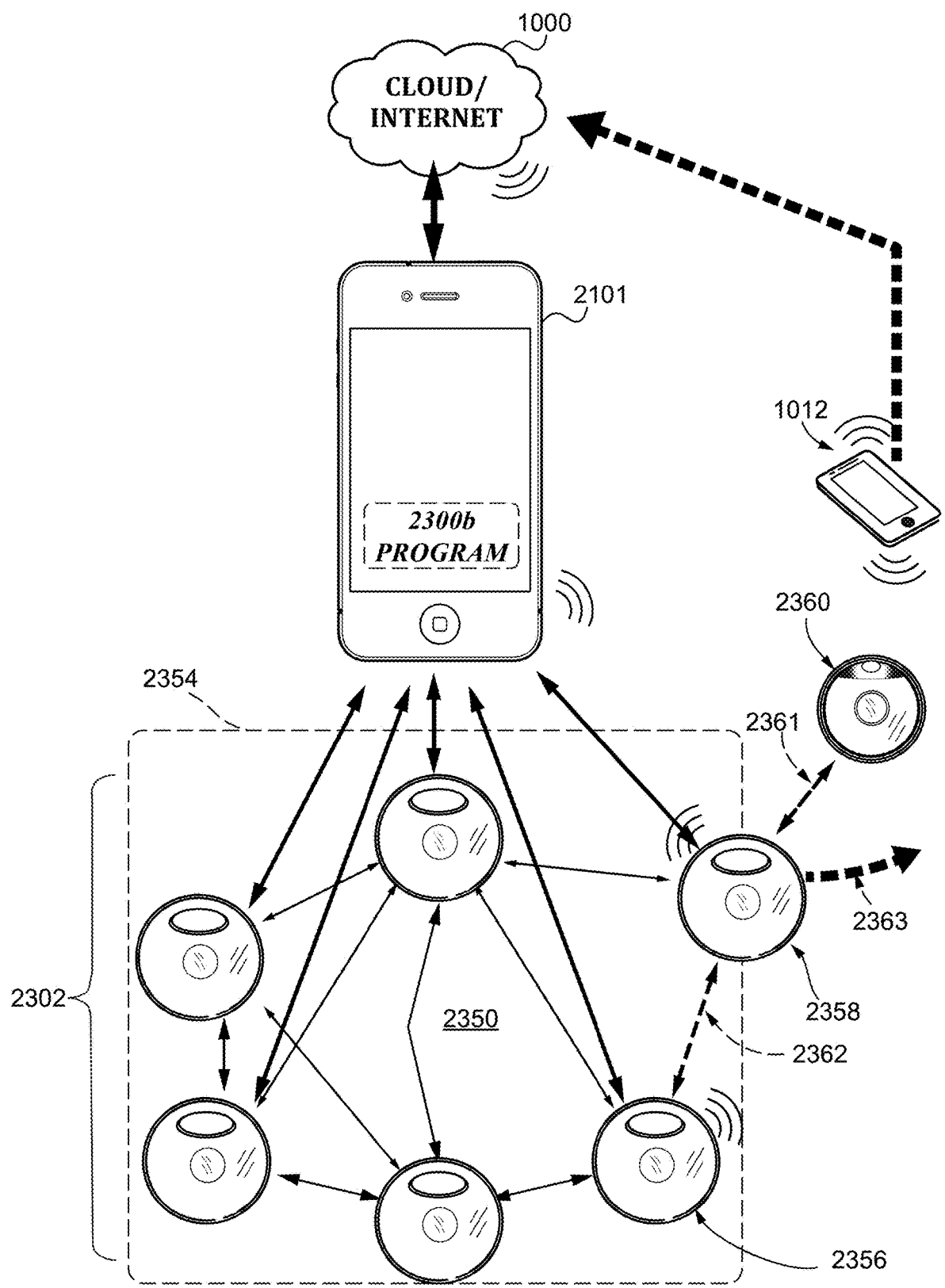
FIG. 23B is a view of radiotags of a mesh network in which individual radiotags report their radio traffic to the smart devices and community nodal devices of a smart network managed by a cloud host.

However, these radiotags 2302 have not been described as using the full capabilities of the Bluetooth radio protocol for active networking. As illustrated in FIG. 23B, a control program 2300b may be adapted so that all of the radiotags 2302 not only detect each other's radio signals (and also the radio signal of the owner/user's companion smart device 2301), but also create records of the radio traffic received. These radiotags have Bluetooth core transceiver that also includes flash memory or a cache that allows them to log a record of each Bluetooth transmission received. Generally the transmissions are connection requests and consist of a device identifier and a few frames formatted in the style associated with advertising beacon broadcasts typical of Bluetooth transmissions. Each record of a received radio contact can consist of the radio identifier (UUID or MAC address) of the transmitting Bluetooth device and also an RSSI value of the signal as received. The records can be logged in memory in each receiving radiotag and can be transmitted periodically or in real time as a digital upload to a network device such as a smartphone 2101. When received by the smartphone, the records can be appended with a timestamp and a geostamp. In this way, the radio traffic environment of a cluster of radiotags is continuously being reported by each of the radiotags of the cluster and can be logged at a network host 1000 to be mined for data. The AI needed to mine this data is already available on commercial network servers such as Amazon Web Services.

The flickering cluster of radiotags with shared radio signals is termed a "mesh network" 2350, and is also sometimes referred to as a "scatternet" or "piconet". Smart device 2101 can have an installed control program 2300b so that the data shared from the group of radiotags 2302 may be forwarded to a cloud host 1000. The mesh network 2350 formed by Bluetooth devices (including the smartphone, which contains a BTLE core and transceiver) is based on peer-to-peer architecture and is formed ad hoc by the radiotag devices.

In a first embodiment, the smart device logs timestamps and geostamps of all radio contacts with all of the radiotags. But in a next generation embodiment, the radiotags also log and report radio contacts with other radiotags to the smart device. Thus radio contact 2361 between device 2358 of a group 2354 and an outside BTLE radiotag 2360 will be reported to the smart device 2101 in a record that includes the identifiers of both devices and an RSSI value of the radio signal ping from radiotag 2360 as received by radiotag 2358. Similarly, each radio contact between radiotags 2358 and 2356 will be recorded as radio pings 2362 by both radiotags and record created showing the RSSI. A timestamp will be added, either at the level of the radiotag or at the level of the smart device. The smart device may also add a geostamp before forwarding all the data to the cloud host 1000.

To reduce and simplify the data, binning and redundancy thinning of the data can be implemented. Frequency of scanning and responding can also be limited according to power management requirements. Data over memory capacity can be avoided by periodic uploads to the system with a first in/first out primacy. Or data can be uploaded to the system only when there is a system need for designated processing tasks, such as during an owner/user-requested search for a misplaced radiotag or when an exception has been noted by the system.

Interestingly, the system can readily recruit outside Bluetooth radiotags 2360 to extend the search for a missing radiotag beyond the range of the Bluetooth radio of the owner/user's smart device or in environments where there is radio interference or dead spaces. This is made possible by enabling a limited reporting capacity of the radiotags of the mesh network 2350 to listen for other radiotags 2360 and to pass along their radio contacts to the host smart device 2301. This level of data logging in the individual radiotags does not require pairing and can be achieved within the Bluetooth low energy "listen" mode by adding a command to summarize a record of any radio contact received, including a UUID or MAC address, and a received radio signal strength indication and to send the record to the host device 2101. Some radiotags may have sufficient energy to also timestamp or even geostamp their radio contact reports, but in many instances the host smart device can do that so as to conserve the limited energy storage capacity of the radiotags.

Bluetooth is a true ad hoc network. The radio architecture is robust in achieving an unparalleled capacity to capture local Bluetooth radio chatter and to link to and exchange data with those devices regardless of identity. Within radio proximity, the physical range of devices from a receiver can be monitored by RSSI. Devices evolve their networks by giving priority to the strongest signals when making connections. Devices in radio proximity seek each other out and synchronize to form a flickering network without any external setup. Membership in a Bluetooth network is based on the rule that more proximate devices dynamically replace those with weaker signals.

However, dedicated pairing is also possible. Devices having established a master-slave relationship can be locked into that relationship by the BT master's access code. When paired, the slave becomes dependent on the clock and frequency hopping regime dictated by a particular master. Pairing mode is used so that the radiotags can be claimed by an owner and paired devices will preferentially look for each other's signals and will retain that link even in the presence of other radio traffic. Because most smart devices in the marketplace have Bluetooth chips, the smart device will to participate in a Bluetooth scatternet made up of multiple BT radiotags and can track the radio contacts it makes with other radiotags owned by a common user/owner.

The radiotags may continue to listen for relevant radio traffic even in STANDBY, and activate any needed functions when a BT signal is detected, even if the signal is not from a device that has paired with the radiotag. This promiscuous connectability enables a passerby who is carrying a Bluetooth device to sample the local Bluetooth scatternet environment around them, and to be sampled by others. A wealth of information is revealed in the Bluetooth transmissions.

Any smart device is able to timestamp and geostamp the radio contact information received from the any Bluetooth signal received from the flickering scatternet of radio contacts in the dynamic leading edge of radio proximity. That data can be transmitted to the cloud host 1000. The cloud host 1000 can parse the transmissions and search the UUIDs or MAC addresses in radio contact records for radio identifiers of known radiotags. But smart device 1012 (which is a community nodal device) can also receive the radio contact log information from radiotag 2360, and will upload that data to the cloud host. By searching that dataset, the cloud host will discover the radio contact 2361 with radiotag 2358, and if that device moves (2363) out of a geofenced area 2354, the system will be able to generate a notification and send the alert to the owner-user via smart device 2101. In this way the mesh network of BT radiotags become the extended eyes and ears of the owner-user and the system with cloud host becomes an able personal assistant in keeping track of assets and finding lost things or persons. Yes, persons can wear the BT radiotags so that they too can be tracked. And by fitting radiotags with sensors, a wealth of sensor data, not just of sensed radio traffic, but also temperature, humidity, noise and so forth, can also be collected and aggregated as part of a cloud-based intelligent decision process that is contextually adaptable.

Radiotag signals having owner identifiers recognized as corresponding to a user profile on file in a smart device are given preferential treatment and the smart device or cloud host can look up rules-based commands that are to be triggered by receipt of that radiotag identifier or receipt of some sensor data in the radio signal as described in other sections of this disclosure. Radiotag signals having a community identifier recognized by the smart device (even if the specific owner-user is not known) are forwarded to the cloud for further processing as described above.

The process of finding lost items can also be improved by accessing the scatternet radio topology data that includes UUID or MAC address and the timestamp and geostamp of BT contacts made by each radiotag, not merely the records of contact made by a BT-equipped smart device. Where a group of radiotags are being tracked as described in FIG. 23B, the BT signal logs of each radiotag will demonstrate one radiotag, for example 2358, of the group 2354 develops a pattern that includes a new radio contact 2361 that is not being reported by other members of the group. This is an early indicator of increasing radio distance that may be evident before radio contact is lost with increasing distance as indicated by bold arrow 2363. As the radiotag 2358 transitions out of the geofenced zone 2354 (which can be defined by radio proximity with a plurality of a familiar companion radiotags forming mesh network 2350) it may send a report that includes a radio contact not recognized as a familiar companion when it receives the beacon signal from radiotag 2360. That early warning of a wayward tag will be followed by loss of radio signal, and by reports from other radiotags 2360 via community nodal devices not associated with the owner-user, those reports showing the lost radiotag, a record of the time at which its signal was detected, and a geostamp of its approximate location. The cloud host or administrative server 1000 will recognize the identifier, look up the owner-user's profile, and based on a geofence or other data in the user profile, generate an alert or a command that is programmable by the owner or is dependent on permissions and preferences of a system administrator, for example.

In addition to the radiotags with capacity to sense and report radio traffic received from proximate BT devices, the system operator typically also supplies an app or other control program 2300*b* that includes instructions that when executed by a processor within a host smart device cause the host smart device to perform operations comprising: a) receiving, from a radiotag, a Bluetooth radio signal, the radio signal having information that includes a radiotag-owner identifier and a log of records of proximate radio-contacts received by the radiotag over a configurable time interval pre-present, each record in the log including a radiobeacon-owner identifier and a received signal strength indicator of each of the proximate radiocontacts received in the time interval pre-present; b) generating a radio message that includes the information, a geostamp location, and a timestamp, wherein the geostamp location records the location of the host smart device making the timestamp when the radio signal is received; c) sending the radio message to an administrative server enabled to: i) in response to the radiotag-owner identifier, associate the radio message with a user profile stored in an administrative database and access a computer-readable definition of a radiofence in the user profile, wherein the radiofence is defined by at least one of radiobeacon identifier defining an expected proximate radio contact; ii) in response to the radio fenced zone and the log of records of proximate radiocontacts, generate a command or notification based on a conditional rule or rules associated with the user profile and community policies and permissions; and, iii) send the command or notification to a smart device, a remote machine, or an actuation device. The control program will typically include capabilities for displaying a user interface for receiving the command or notification from the administrative server; b) displaying a user interface for programming a conditional rule or rules; or, c) displaying a user interface for defining a definition of a radiofence by at least one expected proximate radio contact. For example, in operation the user interface may be configured to display an exception alert if a radiotag log of radiocontacts uploaded to a host smart device is not inclusive of the set of all expected proximate radiocontacts as would ordinarily be contained in the log of records of proximate radiocontacts received by the radiotag over a configurable time interval pre-present. This is the case if one or more of the radiotags in a group or cluster of radiotags that defines a "radiofence" is not where it should be. The location of the radiofence can be conditional on time such that the exception alert is made based on the timestamp. Radiotags not at home after 9 PM will be subject to a search. The RSSI value is also useful information. The user interface can be configured to define a radiofence according to required radio proximity to a set of expected proximate radiocontacts based on a minimum RSSI of the radio contact signal. If the minimum is not met, an exception notification is generated. The radiofence can be configured according to a perimeter defined by radio contact with a mobile smart device, a hub or a radiobeacon. The perimeter can be a radius from a radiobeacon signal as defined by an RSSI or can be a zone that is bounded in location by a radio perimeter, where the perimeter is invisible but is sensed by signals from radiobeacons distributed along the perimeter. Each radiotag is within the perimeter if it is in radio proximity to a plurality of smart devices, hubs or radiobeacons. The perimeter can be a radiofence or a "radio proximity polygon" bounded by a plurality of smart devices, hubs or radiobeacons.

Other patterns emerge from analysis of radio contact log data uploaded from the radiotags. By recording this kind of information over several weeks, the system may be able to associate patterns of neighboring radio contacts that are indicative of certain locations, so the radio traffic data becomes indicative of where a particular radiotag is. In other words, the system can develop a certain level of machine intelligence in which it recognizes its radio surroundings, and knows where it is, based on recurrent patterns. This data becomes accessible to the cloud host because the radiotags are routinely uploading that data. A cloud host that receives a record of the radio log from a lost radiotag can guess where the radiotag is based on familiar signatures in the radio traffic. Because each radio contact is associated with an RSSI value that is an indication of radio proximity in units of distance, radio triangulation can become very accurate. In this way, the BT local radio proximity becomes a much more accurate way of pinpointing location than even commercial GPS systems can provide and can begin to rival Polte-based angle of arrival systems that use cellular signals and AGPS to report locations down to a few meters, even inside buildings, and because of the interference robustness of BT systems, even in very radio noisy environments.

The data may be coming not through the owner's smart device but through other community nodal devices or even from unrecognized BT radiotags. Thus the simple change in properties made by adding memory and logging capability to BT radiotags, so that they can sense radio traffic and upload records of their radio contacts, can have emergent system effects leading to new dimensions in radio finder and tracking device evolution. In most instances, executive functions in the system reside in the smart device and the cloud host, but may be supplemented by increased low energy processing functions in the radiotags. For example, a radiotag may have limited capacity for calling attention to itself, such as a light, a buzzer or a vibrator as needed to make a notification, sound a warning, or to assist in being found, and may do so when a smart button on a companion radiotag is pressed as suggested earlier.

Further examples are as follows:

EXAMPLE I

Figure 24A:
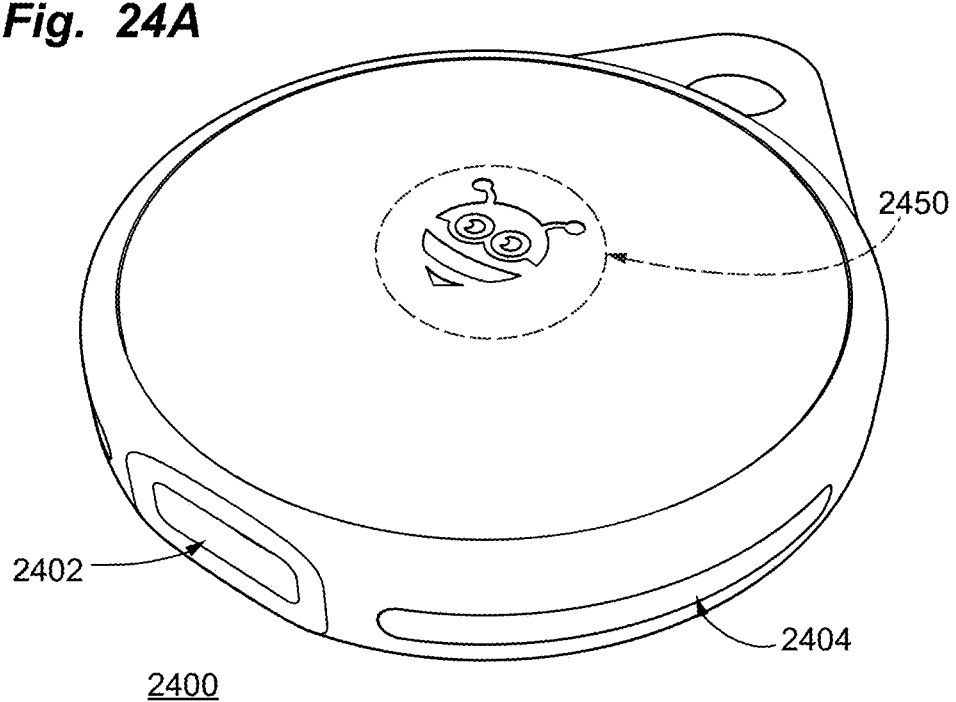
FIGS. 24A and 24B are perspective and plan views of a first embodiment of a Bluetooth radiotag. The radiotag body is of a disc shape.
Figure 24B:
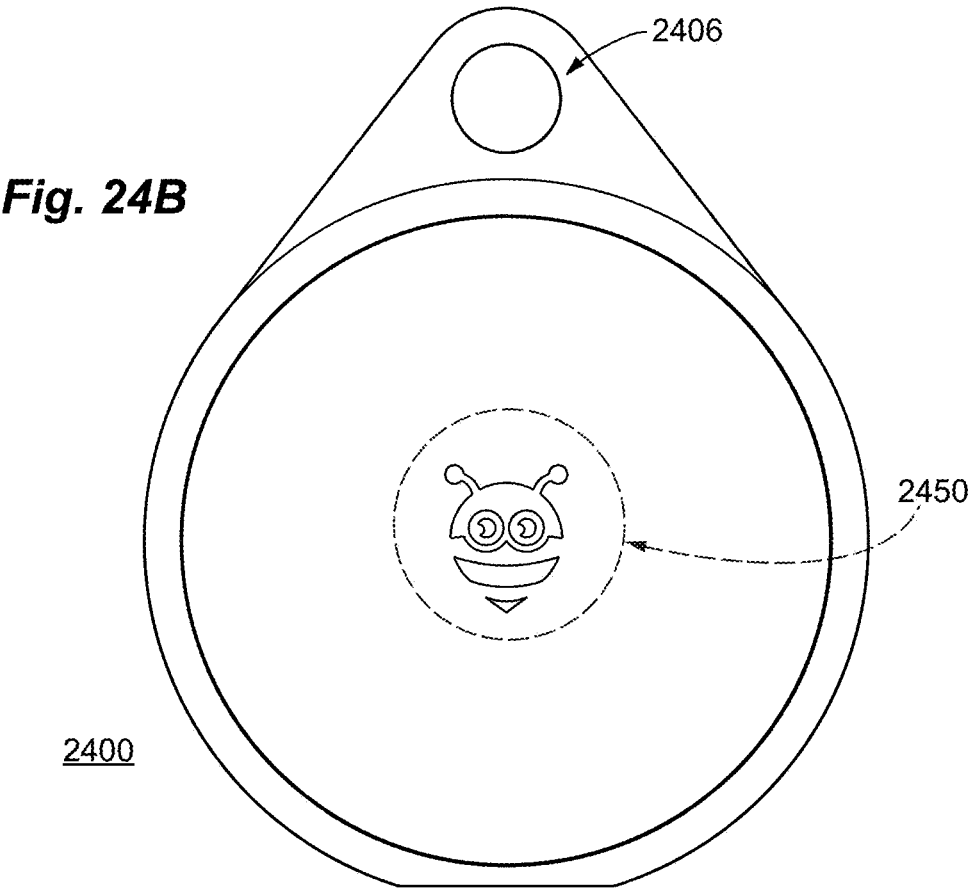

FIGS. 24A and 24B are perspective and plan views of a first embodiment of a Bluetooth radiotag. The radiotag body 2400 is of a disc shape and includes a USB charging port 2402 and a status light mounted edgewise on the body as an RGB LED 2404. Also shown is a mounting ring 2406 for receiving a keychain or other attachment. The device may include a center touch button 2450 for accessing multiple program functions. The touch switch can be mechanically actuated or can be a capacitive touch switch that responds to the electric field distortion of a finger.

EXAMPLE II

FIGS. 25A and 25B are perspective and profile views of a second embodiment of a Bluetooth radiotag. The radiotag body 2500 is of a card shape and has a thin body profile. The housing upper surface 2501 includes two exposed contacts or pins 2502 for charging an internal battery.

The cutaway view of FIG. 25C shows internal structures comprising a flexible circuit board 2503 with battery 2504. Charging contacts or pins 2502 (+ and −) are exposed through the outer skin 2501 on the leftmost upper edge of the card and include a magnetic fiducial 2506 for orienting a charger head on the contacts. A bar magnet may be mounted under the pins, for example.

An antenna 2508 is surface-mounted on the PCB 2503 and connects to a BTLE core chip 2510 that includes a modem and Bluetooth radio. An LED array 2512 is visible through the outer skin on the rightmost upper edge of the card and is illuminated by a user as part of a visual search for the device. Chip 2514 is a display driver and can strobe the LEDs. In some instances an array of colored RGB LEDs may be used to enhance visibility.

Also included is a speaker driver 2516 for driving piezo speaker 2518. The user may actuate the speaker to assist in locating a missing device. The device may include a sensor A/D converter 2517 for converting sensor output (sensors not shown) to digital data for radio transmission.

The charging connectors 2502 connect with a power management chip 2503 in one embodiment and provide power for recharging battery 2504. A single charge can provide a week or more of power to the BT radio 2510. A typical BT radio with modem is the Nordic nRF52832 Bluetooth low energy (SOC) system-on-chip with multi-threaded Arm® Cortex™-M4 (Nordic, Oslo SE) but the more advanced nRF52840 may also be selected, for example.

EXAMPLE III

Figure 26A:
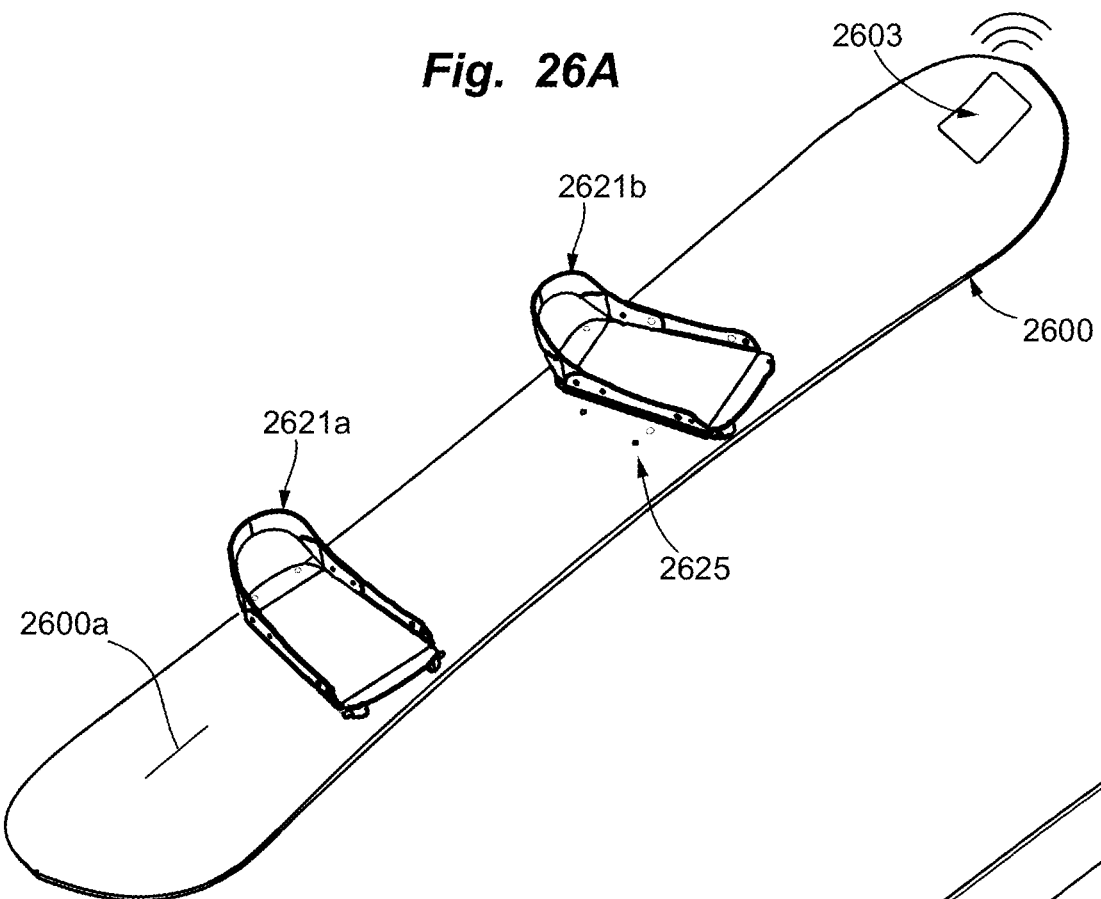
FIG. 26A illustrates a card-shaped radiotag affixed to a nose of a snowboard.

FIG. 26A illustrates a card-shaped flexible circuit board configured as a BTLE radiotag or "tracking device" 2603 affixed to a nose of a snowboard 2600. The circuit board 2603 is adapted to be sealedly mounted on the uppermost surface layer 2600a of the snowboard. Also shown are boot binding fittings 2621a,2621b and "T-nut" receptacles 2625.

The position of the BTLE radio card 2603 may be at the nose of the snowboard so as to optimize visibility of the LED array 2515. A speaker 2518 may be mounted in a sound box under the skin of the board. The radio unit antenna 2508 is exposed above any carbon fiber-reinforced layers of the snowboard so as to avoid radio signal attenuation.

Alternatively, the circuit board may be mounted at some other point along the length of the snowboard, such as between the boot bindings. In another embodiment, the radio and circuitry are built into a fitting that locks into one of the un-used T-nut receptacles 2625, such as with a key or a combination lock in the possession of the owner. If the device detects motion outside a mobile safe zone established by the owner's smartphone, a notification will be displayed. Other community smartphones that detect a radiobeacon signal from a lost or missing snowboard will be uplinked to a cloud administrative host and the host server will generate a notification to the owner showing the approximate location of the missing snowboard. An alarm in the form of a speaker may also be used so that the owner, when in proximity to the missing snowboard, can cause an audible signal to be sounded to facilitate locating the missing item. GPS and sensor elements may also be included. Sensor readings are transmitted by core radio and received and recorded by a control apparatus with permission to control the tracking device (such as smartphone 2102, FIG. 21C).

In one embodiment a tracking device 2603 is fixed to a snowboard 2600 and the snowboarder carries a control apparatus (2102, FIG. 21C) that continuously receives the motion data from tracking device 2603. So long as the tracking device 2603 is within range of at least one control apparatus, the GPS location of the apparatus and the motion of the tracking device can be viewed on line in real time or at a later time by other users.

In one embodiment, all travel of the snowboard, including vertical travel up ramps and acrobatic flips and turns of the snowboarder will be sensed by the 9-axis sensor and sent to a smartphone carried by the user. The smartphone can be set to record the information received from the tracking device 2603 or to continuously transmit the information to the cloud/internet 1000 as described in U.S. patent Ser. No. 10/424,189, titled "Tracking Device Program", which is co-owned at the time of this filing and is incorporated herein in full by reference for all purposes.

EXAMPLE IV

Figure 26B:
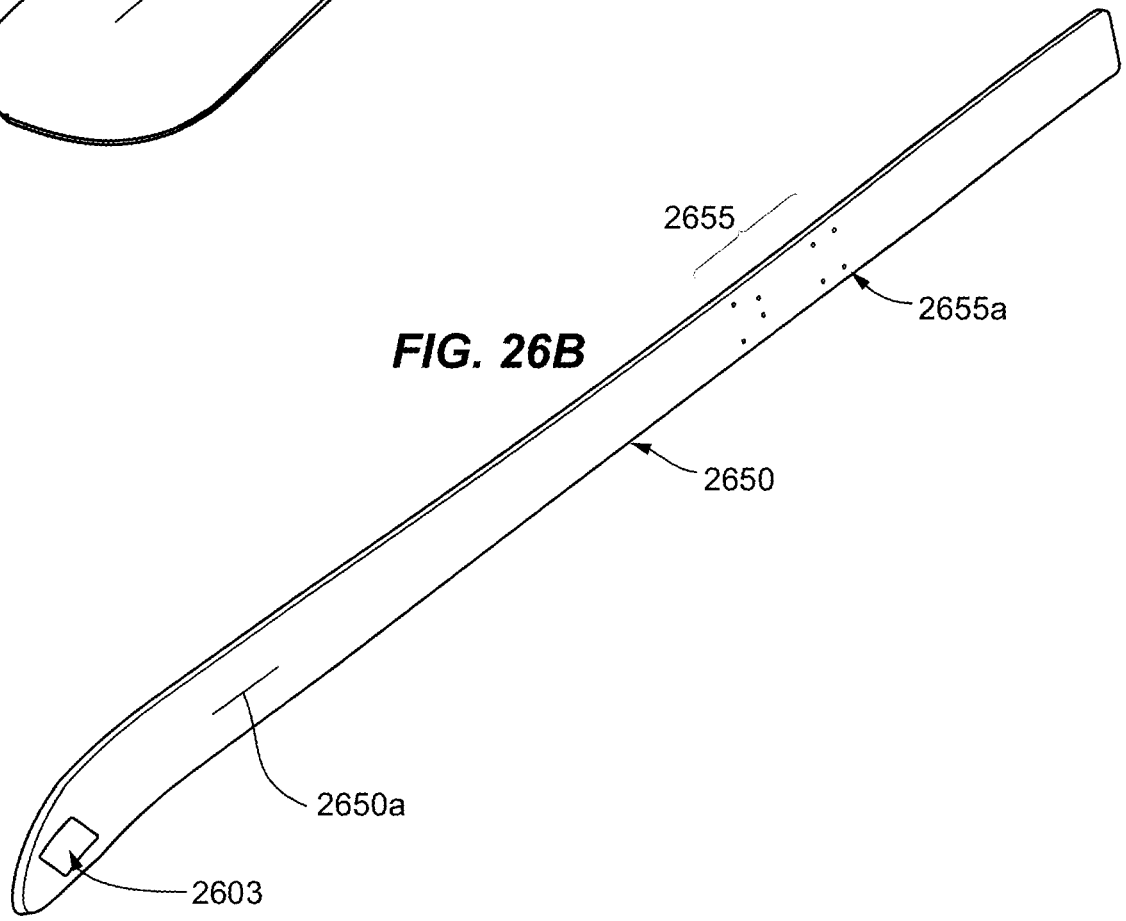
FIG. 26B illustrates a card-shaped radiotag affixed to the nose of a ski.

FIG. 26B illustrates a card-shaped radiotag 2603 affixed to the nose of a ski or skis 2650. The card or flexible circuit board 2603 is adapted to be sealedly mounted on the uppermost surface layer 2650a of the snowboard. Also shown are boot binding fitting receptacles 2655.

The position of the card or an analogous flexible circuit board may be at the nose of the ski as shown so as to optimize visibility of the LED array. A speaker may be mounted in a sound box under the skin of the ski. The radio unit antenna is exposed above any carbon fiber-reinforced layers of the ski so as to avoid radio signal attenuation.

Alternatively, the circuit board may be mounted at some other point along the length of the ski(s), such as between the boot binding fasteners 2655. In another embodiment, the radio and circuitry are built into a fitting that locks into one of the un-used fastener receptacles 2655a, such as with a key or a combination lock in the possession of the owner.

If the device detects motion outside a mobile safe zone established by the owner's smartphone, a notification will be displayed. Other community smartphones that detect a radiobeacon signal from a lost or missing ski(s) will be uplinked to a cloud administrative host and the host server will generate a notification to the owner showing the approximate location of the missing ski(s). An alarm in the form of a speaker may also be used so that the owner, when in proximity to the missing ski(s), can cause an audible signal to be sounded to facilitate locating the missing item.

Similar radiotag devices 2400,2500,2503,2603 may be used to tag boot bindings, ski poles, insoles of skiboots, and other winter sports items. The tagged items can be found even if buried in a layer of snow or stowed in the trunk of a vehicle.

EXAMPLE V

Figure 27A:
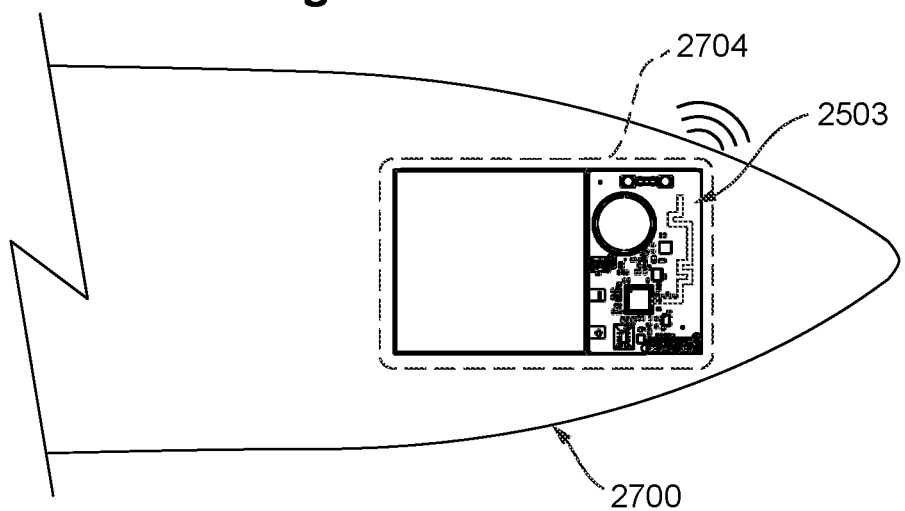
FIG. 27A illustrates an embedded flexible circuit board with finder device and battery.
Figure 27B:
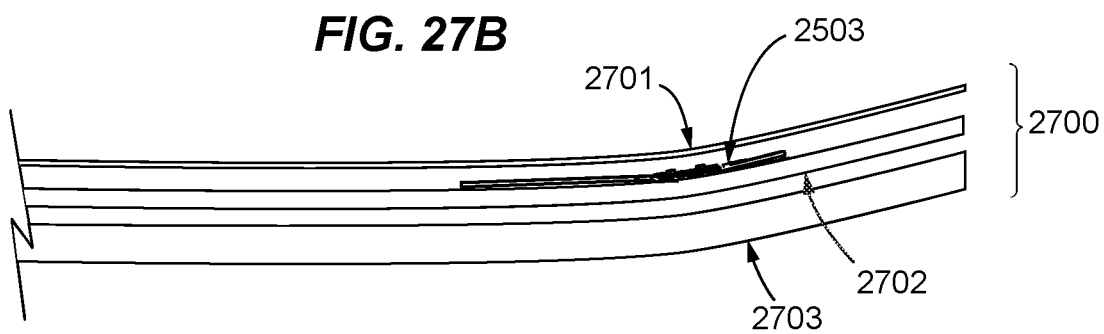
FIG. 27B shows the device of FIG. 27A in side view as embedded between laminated layers of a ski.

FIG. 27A illustrates an embedded device 2503 in the front end of a ski assembly 2700. The device comprises a flexible circuit board with battery. The device is protected by a patch 2704 that functions as an exterior coating. In FIG. 27B, the embedded device 2503 is covered by a surface layer 2701 of a laminated ski with three layers, 2701,2702, 2703, for example. Contact points extend through top layer 2701 to a charging circuit of the device. While not shown, an AC charger docks to the ski surface so that the charging contacts are engaged. Detents are provided so that the charger remains in place during the charging cycle. AC chargers such as are built into a docking station are known in the art and may supply direct current to battery contacts that extend through the top laminate 2701. Alternatively, alternating current is fed to a wireless inductive charger as illustrated schematically in FIG. 28.

By embedding the device under a laminate layer, it cannot readily be tampered with. A sound box may be provided to improve the acoustics of the speaker alarm, and also a transparent window so that the LED status lights are readily visible.

The flexible circuit board 2503 may also include a capacitive switch 2750 that functions as a button for accessing program functions. Placing a thumb or forefinger on the surface of the ski is sufficient to generate a switch ON or OFF signal to the processor. Multi-functional button functions have previously been described with reference to FIGS. 9A,10B (614*a*). In another embodiment, the button may trigger a POSITION FIX that can function to trigger a UNEXPECTED MOVEMENT alert or a GEOFENCE BREACHED alert. These are structured as conditional rules in which the user, having established a stationary position of the ski, can program a smartphone using local logic to generate an alert or an alarm if the ski moves (using accelerometer data as the data payload) or if the ski exits a user-defined area (using radio proximity as a geofence) for example. Pressing the button again silences the alert. These local alerts can be performed by a suitably programmed smartphone without direct intervention of the cloud host. The cloud host, however, can monitor the data via messages upswitched to the server, and can create a map of waypoints of the ski(s) are moved any significant distance using location fixes provided by community nodal devices.

EXAMPLE VI

Figure 28:
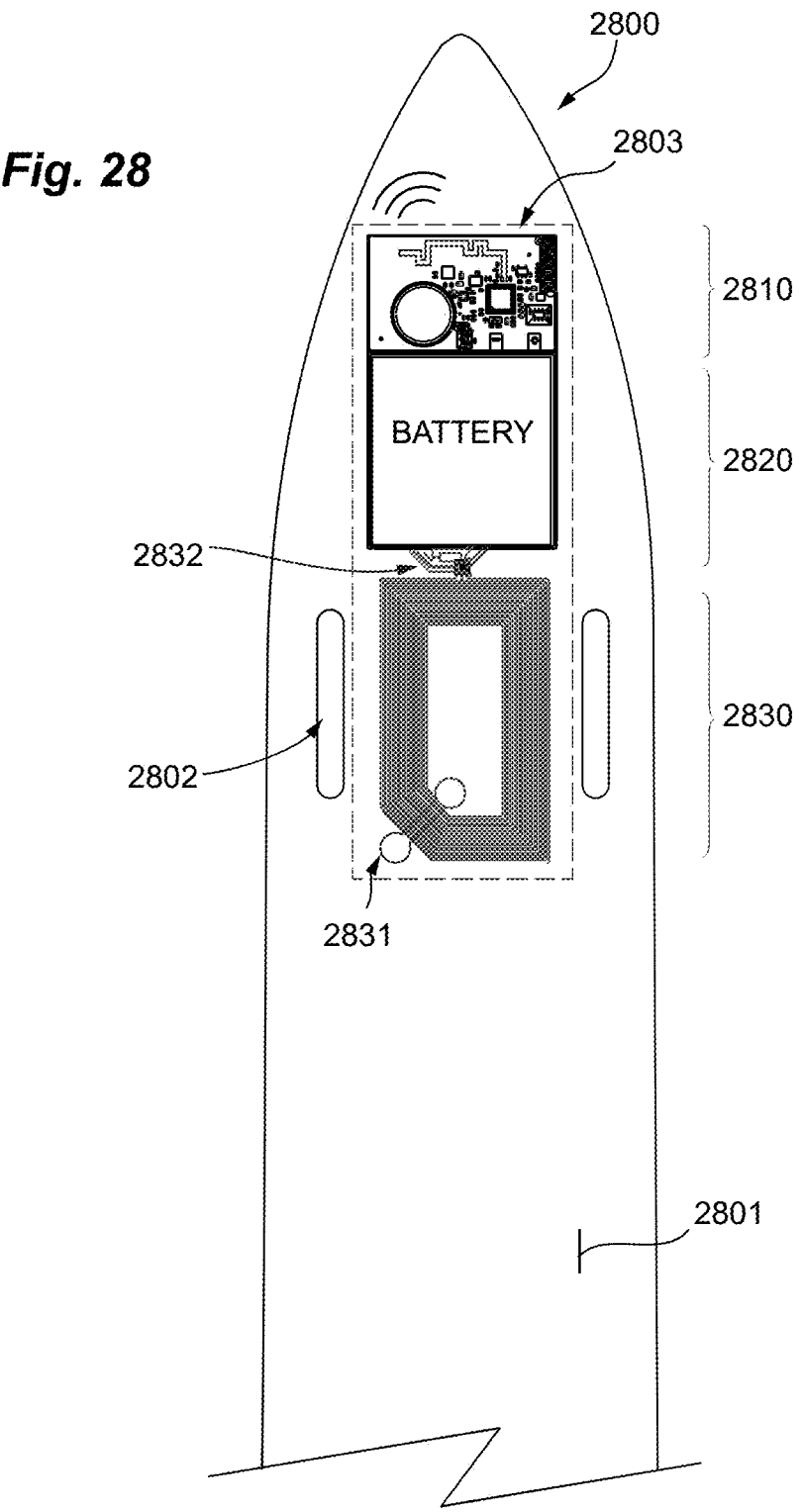
FIG. 28 is a plan view of a device with radio finder, battery and inductive coil for recharging the battery as mounted in the nose of a ski.

FIG. 28 is a schematic view of a ski assembly 2800 with tracking device 2803 and inductive charging feature. The device and inductive coil are mounted under a first layer 2801 of the upper face of the ski. A larger inductive coil permits greater charging capacity.

A docking station (not shown) interfaces with the induction coil 2830 and is secured in place in an optimal position by use of docking detents or fiducials 2802. Detents 2802 are provided so that the docking station is positioned relative to the coil with optimal coupling of the active and passive magnetic fields. A print-on bridge 2831 is part of the coil. The coil also includes a rectifier 2832 adapted for charging the battery 2820. The battery may be a print-on battery, or may be a LiPo flat battery with foil faces adapted as cathode and anode. The battery powers the radio device 2810, including any sensors and optional GPS accessories mounted on the flexible circuit board 2803.

An antenna for the radio may be included on the flexible circuit board 2803 or may be mounted under the ski exterior coat. Interestingly, while not shown, a pair of larger antennae can be mounted under the ski top surface to permit directional radio triangulation. Use of two antenna is supported by newer generations of some Bluetooth chips. The range of the antenna may be several hundred feet, and most smartphones include a built in receiver for detecting the radio transmissions from the tracking device 2803. However, the smartphone generally requires a piece of software in order to be able to process the signals and redirect them to a cloud host where resides much of the logic and database capacity for operating a global lost and found service.

EXAMPLE VII

Figure 29:
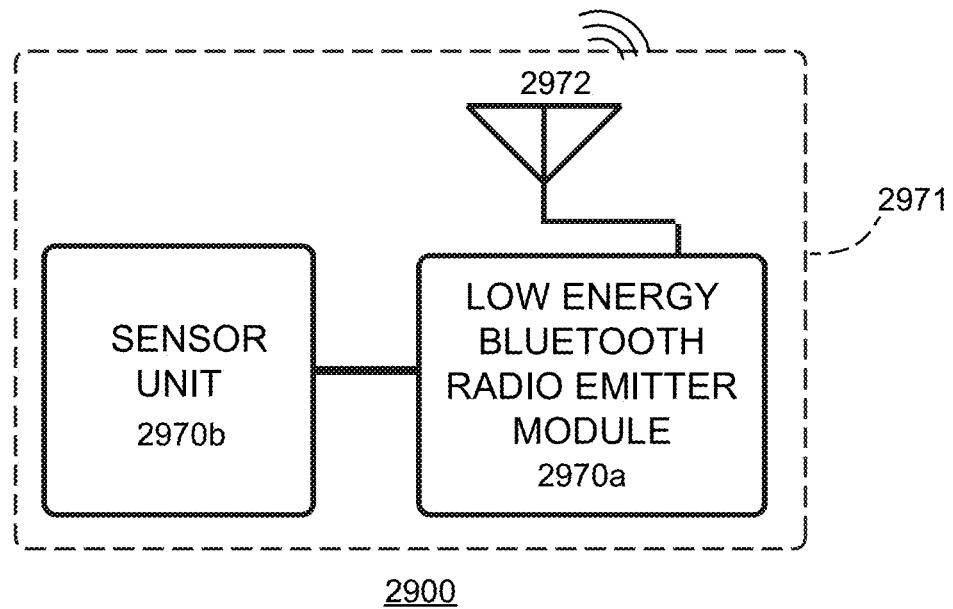
FIG. 29 is a schematic of a basic BTLE radiotag with sensor unit. The radio is a simple advertising beacon.

FIG. 29 is a block diagram of functional components of a "limited-computing-resource" radiobeacon 2970 (dashed box indicating housing 2971) capable of one-way radio communication with a community nodal device. Typical nodal devices, such as smartphones and hubs, are provided with a processor and an "application" for receiving the radiobeacon signal and for upswitching to a cloud host 1000, where the device is identified by its radio unit identifier and is associated with a user profile. User programmed commands may be generated by the cloud host in response to receipt of the signal.

In a preferred embodiment, radio emitter module 2970*a* of the radiobeacon loads sensor data from sensor unit 2970*b* into a radio signal transmitted on antenna 2972. The loading function may be performed by a software encoder programmed within the emitter module, which functions as a microcontroller or "BT modem" with on-board non-volatile and volatile memory (not shown). The message is configured to contain a radio unit identifier value (such as a UUID) and optionally a payload of digital sensor data such as motion, heading, acceleration, deceleration, and so forth. Optionally one or more of the sensor data values may be insertedly encoded in the standard frames of a bluetoothed low energy radio protocol by overloading a frame as is described with reference to FIG. 19. The encoder function may be integrated into the radio emitter module and is implemented using software or firmware or a combination of both. Radiobeacons may be battery powered or otherwise powered as known in the art.

By way of example, in the networks of the invention, a soft switch configured in a smartphone by a software application of the invention provides the needed machine configuration to upswitch radio signals from a bluetoothed low energy radioset to a broad area radioset such as a cellular or WiFi radioset. The software thus causes the smartphone to serve as a mobile access point for forward broadcasting of messages to the Internet at large, or via a VPN to a dedicated host server. The IP Address of the host server may be associated in the program with a community radio identifier included in the broadcast signal from device 2970. In special circumstances, radio signals may be "downswitched" from a broad area radioset to a bluetoothed low energy radioset equipped with a receiver, so as to execute a field update of firmware, for example.

At the cloud host 1000 (inter alia FIG. 21C), generally the radio unit identifier, sensor data, [along withy a timestamp and geostamp generated by the smartphone and attached to the message) is extracted from the message using software developed to administer user needs. Relational databases may also be used to store data and detect changes or trends in the data. Based on ownership privileges, rules-based instructions, and context, the cloud host server will transmit a signal to a remote machine or other actuation device or generate a notification or a record in a database as warranted.

The smartphone may also process the message to a limited extent or independently of the host server. For example, a simple display of RSSI may be handled locally. Depending on the contents of the radio signal, particularly with respect to any contextual data encoded in the signal or known to the system, the processor will issue an instruction. The device may also include a policy controller that controls foreground functions according to permissions set by the user.

The sensor unit or package 2970*b* may include one or more sensors. Sensor output to be encoded in a frame or frames for transmission may include data readings of an accelerometer, a gyroscope, and a magnetometer for each axis. A heading sensor output may also be encoded for transmission. The units are battery powered and consume mAh of power in daily operation.

EXAMPLE VIII

Figure 30:
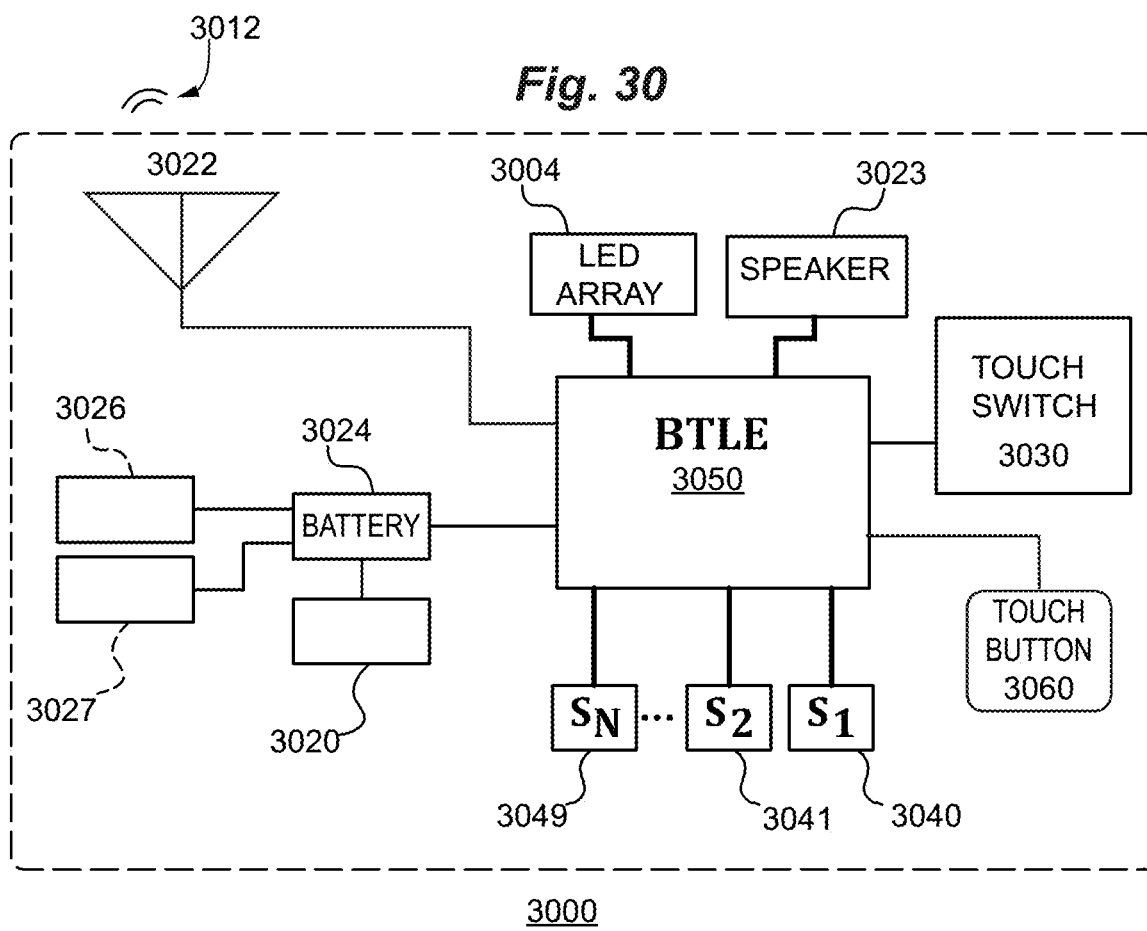
FIG. 30 is a multifunctional BTLE radiotag with LED array, speaker, command button, sensors and accessories.

FIG. 30 is a schematic view of a multifunctional BTLE radiotag 3000 with LED array, speaker, command button, sensors and accessories as would be affixed to a snowboard, ski, split board, boot bindings, ski poles, and so forth. In this example, transmitted BTLE signals received by smartphone are transmitted to a cloud host 1000, analyzed according to user-programmed rules and commands, and from there a command or notification is sent to a client device. The client device may be a user device for example, and may display a map of the radiotag current location relative to the owner's location.

Components identified in this simplified block view of radiotag device 3000 include a bluetoothed low energy (BTLE) core device 3050. The core device includes an antenna 3022 for sending low energy radio signals 3012. The core device generally includes an integrated microcontroller, read only memory (ROM), random access memory (RAM) sufficient to support rudimentary control, or may be provided with firmware sufficient for basic functions. For some applications, a flash memory driver may be incorporated. The memory card may be added through a slot in the outside walls or may be installed under the battery. The memory card may tabulate data collected by sensors mounted in the device for later retrieval and analysis.

The core device 3050 has a clock. The radiobeacon signal and any signal from a sensor may include the time any message or signal is sent. According to an application subroutine (such as a near field communications sensor unit), a smartphone may wake the device 3000, receive sensor output, and then set the device back to sleep such that its broadcast signal is only active when the two paired units are in close proximity. A second community smartphone may again later wake up the radiobeacon and receive a signal. The core device also tracks time and any alert may be linked on a calendar or clock to one or more chosen times or day, week, month or year.

The core device 3050 is assigned a unique identification code (UUID) and will generally broadcast at periodic intervals as programmed by the developer. Transmissions 3012 may be made using an antenna 3022 selected from ceramic antenna, loop antenna, fractal antenna, dipole antenna, patch antenna, microstrip antenna, diversity antenna, or other antenna known in the art.

The core device 3050 controls a speaker 3023 and an array 3004 of light emitting diodes formed as an array as a navigation and tracking aid (e.g., for showing radio proximity). The speaker 3023 and the LED array 3004 are also configured to communicate alarms such as a beep or flashing colored light directly to a user and to assist in tracking and locating lost items, among other functions.

The core device 3050 is connected to one or more sensors (3040,3041), or any number of sensors 3049 (SN). Exemplary sensors sense environmental and physical parameters experienced by the radiobeacon, including and not limited to temperature, light intensity, sound, motion, displacement, acceleration, heading, humidity, pressure, radiation, button-press event, compass direction, low battery level, or other stimulus, sensor data, or environmental parameters, without limitation thereto. Heading may also be reported by the sensor package. Acceleration and deceleration may be tied to performance of the snowboard or skis, and may also indicate immobility, such as in a snow avalanche recovery effort, for example. The information or "sensor data" output by the sensors assists the receiver (i.e., a host device such as a smartphone) to monitor and track the radiotag as it moves from one location to another. Alternatively, the radiotag may include a GPS-based location sensor.

As described in U.S. Pat. Nos. 9,892,626 and 9,392,404, the motion of the device as part of a snowboard or ski can be monitored continuously by a cloud host server 1000 as long as the receiver 3060 is close enough to be in wireless contact with the sensor package on board or alternatively with a radiobeacon in wireless contact with the radiotag. As an alternative, the information may be stored in a memory in the device and accessed later. This feature permits the snowboard rider to capture the technical performance of the snow equipment during use.

As described earlier for some other embodiments, a finder device embedded in a snowboard or boot binding pair, for example, can include a touch button 3060 such as is useful when "parking" the snow sports equipment with assurance that a notification will be issued if the equipment is unexpectedly moved. One press of the button establishes a mobile geofence and a "park" status that will cause an alert if the equipment accelerometer senses motion or if the equipment leaves a defined radius around the user. Users may operate the smart button on a radiotag to cause system-executable actions to occur. The button-press-switch-sensor output data generated by a button-press switch is received by a smart device and transmitted to the cloud host. The cloud host in turn associates the button-press with an executable action and transmits a command or notification in response. These and other features of the system are available to owner-users who have installed an application on their smart device and by doing so have made the smart device a community nodal device that listens for compatible radiotag signals and forwards information in the received signals to the administrative server regardless of who the owner of the radiotag is.

If a radio finder that has been "parked" is moved away from its parking spot, community smartphones that sense the radiobeacon signal from the errant device will provide location updates to the cloud host.

Some embodiments of the device of the invention are equipped with rechargeable batteries 3024 that may be recharged via an inductive charger 3026. Wireless chargers, also known as induction chargers, typically place one coil in a charging device or pad that is connected to an AC power source. Battery top off controls and discharge controls are known in the art and may be implemented where warranted. The induction charger may be a Qi charger or an NFC charger, for example. Magnetic detents or fiducials may be included so that the inductive charge is optimally positioned to be inductively linked to the corresponding internal coil of the device. These detents may be mounted under the outside surface of the sporting item and in one embodiment can be marked so that the user need only position a docking port with plug-in power supply onto the detents and the charging operation may be automatically completed.

Other embodiments of the invention may have wired rechargers. These are well-known devices and may be incorporated into radiotag devices of the invention by providing a suitable port or jack (not shown) to receive power from an external power supply. However, such external ports provide openings in the housing that are not desirable, and hence indirect charging means are preferred. A separate disposable battery 3020 may be included to supplement power or as the sole power supply.

Other embodiments may have solar power cells and chargers 3027, so that battery 3024 is rechargeable by exposure to light. Solar cells have a dual role by acting as light sensors. This allows flexibility in configuring notifications to the user by pairing sensor data and other contextual data to the presence or absence of light. The amount of current generated by the solar cells is indicative of the intensity of the light falling on the radiotag sensor.

While not shown, other embodiments of the radiotag have antennas and circuitry for harvesting RF power to recharge battery 3024. RF harvesters having a GMS antenna, one or more resident circuits, boosters, peak detectors, and an adder, are known in the art. The circuit contains passive components and is designed to have tuned circuits at known frequencies of cell phone towers (960 MHz) and bluetoothed devices (2.4 GHz). The boosters are Villard voltage multipliers. Reported test results show the RF harvester located within five hundred meters of a cell tower was capable of generating 0.16 microWatt and successfully operated a calculator and a light emitting diode. Related advances include Dickson cascade diode capacitor circuits, charge pumps, Karthaus-Fischer cascade voltage doublers and rectennas known in the art.

A companion device, belonging either to the owner or a community member, may be a smartphone or pad for displaying a map as shown. The map may be an interactive map and may include a voice overlay or data overlay. Maps may include aggregate data, such as traffic, radio traffic, tremors, fog, crowding, or special offers, sites of interest, meeting places, and so forth.

EXAMPLE IX

In a first example, a radiobeacon is positioned inside a passenger vehicle while the vehicle's owner runs a few errands. A sensor unit delivers data to a processor in the radiobeacon. If the internal temperature in the vehicle rises about a comfort level of perhaps 28° C., the radiobeacon will task itself to encode the most current temperature reading into bits 22-23 of a 26-bit data value. This will be broadcast following a distinctive radiobeacon message preamble. Any competent nodal device (having the needed software) that is owned by any anonymous community user in proximity to the radiobeacon (or one owned by the radiobeacon owner) will detect the message transmission. An application installed on the device will wake up when it recognizes the characteristic signal qualities and will upswitchedly transmit an amplified data packet to an internetwork compatible radioset and radio protocol and transmit that temperature data along with any unique identifiers to a cloud host that performs data validation and accesses instructions as to how to respond, what notification to push to the beacon owner's smartphone or other nodal device, and any other actions appropriate to the context. For instance, if the temperature rises to 35° C., the cloud host may be configured to make a notification to an emergency response number by telephone, using an electronic format or a voice synthesizer. The host will ask the emergency responder to press "one" on a keypad to acknowledge that first responders have been mobilized, and will then again notify the owner of the radiobeacon, this time that an emergency response is on the way. The redundancy provided by crowd-sharing a switching capability to send the radiobeacon output to a cloud host server ensures that a stepwise and effective response is achieved, even if the owner of the vehicle is unable to receive a notification (perhaps because the distance exceeds the 150 feet or so that the radiobeacon can transmit, or the owner's smartphone is shielded by structures that block the signal). In this way the owner of the radiobeacon is shown to be acting responsibly and can withstand scrutiny if a child or a pet is left in a locked vehicle without an adult in attendance for a short period of time. Nodal devices lacking the application typically will discard the data packet. But community users having the application will share a limited set of background resources with the owner of the radiobeacon, ensuring the safety of children and pets. Thus a limited sharing of resources achieves a greater benefit, and the system reciprocates by providing the same service if the role of owner and passerby is reversed. Anonymous users may be incentivized as needed to download the application from a distribution server associated with the cloud host, thereby becoming a community member.

EXAMPLE X

In another example, by dynamically sharing resources provided by anonymous users as described in Example IX above, an owner of a vehicle having a radiobeacon can receive a notification from a cloud host when the signal from the radiobeacon is lost due to excess distance or shielding that obstructs the signal. By configuring a radiobeacon with an accelerometer package, the radiobeacon can be triggered to encode and broadcast a signal if the vehicle is shaken such as by a car door opening or a broken window. Again sensor data is encoded and attached to the radiobeacon ping so that a message is transmitted that can be received by the owner's device or by an anonymous user's device. Under one circumstance, an owner's nodal device will intercept the broadcast signal and, using foreground resources in the nodal device under control of an application designed to receive and assess the data packet, push a notification onto the owner's nodal device, perhaps also disabling the vehicle's ignition system. Simultaneously, in background, any community members in radio proximity will receive the same broadcast signal and upswitch the signal to a cloud host. The cloud host will resolve the owner's address and according to notification policies, send a notification to the owner. First responders may also be called to the location, according to context. This redundancy ensures that the owner will be notified even if outside the radio transmission range of the beacon. The kindness of strangers in sharing resources becomes a valuable tool for avoiding injury or loss and is reciprocated between all community members. Surprisingly, passersby may not even know they have assisted.

EXAMPLE XI

Using essentially the system as described in two preceding examples, an owner mounts a radiobeacon on his front porch, above the door jamb. The radiobeacon is provided with a sensor package that includes a photocell, an accelerometer module with temperature sensor, an infrared motion detector, and a microphone with signal pattern analysis capability. Sensor data is routinely buffered in the radiobeacon and periodically encoded in a message that is preceded by a radiobeacon-specific preamble when transmitted. Transmission is made using a low-energy radioset. When at his residence, any message will be received by the owner on a smartphone or other device and notification will be made according to rules established during setup of an application designed to recognize the message and decode the sensor data, adding context as needed. Notifications will be made using foreground resources, waking up the device and the owner as needed. Under other circumstances, when the owner is not home, transmissions will be received at random by any proximate user carrying a compatible device and will be switched over to an internetwork-enabled radioset for transmission to a cloud host. Thus if the sound of a gunshot is recognized by the sensor package, the radiobeacon will be triggered to encode a data packet and will transmit a message using shared resources provided by any ad hoc anonymous users (perhaps the neighbors' smart device) to the cloud host, where the data will be analyzed and actions taken. A notification may be made to police responders, but also may be made to all anonymous users in the area (such as the neighbor), thus propagating the value of the information to multiple users, not merely the owner of the radiobeacon. So where neighborhood watch groups have been formed and members of the organization have installed the application and registered with the cloud host, a stronger level of cohesive local response is achieved in concert with the response by police, resulting in a higher level of public safety and an increased number of witnesses.

EXAMPLE XII

Radiobeacons in a typical distributed deployment with anonymous owners will likely not have overlapping radio contact. While installation in a single retail location is achievable, larger urban tracts generally cannot be united into a low energy radio network because of gaps in radio coverage. Thus a nodal device sharing a local radio signal area is needed to switch bluetoothed signals onto a broad area network. In some instances, an owner's nodal device may perform this function; in other instances, promiscuous, dynamic radio contact is made with the smart devices of anonymous users, literally passersby, providing an opportunity, when used with a compatible dual network device, to switch messages to the broad area network without cost to the anonymous user. However, this flickering network has an important advantage, a significant number of the radiobeacons are stationary, and this subset is known and is part of a stationary ad hoc network, for example all the radiobeacons in all the department stores, plus any radiobeacons placed by private or governmental users. In some cases, thousands of these low energy radiobeacons are powered up and affixed in defined locations. Thus inertial activity detected by an accelerometer sensor package in a radiobeacon indicates a relative movement, and when multiple radiobeacons report a synchronous movement of about the same magnitude over a local area, there is a high likelihood that an earthquake is occurring. Cellphones have been tested to detect earthquakes, but not successfully. The GPS system of a cellphone is sensitive enough to report a major ground shift, but cellphones are subjected to continuous jostling in normal use, so the motion signal is not readily pulled out of background motion and signal noise. Now, surprisingly, a radiobeacon matrix covering an urban area will report a clean signal of a coordinated earth motion. By capturing this data on an ad hoc switching network of nodal devices and aggregating it at a cloud server, the spread of a seismic event can be detected with such rapidity that persons outside the epicenter can be warned of an approaching seismic wave. The cloud host will analyze sensor data in real time and may be programmed to send out an alert estimating the size of the earthquake and an estimate of the areas in which it will be felt or cause damage, and then send a report to all users in those areas, as well as contacting authorities. Thus while a cellphone network fitted with accelerometers may be limited to detecting very strong events, Magnitude 7 or higher, when queries, a radiobeacon network and a population of nodal devices can spontaneously function as an earthquake sensor for Magnitude 4 earthquakes or lower, and can detect the initial P wave of an earthquake so as to maximize the response time in getting out a notification to all users in the area ahead of the seismic wave. Radiobeacons can also monitor radio traffic and can detect urban congestion, any kind of disturbance, and so forth, and because the soft switch operates in background, the data can be transmitted as a "micro-message" to the internetwork without interference by cellphones, which typically become overloaded during emergencies.

EXAMPLE XIV

In yet another instance, the radiobeacon may be attached to something of value, such as a laptop computer. Then if the owner of the laptop or cellphone reports the item lost to the cloud server, the cloud host server will tag any report of a radio contact with the radiotag by any anonymous user anywhere. This occurs without a query from the cloud server and in background on a limited resource network, without direct participation of any users. Reports of radio contacts are sent as messages to the cloud host server using a soft switch of the invention. This example recognizes that radio contacts are routinely recognized by nodal devices, and turns this to advantage by switching over any message attached to a radio contact having a characteristic beacon signal to an internetwork compatible radioset for transmission to a dedicated cloud host an administrative database for tracking. The radio contact data that is transmitted to the cloud host will typically include a timestamp. In some instances, background resources of devices owned by anonymous users may also be able to provide a geostamp, or the devices may have a history of recently being in proximity to a radiobeacon having a fixed location. And by collating this information, the cloud host is able to provide a trail of radio contacts to the owner, thereby assisting the owner in localizing the current location of the lost item and recovering it. In this way spontaneous, anonymous and unsolicited sharing of resources provides a benefit with minimal cost to any user. In some instances location data is encoded by bit-overloading within the data structure of an ordinary beacon transmission.

EXAMPLE XV

The disclosures of the invention enable a wide range of applications, many of which have not yet been conceived. However, the inventors are in possession of a system enabling a range of applications representative of future uses, the system having general applicability based on sharing of background resources for compact background messaging in a bottom-up architecture, where the cloud host does not generally query available resources but instead receives a promiscuous and spontaneous stream of flickering micro-messages that can be assembled into coherent contextual data on which decisions can be made, either as selected by particular owners for example of a particular radiobeacon originating a message, or at the system level, for example based on aggregated data collected from multiple community resources. Here are samples of other applications:
    one-click ordering a pizza using a radiobeacon in which
        a button press is encoded in a message that is transmitted through a nodal device to a cloud host server;
    one-click engagement of cruise control on a computer-enabled vehicle while in gear;

one-click engagement of steering on an automatically steered vehicle while taking a telephone call;

multi-click engagement of a "Nest" or "HomeKit" that controls home thermostat, smoke alarms, carbon monoxide alarms, earthquake alarms, and other domestic functions such as a garage door, security camera, or locks;

automatic (no click) functions such as auto-locking of hard drives when an earthquake P-wave is detected approaching a compatible user device;

automatic (no click) functions such as notification of first responders when a sound of a gunshot is detected, a smoke alarm goes off, a door lock is forced without a key; or motion is detected in an expectedly vacant house or office;

automatic (no click) alerts when a prolonged QT heart rhythm is detected;

one-click uploading of a document from a remote computer to a "Google Drive" account;

multi-click semi-automated formatting and sending of a message to an email or SMS account of a recipient, either through an Android function of a smart phone or indirectly when executed in IOS on an iPhone (Android 4.0 and higher or iOS 7.0 and higher);

one-click categorization of emails into junk, spam, archive, or priority accounts;

one-click access to a local map using smart device resources;

one-click silencing of a ring function on a smart phone, with multi-click instruction for a making pre-programmed response by a virtual answering machine or taking a message;

one-click activation or inactivation of voice command mode in any compatible application; and/or, multi-click selection and play from a playlist on any compatible music device.

All these applications have the advantage of shortcutting many API's and interfaces that the user must otherwise individually engage to get to the desired functionality. Reducing the "system behavior" to a single click, a no-click, or a multi-click switch status enables the system to detect the switch status and immediately implement a pre-programmed response. For repetitive and emergency system behaviors, there is a corresponding reduction in labor and an increase in system responsiveness in both speed of response and accuracy. The precise nature of the response is dependent on sensor content of the message, which may be as simple as a HIGH or LOW position of a button, or may be a more complex function that integrates context, such as time of day, day of week, weather conditions, pulse rate, or vehicle performance indicia input from an ODB sensor panel, traffic hazard sensing and route plan input from a route mapping service, and various combinations of sensor inputs and big data. In addition, the system operator can update and add new functions on the host cloud server so that system upgrades are implemented by redirecting the messages from a community device to the cloud host server and back, using control loop architecture having a signal transmission and command response, eliminating or complementing the need for periodic new releases of software to the member devices.

EXAMPLE XVI

In a next example, a beacon is mounted on a backdoor and includes a motion sensor module operatively linked to a BTLE radio emission module. The radio emission module is programmable and includes instructions for encoding sensor output of the motion detector into the frames of a Bluetooth signal to a hub, which in turn relays the sensor data to a browser-accessible website that includes the capacity to generate notifications to a registered user. A push notification is made to a smartphone for which the necessary permissions have been granted. The owner of the smartphone is alerted to a possible intruder by the alert, and enters an instruction to activate cameras in the house so as to surveil the premises. If an intruder is seen, the user calls police dispatch, takes video and photographs of the intruder, and returns home to meet the police.

The flexibility of the communications protocol is apparent in that a sensor having smoke detection capability may function to generate a notification in an essentially identical way in the event of a fire at the neighbor's house. Microphones detecting sirens likewise may be interpreted to actuate a notification.

EXAMPLE XVII

In another example, a cat receives a collar with a built-in beacon. The collar includes a noise detector. When the cat makes repeated cries, the sensor integrates the signal over one minute and determines that a notification should be triggered. The owner of the cat receives an alert showing the approximate location of the cat and the level of the disturbance. The owner returns home as regularly scheduled to feed the cat.

EXAMPLE XVIII

A radiobeacon of the invention is attached to a keychain. The beacon is provided with an exterior button on the housing and internal integrated circuits for detecting and digitizing motion associated acceleration and compass direction data. The beacon also includes a speaker or buzzer and an LED for making a visual display. A program or "application" is supplied that is installable and operable on a variety of smart devices. The application is installed on the "companion" smart device of the owner of the keychain. Generally, the owner carries the keychain and the smart device throughout the workday so that the two radio sets accompany each other. If the owner leaves the keychain in one location as he goes to another, at the point of separation that the radiobeacon signal is out of range and can no longer be detected by the smart device, a LEFT BEHIND alert will be actuated and the smart device goes into "finder mode". The smart device may vibrate or emit an audible tone so as to alert the owner that the keychain has been left behind. The smart device will be woken up if necessary and will display a message explaining the alert on the screen. The owner can then retrace his steps to recover the misplaced keychain. When the radio signal is detected on the smart device, another alert can be pushed onto the screen indicating that the beacon is in radio proximity. After the keychain is found, the owner can press a button on the smart device or on the beacon to terminate the alert. Terminating the alert is conditional on the beacon being in radio proximity and may be adjusted so that only a very strong radio signal (indicating contact) will be sufficient to terminate the alert. Radio signal strength is measured by the smart device and can be scored for intensity as the owner gets closer or farther: a variation of the "hot/cold" strategy of hide and seek in which moving away from the beacon is associated with a weaker signal whereas moving toward the beacon results in a stronger signal and hence a display that indicates the missing item is further ahead and closer.

The application when installed on and executed by a computing circuit of a multi-featured smart device, may be configured to operate in a sleep mode on a smart device and to wake up the smart device if a digital radio signal is received. The system may operate to wake up a smart device. The application may be commanded by the administrative server, or by another user, push a notification onto a graphical user interface of one or a plurality of community nodal devices when an instruction is received from the administrative server and when all is in compliance with rules and permissions established by a user in a user profile.

EXAMPLE XIX

Referring to the apparatus of Example XVIII, the beacon is modified to include a transceiver. The application is modified to permit the owner of the beacon to call up a screen on a smart device and to press a key so as to activate an audio and visual display on the beacon. If the keychain is misplaced, the owner has only to press the key to activate the beacon display and quickly locate the beacon with its attached keychain.

EXAMPLE XX

Referring to the apparatus of Example XVIII, the beacon is configured to detect and digitize accelerometry data and compass heading. This data is overloaded into a standard length beacon radio message and broadcast to the companion smart device at a standardized amplitude. For example, compass direction can be encoded in a 3-bit signal, X/Y acceleration in a sliding scale of zero to fast (with a filter for eliminating artifact and short jolts and bumps) can be encoded in another 3-bit signal. Both signals are stuffed by bitwise substitution into the major or minor frame of a standard beacon radio message and broadcast to the owner's smart device. In general, motion sensors may include gyroscopic sensors, accelerometers, compass heading sensors that are capable of sensing relative motion and also sensors such as GPS that function to sense location and hence can detect change in location as an approximation. While in radio proximity, the smart device decodes the motion data payload from the radiobeacon message and compares it with complementary motion and direction data from the smart device internal hardware. If the two data sets are copacetic, the application logs the current position and periodically rechecks; however, if there is an exception in which the data suggests that the smart device and the beacon are not moving in unison, then the application begins by displaying the last known position recorded in the log, including any relative heading and direction data, and alerts the owner. If the owner reviews the data and is concerned, in addition to the local resources of finder mode, the application can solicit cloud resources to help locate the radiobeacon and its attached keychain. Cloud resources can be used to query other recent radio contacts between the radiobeacon (as detected by its UUID) and other smart devices. By aggregating this data, a map can be displayed with an overlay of the radio contacts so as to locate the device if it is stationary and track the device if it is moving. The owner may then return to the site where the device was last detected or can attempt to intercept the moving device. A common example is a case in which the owner unknowingly drops the keychain. The smart device quickly detects the discrepancy between a keychain that is stationary and a smart device that is moving and alerts the owner. The alert is refined using contextual information. If the owner is at home and the keychain is put down, the alert will not be actuated if the smart device is moved, for example.

The circumstances may be that the smart device is moving and the keychain is stationary, but the roles may also be reversed. By providing a transceiver in the radiobeacon, the buzzer in the beacon can be actuated when the smart device detects a discrepancy and broadcasts an instruction that actuates the beacon to make an audio, vibratory or visual display as an alert to catch the user's attention. Thus the system can be configured so that not only does an alarm sound when radio contact is broken, but also either or both the smart device and the radiobeacon can go into alarm depending on contextual data communicated in the form of an overloaded radiobeacon message that is processed by the smart device. Thus a user who has misplaced a cellphone may receive an alert on a radiobeacon when the user goes out of radio range, and then as the user retraces his steps, he can press a button on the radiobeacon to activate an audio, vibratory or visual display feature that will assist in locating the cellphone.

Alerts that have been enabled by this technology include use of combinations of sensors, such as a motion sensor and a radio signal strength sensor. In a preferred instance, the smart device is provided with a radio signal strength sensor and with a motion sensor such as an accelerometer and compass, and the digital instruction set is executed to identify a radio signal identifier of a radiobeacon in radio proximity thereto, to associate the radio signal identifier with a subscription; to operate the radio signal strength sensor of the smart device, and to make a notification or an alert on a user interface of a smart device (and/or the radiobeacon) according to a combination of sensor data from the sensor data payload and from the radio signal strength sensor of the smart device. For example:

(a) if the radio signal strength falls below a threshold level, such as when the distance between the two radio signals is increasing, then make an OUT OF RANGE alert;

(b) if a most recent sensor data payload is indicative that the radiotag is not moving and a motion sensor or radio signal strength output from the smart device is indicative of an increase in distance between the smart device and a last recorded position of the radiobeacon, (i.e., the radiobeacon and the asset to which it is attached is left behind) then make a LEFT BEHIND alert; and, (c) if a most recent sensor data payload is indicative of a motion of a radiotag in a first direction and a motion or compass sensor in the smart device is indicative of a motion in a second direction not copacetic to the first direction, then to make a LOST or ERROR alert.

If a signal that has been lost reappears, then a FOUND alert will be sent to the owner's smart device.

Similarly, the application can be configured to trigger an alarm state so as to aid in finding the smart device in one case or the radiotagged article, for example as described in EXAMPLE IX. In addition, the radiobeacon may have a transceiver and can be instructed by the smart device to go into an alarm state with visual, audio, or vibratory display when the sensor data is not consistent. The instruction set in the smart device is configured to cause the radiobeacon to go into an alarm state according to a combination of sensor data from the sensor data payload and from the radio signal strength sensor or motion sensor of the smart device. For example:

(a) If a sensor payload from a radiobeacon broadcast is indicative of motion and a motion sensor in the smart device is indicative of no motion, then the system will make a LOST alert on the radiobeacon and the smart device; or, (b) If a sensor payload from a radiobeacon broadcast is indicative of a motion in a first direction and a motion sensor in the smart device is indicative of a motion in a second direction not copacetic to the first direction, the device and the radiobeacon are inferred to be moving in different directions, so then make an LOST alert on the radiobeacon and the smart device. Normally, the two devices should be moving in unison if they are in the user's pocket, or on the seat of a vehicle, or together in a backpack, and only if they are separated and going separate ways would the motion signal discrepancy arise. The application will infer that there is a problem and issue an error alert to capture the user's attention. The alert could for example be issued by a voice notification to a bluetoothed earpiece or displayed on a screen, or could be a buzzer or a vibration.

EXAMPLE XXI

The invention includes an application or instruction set that may be packaged so that when copied to, installed and executed on a smart device, the smart device can function using a cloud host or server to achieve greater levels of sophistication and convenience. The cloud host is generally an administrative server that can keep detailed profiles on users, track movements of beacons over extended periods of time, learn the habits of a user, and even aggregate data from a community of users or from population data bases that is relevant to the contextual response needed when a sensor payload is received. Thus a motion sensor in a beacon can output a few bits and broadcast them to compatible smart devices, but a plurality of beacons can detect an earthquake and the smart devices of the whole community will receive an alert and relevant information about the relative strength, epicenter and duration of the earthquake.

In this instance, the computing machine may be housed in the cloud host or administrative server, and includes non-transient memory with program instructions, such that when executed by a computing circuit of the server, the program instructions of the server are configured to cause the server to take delivery of a radio message forwarded from a smart device, to associate the radiotag identifier with a user profile in an administrative database, then in response to the radio message and any contents so as to cause the generation and broadcast of a notification or a command to a designated smart device or devices according to a programmable rule or rules and permissions associated with a user profile or according to administrative policies and permissions.

The application, when installed and operated in a compatible multi-featured smart device having a processor and supporting logic circuitry enabled to execute the digital instruction set, is readily configured to:

a) direct a smart device to listen for a radiobeacon broadcast from a compatible radiobeacon or radiobeacons, each radiobeacon having a characteristic digital radio signal identifier and concatenated digital frame that defines a message as a bitstring of defined length, and to receive the message, b) associate one or more radio signal identifiers in a memory with a subscription accessible by a smart device on receipt thereof, wherein messages so associated contain contextually variable sensor data;

c) wake up a smart device any time a beacon message is received that is associated with a subscription and to extract any sensor data in the beacon message, thereby defining a sensor data input; and, d) in response to the sensor data input, and after analysis by the cloud server, trigger a processor to execute a preprogrammed selection of a feature of a local or a remote smart device according to an appropriate "big picture" of the context.

The instruction sets at both levels, in the server and in the smart device, are preprogrammed to select a feature for activation or a condition of a feature (in the manner of a subroutine or an option among options) according to the extracted digital values in the radiobeacon broadcast and sensor payload.

Advantageously, a distribution server can be configured to replicate a digital instruction set in a second compatible smart device by a transmittal of the digital instruction set to a memory of the second smart device, thus promoting adoption of the system by forming a pool with a larger number of users/subscribers. The master copy of the application containing a digital instruction set, is generally made available on a distribution server, and copies may be downloaded to smart devices by users who become subscribers to the cloud services offered by the administrator of the system.

Subscription services may be billed in this way over a larger client population so as to reduce the per person costs of operating the services and increase the value of the return information by providing more reliable aggregate data from the many data sources. For example, if a purse is lost and the purse contains a radiotag, the radiotag signal can be tracked by the owner's smart device, but even after the purse is out of radio proximity to the owner's device, other community users carrying compatible smart devices with the application installed will detect the purse by its radiotag and will report the location, allowing the cloud server to construct a virtual map showing the location of the purse and its direction of travel; thus aiding in recovery of the purse.

In other examples, the application can assist the users by providing a range of programmable digital instructions to be executed on receipt of a designated sensor payload. For example, the application, when copied to, installed in and executed by a computing circuit of a multi-featured smart device, causes the smart device to:

a) listen for a radiotag emission of a radio signal having a sensor data payload that defines a critical sensor data input as defined by an owner's rules and permissions; and, b) in response to the critical sensor data input, then trigger the execution of a predetermined feature of the smart device. Generally, the owner of the device preprograms the desired outcome and critical threshold or event.

Optionally, the smart device may also add a timestamp, a geostamp, and an IP address of the administrative server to any radio signal received by the smart device and forward the radio message with radio signal identifier and sensor data payload to the cloud host.

Then, using the application to operate the smart device cooperatively with the cloud host, the system can assist the users by providing an ever broader range of programmable digital instructions to be executed on receipt of notification or command from the administrative server. By uploading data to the cloud, the system can function to:

(i) remotely make a notification or a display on a user interface of the smart device, (ii) remotely wake up a program or a hardware component of the smart device;

(iii) store a sensor data input or a series of sensor data inputs decoded from a series of radio broadcasts from a radiobeacon;
(iv) map a sensor data input or a series of sensor data inputs on a virtual map and display the virtual map on the smart device;
(v) remotely activate or deactivate a permission on the smart device;
(vi) remotely take an action on the smart device;
(vii) cause a remote device to take an action;
(viii) remotely set an alert; or,
(ix) a combination thereof.

One skilled in the art will recognize that a user may cause other features or functions to be activated by providing suitable programming and by selecting a sensor datum that triggers the desired response.

The server ("cloud host, 1000") is configured to execute program instructions according to a rules-based decision tree, permissions, and data from one or more databases, wherein the instruction is based at least in part on the sensor output and the digital radio signal identifier value, wherein the identifier value defines a radiobeacon that is a member of a set of radiobeacons that define a community of users, typically as a subscription service.

Not all users may share the same kind of smart devices. The digital instruction set of the application may be installed on any smart device selected from:
  i) an iOS device;
  ii) an android device;
  iii) a wireless receiver;
  iv) a smart receiver device; or,
  v) an Eddystone device.

Where frames are used in formatting radio messages, the frame or frames of the radiobeacon message are compatible with a standard protocol for radiobeacon messaging, wherein the standard protocol is selected from:
  i) a bluetoothed low energy interface standard;
  ii) an iBeacon communication standard;
  iii) a beacon frame format of the 802.11WiFi Interface standard;
  iv) a little endian or a big endian standard;
  v) an Eddystone communication standard; or,
  vi) a beacon communications protocol that is not violated by the overload of data.

Thus as shown in these examples, the systems, devices and methods of the invention, including instruction sets encoded on digital media and in memory devices and executable by compatible processors with supporting circuitry, are manifested in a large variety of combinations as defined in the claims in this application, including those claims in any parent application(s) and any daughter application(s), without prejudice or limitation.

EXAMPLE XXII

An administrative server is installed and operated on a cloud host, the server having an Internet portal and an IP Address. In response to a query, the server or a proxy will install an Application in a memory device of a mobile device, the memory generally being a "non-transitory computer-readable medium" in the mobile device. Once installed, the Application functions as part of an executable stack to control and operate one or more features of mobile device in concert with an operating system. When the instructions are executed, the Application is configured to communicate with the administrative server and to send radio messages from radiobeacons to the server, and to receive instructions or updates in response to a unique radio signal identifier that identifies the radiobeacon and the radiobeacon's owner and to a sensor payload embedded in the message. The server is able to provide a variety of services to radiobeacon owners and to guests who have permission from the radiobeacon owner.

The server will operate and control one or more features of the mobile device in accord with pre-programmed instructions entered into a user profile by the owner. In this way, the owner can monitor the location of an asset that is physically coupled to the radiobeacon, can find the asset when it is misplaced, and can use the asset to find the mobile device when the mobile device is misplaced. The server can also take action and supply information accessible on the internet that relates to the content of the sensor payload. For example, consider a wallet in an owner's pocket. The wallet contains a radiobeacon in a credit card-sized body. In response to a sharp jolt experienced by an accelerometer in the radiobeacon the owner's mobile device will convey the accelerometric sensor data to the administrative server. Depending on circumstances, the server may notify police of a car accident, as when an airbag is activated and the accelerometric signal is a characteristic deceleration and reversal in velocity relative to the direction of travel of the vehicle. And in other circumstances, the owner can report loss of the wallet to the server, and the server will then survey other radiobeacons that may have detected the unique radio signal identifier associated with the wallet. The contacts will be aggregated according to their time stamps and any geostamps in the messages received by the server (as forwarded to the server from other owner's smart devices), and will display a map tracking the wallet and a notification of its present location.

EXAMPLE XXIII

In another instance, the invention includes a non-transitory computer-readable medium holding program instructions that define an application with digital instruction set, such that when copied to and installed and executed by a computing circuit of a multi-featured smart device, is configured to cause the smart device to be able to perform radiotag-associated operations of a private smart device for a private user and radiotag-associated operations of a community nodal device for a community of users, the operations comprising: a) in accordance with the program instructions, receiving on a smart device a low energy radiobeacon signal from an identifiable radiotag and routing the signal to foreground services of the smart device for private access; and, b) in accordance with the program instructions, receiving on a community nodal device a low energy radiobeacon signal from an unrecognized radiotag and, using background services of the community nodal device, upswitchingly forwarding a message containing the contents of the radiobeacon signal to an administrative server without enabling access to the message by foreground services of the community nodal device. The application may be configured to operate in association with an administrative server so as to enable a subscription finder service for a community of users. The application works cooperatively with the administrative server so as to enable the server to receive a plurality of qualified messages broadcast from one or more community nodal devices, to aggregate one or more message contents from a plurality of messages, including any sensor data payloads, associated with a radiotag or radiotags, to find or track the location of a radiotag; and, in association with the application, to display a location of the radiotag or path taken by the radiotag on a map displayable on a smart device or a community nodal device. Upon receipt of data from a smart device running the application, the administrative server is configured to make a rules-based analysis of a qualified message, including contents thereof; and, to transmit a notification or a command over a broad area network to a private smart device, to at least one community nodal device, to a remote device, to an effector machine, to a hub device, or to a plurality of devices and machines, in accordance with a programmable rule or rules set up in a user profile or according to community policies and permissions. An effector machine may be a camera, a smart device, a cell phone, a garage door, a streetlamp, a motorized window, a volume control, a lock, a stove, a vehicle, or a panic alarm; and a physical machine act results. The application or the administrative server may be preprogrammed to select and actuate an executable feature on a multi-featured smart device according to an extracted digital value of the contents of sensor data input associated with the radio signal identifier. The radio signal identifier defines an owner or a community of users associated with a radiotag or a set of radiotags and the system is configured to trigger an executable feature on a smart device or on a remote device according to preprogrammed rules and permissions associated with the user profile of an owner, of a community of users, or according to rules and permissions established by an administrator of the system.

The executable feature is selectable from, without limitation thereto:
(i) make a notification or a display on a user interface of a smart device,
(ii) wake up a program or a hardware component of a smart device;
(iii) add a timestamp to any sensor data input or radio signal identifier received by a smart device;
(iv) add a geostamp to any sensor data input or radio signal identifier received by a smart device;
(v) store a sensor data input or a series of sensor data inputs decoded from a series of radio messages from a radiotag;
(vi) map a sensor data input or a series of sensor data inputs on a virtual map and display a virtual map on a smart device display;
(vii) forward a sensor data payload to a server or a cloud host;
(viii) activate or deactivate a permission on a smart device;
(ix) take an action on a smart device;
(x) cause a remote device to take an action;
(xi) set an alert; or,
(xii) a combination of the above.

EXAMPLE XXIV

The inventive concepts also encompass methods. In one instance, the invention is realized by a method for controlling operation of a smart device having a transceiver for receiving transmissions from a radiotag, the transmissions including a radio signal identifier and at least one of sensor output or outputs. Generally the radiotag is provided with processor-controlled circuitry, a bluetoothed radio transmitter, a sensor or sensors, and processor-executable instructions for transmitting sensor data. The smart device is provided with an application defining nodal device functions described above and operates with a compatible cloud host and distributed computing machine. The method is defined by a) receiving, by the smart device, a selection of one or more functions of the smart device for remote control; b) monitoring, by the smart device, the transmission of an output or outputs by sensors in the radiotag, in which the outputs are indicative of a condition of the radiotag at time T1; c) determining by the smart device, whether a first preset condition is met based on the sensor data payload from the radiotag; d) monitoring by the smart device, sensor data indicative of a second condition at time T2, and determining when the second condition is met; and, e) then associating, by the instruction set of the smart device, the first and second conditions to trigger the at least one alert when a change in the sensor data between T1 and T2 meets a predetermined criterion. For example, the sensor data may include motion data such as a change in position, and indicia of motion such as a change in radio signal strength or radio proximity over a time interval from T1 to T2. A signal from a radiotag that goes from weak to a lost signal will trigger an OUT OF RANGE alert. Or if the radiotag was stationary according to accelerometer data in its last transmission and the smart device is moving, a LEFT BEHIND alert. More generally, if the moving status (as determined by RSSI and accelerometry) changes such that RSSI is not constant and the smart device or the radiotag is in motion, the triggering an alert. The nature of the alert will correspond to an extracted digital value of the contents of sensor data input. Executable features may also be accomplished, such as those listed in the Example XVI.

EXAMPLE XXIII

In another instance, the invention includes a non-transitory computer-readable medium holding program instructions that define an application with digital instruction set. The application is designed for joining a radiotag or radiotags, a smart device or smart devices, and an administrative server into a network that provides notifications, alerts and command services to a user or a community of users. The application includes an instruction set, wherein the instruction set, when copied to, installed in and executed by a computing circuit of a multi-featured smart device, is configured to enable the smart device to:
i) send and receive radio messages to and from an IP address of an administrative server across a broad area network;
ii) receive a low energy digital radiobeacon signal from a radiotag in radio proximity to the smart device, to recognize a radiotag identifier therein, wherein the radiotag identifier in the signal is identifiably associated with an owner's smart device, then in response to receipt of the identifiable signal, dedicate foreground services of the smart device to generate a notification, alert or a command according to owner policies and permissions; and,
iii) receive a low energy radiobeacon signal from a radiotag in proximity thereto, the signal having an unrecognized radiotag identifier therein; then using background services of the smart device, upswitchingly forward a radio message addressed and formatted to contain the radiobeacon signal with unrecognized radiotag identifier and contents thereof, the addressed and formatted radio message defining a qualified radio message, to an administrative server at the IP address without enabling foreground services of the smart device to access the qualified radio message or the contents of the message.

The application performs operations that define a shared nodal device, wherein the shared nodal device is distinguished by a soft switch, such that the soft switch is a transient machine configured to upswitchingly forward a qualified radio message through hardware in background services to a broad area radioset such that the message is not stored in and is not retrievable on a user interface or foreground services of the shared nodal device hosting the application.

The application includes an interface configured to interface with a networked subscription service operated by the administrative server and a graphical user interface enabled to receive entries of owner-programmed rules and permissions into a user profile in a local memory on the smart device or into a memory on the administrative server; and, wherein the entries comprise an owner's rules and permissions that enable execution of one or another feature of the smart device when triggered by a radio signal from a radiotag in radio proximity thereto or by a radio signal from the administrative server. The administrative server is provided with a database for storing user profiles, contact logs and portals to Internet data services.

In operation, the application, when copied to, installed in and executed by a computing circuit of a multi-featured smart device, is configured to add an IP address to a radiotag signal when composing a qualified radio message. The application may be configured to add a time stamp and a geostamp or a proximity indicum to a radiotag signal when composing a qualified radio message.

The application is configured to compose a radio message having a radio signal identifier, a sensor data payload (including sensor data from the radiotag and any relevant sensor data from the smart device), a time stamp, a geostamp, a context, or a combination thereof. The sensor data payload may include location data, direction data, velocity data, acceleration data, temperature data, or a radio signal strength of a radiotag or a smart device, the data having each a timestamp and a geostamp. Other sensor data in the payload may be selected from photocell output, radiation sensor, motion sensor, velocity sensor, accelerometer, jolt sensor, gyroscopic sensor, gesture sensor, gravitational sensor, magnetic field sensor, compass direction, local time sensor, switch open/switch closed sensor, button sensor, vibration sensor, audio pattern detection sensor, vehicle performance sensor, biological agent sensor, biochemical agent sensor, chemical agent sensor, temperature sensor, pressure sensor, humidity sensor, windspeed sensor, location sensor, broad area positioning satellite sensor, proximity sensor, traffic sensor, noise level, relative radio signal strength sensor, or radio traffic sensor. In use, the application causes the smart device to: a) listen for a radiotag emission of a radio signal having a sensor data payload that meets a critical sensor data value as defined by the owner's rules and permissions; and, b) in response to the critical sensor data input, then trigger the execution of a predetermined feature of the smart device.

When installed in and executed by a plurality of multi-featured smart devices in networked communication with an administrative server, may be further characterized in that the administrative server is provided with a computing circuit with at least one processor, supporting logic circuitry, and memory with program instructions, such that the program instructions when executed by the computing circuit of the server, cause the server to:
  a) take delivery of a forwarded qualified radio message;
  b) associate a radiotag identifier in a qualified radio message with a user profile in the administrative database; and,
  c) then in response to the qualified radio message and any contents thereof, to cause the generation and broadcast of a notification or a command to one or more designated smart devices according to a programmable rule or rules and permissions in a user profile or according to policies and permissions administered for a community of users.

The server may aggregate a plurality of sensor data payloads received from the plurality of smart devices based on location or time; and cause the generation and broadcast of a notification or a command to one or more designated smart devices according to an analysis of the aggregated data.

The application is configured to receive from the administrative server a map or plot that compiles any aggregate sensor data by location or time and make a display thereof.

The display may be a trend line, a location, an extrapolated course, or a path marked by a track of locations at which the radio signal of a radiotag was detected by one or more smart devices executing the application. For example, the application is configured to display on an owner's smart device a graphical track of the location of a radiotag signal associated with a lost or missing article, a child, a pet or a friend as illustrated in FIG. 11.

EXAMPLE XXIV

As another exemplary realization of the invention, we claim a non-transitory application resident in a computer memory of a smart device, the application having a digital instruction set that when copied to, installed and executed by a computing circuit of a multi-featured smart device, causes operations to be performed that interconnect a low energy radiotag or radiotags with an administrative server, generally a cloud host, via a broad area radio network, and provide notifications, alerts and command services to a user or a community of users, which comprises:
  an application including an instruction set, wherein the instruction set, when copied to, installed in and executed by a computing circuit of a multi-featured smart device, is configured to enable the smart device to:
    i) receive a low energy digital radiobeacon signal from a radiotag in radio proximity to the smart device; recognize a radiotag identifier therein, wherein IF the radiotag identifier in the signal is identifiably associated with an owner's smart device; THEN in response to receipt of the identifiable signal, dedicate foreground services of the smart device so as to generate a notification, alert or a command according to owner policies and permissions; and,
    ii) receive a low energy radiobeacon signal from a radiotag in radio proximity thereto, and IF the radiotag identifier in the signal is not associated with the receiving device (but contains the community identifier); THEN using background services of the smart device, add an IP address so as to format the unrecognized signal and contents thereof as a "qualified radio message", and upswitchingly forward the qualified radio message to a community administrative server at the community designated IP address on a broad area radio network without enabling foreground services of the smart device to access the qualified radio message or the contents thereof.

Further, the application, when copied to, installed and executed on a smart device, performs operations that define a "nodal device", wherein the nodal device is distinguished by a soft switch, whereby the device is configured to upswitchingly forward a qualified radio message through hardware in background services and a broad area radioset such that the radio message and any contents are not stored in and is not retrievable on a user interface or foreground services of the shared nodal device hosting the application.

EXAMPLE XXV

Software is provided that when installed converts a smart device into a community nodal device (such as a smartphone) capable of managing radio contacts with groups of Bluetooth radiotags and tracking devices and uploading the data to an administrative server or cloud host. The cloud host is designed with computing hardware, databases, and logic for conducting a method of enforcing a geofence for a community system of smart devices and radiotags. The method is generally a subscription service, and comprises, a) by an administrative server, receiving a radio message from a smart device, the message including a radio contact record of a transmission received from a radiotag, the record including a radiotag-owner identifier, a timestamp and geostamp indicating when and where the transmission was received; b) by the administrative server, associating the radiotag-owner identifier with a user profile in an administrative database, accessing a geofence definition in the user profile;

c) in response to the geostamp, determining whether the radiotag is inside an area defined by the geofence definition; and, d) if not, then generating a command or notification based on executable rules associated with the user profile and community policies and permissions and sending that command or notification to a designated smart device, a remote machine, or an actuation device. The system may be designed so that the owner-user of the radiotag may create one or many executable rules, or the administrator of the administrative server may create or modify the rules so as to be consistent with permissions and preferences of the system and its users. Each rule may be conditional on the location or the time of the transmission. The administrative server may track waypoints defined by the location received in a transmission for each radiotag over time, and may send to a smart device a displayable plot that shows a track of the locations at which the radiotag signal was detected over time, as is useful in tracking and locating a lost or missing article, a child, a pet, or a friend carrying or tagged with a radiotag.

The records in the transmissions may also upload sensor data payloads from the radiotag. And conditional rules may be written that are executed by the system, by a smart device, or by a remote actuator in response to sensor data payload. The kinds of sensor data payloads include motion sensor data, received signal strength indication (RSSI) of the received transmission from the radiotag, button-press data, temperature sensor data, humidity data, heading, and so forth, any one of which can trigger a system executable associated with a conditional rule. In response to a request, the system can aggregate sensor data associated with a plurality of geostamps, and in response to a request, generate a displayable plot showing the aggregated sensor data as a function of time or location. Users may operate the smart button on a radiotag to cause system-executable actions to occur. The button-press-switch-sensor output data generated by a button-press switch is received by a smart device and transmitted to the cloud host. The cloud host in turn associates the button-press with an executable action and transmits a command or notification in response. And the system, by the administrative server, can monitor a group of radiotags, and generate a notification or a command if any of the group of radiotags leaves a geofenced area, moves away from other radiotags of the group, or becomes stationary when other radiotags of the group are moving. These and other features of the system are available to owner-users who have installed an application on their smart device and by doing so have made the smart device a community nodal device that listens for compatible radiotag signals and forwards information in the received signals to the administrative server regardless of who the owner of the radiotag is.

INCORPORATION BY REFERENCE

All of the U.S. Patents, U.S. Patent application publications, U.S. Patent applications, foreign patents, foreign patent applications and non-patent publications referred to in this specification and related filings are incorporated herein by reference in their entirety for all purposes.

SCOPE OF THE CLAIMS

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

In general, in the following claims, the terms used in the written description should not be construed to limit the claims to specific embodiments described herein for illustration, but should be construed to include all possible embodiments, both specific and generic, along with the full scope of equivalents to which such claims are entitled. Accordingly, the claims are not limited in haec verba by the disclosure.

The invention claimed is:

1. A system operable to offer lost-and-found services to a community of users having skis, which comprises:
(a) a radiobeacon component operable to transmit a bluetoothed radio signal, the radiobeacon comprising a flexible circuit board with logic and radio circuits embedded in or associated with a ski or snowboard, the ski or snowboard having a first owner;
(b) a community nodal device component in radio proximity to the ski, the community nodal device component operable to receive the bluetoothed radio signal, to parse a bitstring or bitstrings of the bluetoothed radio signal so as to decode a community identifier and a radio unit identifier, the community nodal device having a community owner who is a member of a community of users, wherein the community nodal device is operable to generate an Internet Protocol packet formatted message with a cloud host Internet Protocol address, a timestamp and geostamp, and a bitstring or bitstrings derived from the bluetoothed radio signal input, and further wherein the community nodal device is operable to upswitch the message to a wide area network;

(c) a cloud host server component networkedly addressable on the wide area network by the host Internet Protocol address, the cloud host server component operable to receive the upswitched radio message, the cloud host server component including a database of records, the records comprising a user profile of the owner accessible by the radio unit identifier parseable from the bitstring or bitstrings from the bluetoothed radio signal input in the message; and, (d) by the cloud host server component,
   i. parsing from the message the radio unit identifier, the timestamp, the geostamp, radiobeacon information in the message, the geostamp defining a location of the community nodal device in radio proximity to the ski or snowboard,
   ii. associating the radio unit identifier with the user profile in the database and the ski or snowboard,
   iii. updating the current location of the radiobeacon and ski or snowboard in the database according to the geostamp reported in the message;
   iv. selecting a predefined user-programmable executable command according to a conditional rule that links the contents of the message with the executable command; and,
   v. causing the executable command to be executed on a remote machine.

2. The system of claim 1, wherein the contents of the message include a data payload that includes one or more data elements of current location, timestamp, motion sensor data, heading data, acceleration data, radio signal power data, temperature sensor data, humidity data, button-press data, battery status data, and wherein any data element is associated with a conditional rule by which a threshold or a trend in the data element or elements triggers the executable command.

3. The system of claim 1, wherein the current location is a datapoint that triggers the executable command when parsed from the message.

4. The system of claim 1, wherein the motion sensor data, heading data, or acceleration data is a datapoint that exceeds or falls below a threshold level programmed in a conditional rule and triggers the executable command.

5. The system of claim 1, wherein a trend or a threshold in the received radio signal strength, as measured by the community nodal device and included in the message, triggers the executable command.

6. The system of claim 1, wherein a trend or a threshold in the received radio signal strength, as measured by the community nodal device and included in the message, triggers an executable command to the radiobeacon, commanding the radiobeacon to increase transmission radio signal power.

7. The system of claim 1, wherein the community nodal device is a smartphone in which an application is installed, wherein the smartphone is operable to send a message containing the radio unit identifier, timestamp, and geostamp to the cloud host server component in response to receipt of a bluetoothed radio signal having the community identifier.

8. The system of claim 1, wherein the community nodal device includes a user interface adapted for programming a conditional rule associated with an executable command, and for causing the conditional rule and executable command to be stored in the user profile in the database of the cloud host server component.

9. The system of claim 1, wherein the community nodal device includes a user interface adapted for programming a definition of a geofenced area according to a perimeter defined by a radius around a current location.

10. The system of claim 1, wherein the command is a notification sent to a smart device of the first owner that includes a display of a map of the current location of the ski or snowboard.

11. The system of claim 1, wherein the executable command is a notification sent to a smart device of the first owner that tracks the ski or snowboard by displaying a map of a plurality of waypoints over time.

12. The system of claim 1, wherein the radiobeacon is embedded on a flexible circuit board in a ski or snowboard and is rechargeable by a docking device capable of forming a direct charging connection to an embedded battery and a wireless connection to an inductive coil configured for charging the embedded battery.

13. The system of claim 2, wherein the timestamp added to the message is added by the community nodal device and the executable command is conditional on the timestamp in the message.

14. The system of claim 2, wherein the command is conditional on a received signal strength indication (RSSI) contained in the data payload in the message.

15. The system of claim 1, wherein the command is a notification sent to a smart device of the first owner that causes an exception alert to be displayed if the message includes temperature data that indicates a trend in temperature that satisfies a user-programmable conditional rule.

16. The system of claim 1, wherein the radiobeacon embedded in the ski or snowboard includes a user-operable switch and the user-programmable conditional rule triggers the executable command in a remote machine if the switch is actuated.

17. A system for finding and tracking a lost winter sporting item, which comprises:

(a) a radiobeacon operable as a bluetoothed transceiver, the radiobeacon comprising a flexible circuit board with logic and radio circuits embedded in an item of winter sports equipment, the item having an owner, wherein the radiobeacon is the owner's radiobeacon and wherein the owner's radiobeacon is configured for broadcasting a bluetoothed radio signal with a data payload, the data payload having data;

(b) an owner's smartphone networkedly addressable by a community identifier transmittable in the bluetoothed radio signal from the owner's radiobeacon, the smartphone with programming operable to receive the bluetoothed radio signal and to manage received bluetoothed radio signals, the smartphone further comprising a user profile that matches at least one radio unit identifier extractable from the received bluetoothed radio signal;

(c) by the smartphone, when in radio proximity to the owner's radiobeacon,
   i. accessing the user profile in response to the received radio signal,
   ii. adding a timestamp and a current location to the data associated with the received bluetoothed radio signal,
   iii. selecting a conditional rule that is satisfied by data in the data payload of the received bluetoothed radio signal, in the timestamp, or in the current location, the conditional rule comprising one or more user-programmable executable commands; and,
  vi. causing the executable command associated with the conditional rule to be executed on the owner's smartphone or by a remote machine.

18. The system of claim 17, comprising a software switch configured to upswitch data from a received bluetoothed radio signal to a cloud host server component if the radio unit identifier parsed from the received radio signal does not match any one of the radio unit identifiers identified as belonging to the owner of the smartphone.

19. The system of claim 18, wherein the software switch is executed in background without sharing the contents of the radio signal with the owner of the smartphone unless the radio unit identifier corresponds to a radiobeacon that belongs to the owner of the smartphone.

20. The system of claim 17, wherein the data recorded by the smartphone includes a radiotag proximity measurement.

21. The system of claim 17, comprising displaying an exception alert if the bluetoothed radio signal is detected by the owner's smartphone in a location outside a defined geofenced area.

22. The system of claim 21, wherein the exception alert is conditional on the timestamp.

23. The system of claim 17, wherein, by the smartphone, the data payload received from the radiobeacon is associated with a time condition, a location condition, and a range information condition for each bluetoothed radio signal received; the range information condition defining the radio distance between the radiobeacon and the smartphone; and, further by the smartphone, wherein an application user interface is configured to enable a user to program one or more custom conditional rules using time condition, location condition, or range information condition as a trigger condition for generating an executable command for each bluetoothed radio signal received that meets one or more conditions.

24. The system of claim 1, wherein the executable command is addressed to the radiobeacon and causes the radiobeacon to actuate an alarm display that is audibly or visibly displayed to a proximate user.

25. The system of claim 1, wherein a software application is installable in the community nodal device, the community nodal device is a smartphone, and the software application is configured, when installed and operated in the smartphone, to enable the smartphone to upswitch a qualified bluetoothed radio signal as an Internet Protocol packet formatted message to the cloud host server component.

26. The system of claim 1, wherein the embedded radiobeacon comprises a body having a segmented and flexible printed circuit board.

* * * * *